United States Patent
Yajima et al.

(10) Patent No.: US 9,749,135 B2
(45) Date of Patent: *Aug. 29, 2017

(54) ENCRYPTING DEVICE, ENCRYPTING METHOD, AND RECORDING MEDIUM

(71) Applicant: FUJITSU LIMITED, Kawasaki-shi, Kanagawa (JP)

(72) Inventors: Jun Yajima, Yokohama (JP); Kouichi Itoh, Kawasaki (JP); Masahiko Takenaka, Kawasaki (JP); Dai Yamamoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/191,078

(22) Filed: Jun. 23, 2016

(65) Prior Publication Data
US 2017/0048067 A1 Feb. 16, 2017

Related U.S. Application Data

(60) Division of application No. 13/927,641, filed on Jun. 26, 2013, now Pat. No. 9,401,805, and a continuation
(Continued)

(51) Int. Cl.
*H04L 9/30* (2006.01)
*H04L 9/00* (2006.01)
*H04L 9/08* (2006.01)

(52) U.S. Cl.
CPC ............ *H04L 9/3066* (2013.01); *H04L 9/003* (2013.01); *H04L 9/0816* (2013.01); *H04L 2209/08* (2013.01)

(58) Field of Classification Search
CPC ................... H04L 9/003; H04L 9/3066; G06F 2207/7242
(Continued)

(56) References Cited

U.S. PATENT DOCUMENTS 6,914,986 B2 7/2005 Handschuh
7,602,907 B2 10/2009 Zhu et al.
(Continued)

FOREIGN PATENT DOCUMENTS

JP 2000-132096 5/2000
JP 2003-233307 8/2003
(Continued)

OTHER PUBLICATIONS

PCT International Search Report mailed Jun. 1, 2010 in related International Patent Application No. PCT/JP2010/002363.
(Continued)

*Primary Examiner* — Brian Shaw
(74) *Attorney, Agent, or Firm* — Staas & Halsey LLP

(57) ABSTRACT

From the least significant bit of the current secret key, k bits are retrieved, obtaining a binary window sequence. A binary bit string of concatenation of the random number to the more significant bits of the window sequence is obtained if the most significant bit of the window sequence is 0, subtracting a bit string from the current secret key to obtain a new secret key, or the bit string of a complement of the base number for the window sequence in binary system is calculated if the most significant bit of the window sequence is 1, obtaining a bit string by adding a minus sign to a bit string obtained by concatenating the random number to the more significant bits of the bit string, subtracting the bit string from the current secret key to obtain a new secret key.

4 Claims, 35 Drawing Sheets

```
<INPUT VALUE>
d : PRIVATE KEY, d=d[k×m+b - 1]|| ···||d[1]||d[0] (k×m-bit)
WHERE, d[i] IS i-TH BIT VALUE OF d
A: POINT ON ELLIPTICAL CURVE
<OUTPUT VALUE>
V=dA 1201  V:=0;  /* INFINITE POINT */
      /* SETTING RANDOMIZED TABLE DATA tab[x]= (2bx+s)A (x=0,1,···,2k - 1) */
1202  s := (b-bit RANDOM NUMBER);
1203  tab[0] = sA;
1204  for (x:=1; x < 2^k; x:=x+1) tab[x] := ECADD(tab[x - 1], 2^bA);
      /* DETERMINING WINDOW SEQUENCE w[m-1], ···, W[0] AND CORRECTION VALUE d' (B-BIT) FROM PRIVATE KEY d
         AND RANDOM NUMBER s*/
1205  Decide_Window_Seq(w[m-1],···, w[0], d' , d, s);
      /* MAIN PROCESS */
1206  for (i:=m - 1 ; i≥0; i:=i - 1) {
         /* DOUBLING OF POINT k TIMES */
1207     for (j=0; j<k; j=j+1) V:=ECDBL(V);
         /* PERFORMING ADDITION OF POINT BY TABLE INDEX USING window VALUE AS index VALUE */
1208     V := ECADD(V, tab[w[i]]);
1209  }
      /* OPERATION BY CORRECTION VALUE d' */
1210  V := ECADD(V, d' A);
1211  return V;
```

Related U.S. Application Data of application No. PCT/JP2010/073635, filed on Dec. 27, 2010.

(58) Field of Classification Search
USPC .................................................. 380/28, 44
See application file for complete search history.

(56) References Cited

U.S. PATENT DOCUMENTS

| | | |
|---|---|---|
| 7,903,811 B2 | 3/2011 | Vasyltsov |
| 7,940,927 B2 | 5/2011 | Futa et al. |
| 8,345,864 B1 | 1/2013 | Robinson et al. |
| 2007/0064931 A1 | 3/2007 | Zhu et al. |
| 2007/0291937 A1 | 12/2007 | Katagi et al. |
| 2008/0219438 A1 | 9/2008 | Ebeid |
| 2008/0240443 A1 | 10/2008 | Vuillaume et al. |
| 2011/0013770 A1 | 1/2011 | Itoh |

FOREIGN PATENT DOCUMENTS

| | | |
|---|---|---|
| JP | 2006-145945 | 6/2006 |
| JP | 2007-187908 | 7/2007 |
| WO | 2007/005563 A2 | 1/2007 |
| WO | 2009/122461 A1 | 10/2009 |

OTHER PUBLICATIONS

PCT International Preliminary Report on Patentability mailed Nov. 1, 2012 in PCT/JP2010/002363.
Zhang et al., "An Efficient Window-Based Countermeasure to Power Analysis of ECC Algorithms", Proceedings of the Fifth International Conference on Information Technology: New Generations, 2008, pp. 120-126.
Itoh et al., "DPA Countermeasures by Improving the Window Method", CHES2002, LNCS 2523, 2003, pp. 303-317.
"IEEE Standard Specifications for Public-Key Cryptology," IEEE Std 1363-2000, 2000, pp. 1-227.
P. Kocher et al., "Differential Power Analysis," Advances in Cryptology—CRYPTO'99, Lecture Notes in Computer Science 1666, Springer-Verlag, 1999, pp. 388-397.
M. Tenstall, "Random Order m-ary Exponentiation," Proceedings of the 14th Australasian Conference on Information Security and Privacy, 2009, 15 pp., printed from www.cs.bris.ac.uk/home/tunstall/papers./Tun09.pdf.
International Search Report mailed Feb. 1, 2011 for corresponding International Application No. PCT/JP2010/073635.
PCT International Preliminary Report on Patentability issued Jul. 2, 2013 in corresponding International Application No. PCT/JP2010/073635.
Office Action in co-pending U.S. Appl. No. 13/927,641 dated Mar. 3, 2015.
Office Action in co-pending U.S. Appl. No. 13/927,641 dated Nov. 6, 2014.
Final Office Action in co-pending U.S. Appl. No. 13/927,641 dated Aug. 3, 2015.
Notice of Allowance in co-pending U.S. Appl. No. 13/927,641 dated Mar. 31, 2016.
PCT International Preliminary Report on Patentability mailed Nov. 1, 2012 in related International Patent Application No. PCT/JP2010/002363.
U.S. Appl. No. 13/927,641, filed Jun. 26, 2013, Yajima et al., Fujitsu Limited.
EP Search Report for European Application No. 10848844.6 dated Jun. 2, 2017.
Nevine Ebeid et al.; "On Randomizing Private Keys to Counteract DPA Attacks", M. Matsui et al (Eds.): SAC 2003, Lecture Notes in Computer Science, pp. 58-72, 2004.
MahnKi Ahn et al.; "A Random M-ary Method Based Countermeasure Against Side Channel Attacks", V. Kumar et al. (Eds.): ICCSA 2003, Lecture Notes in Computer Science 2668, pp. 338-347, 2003.

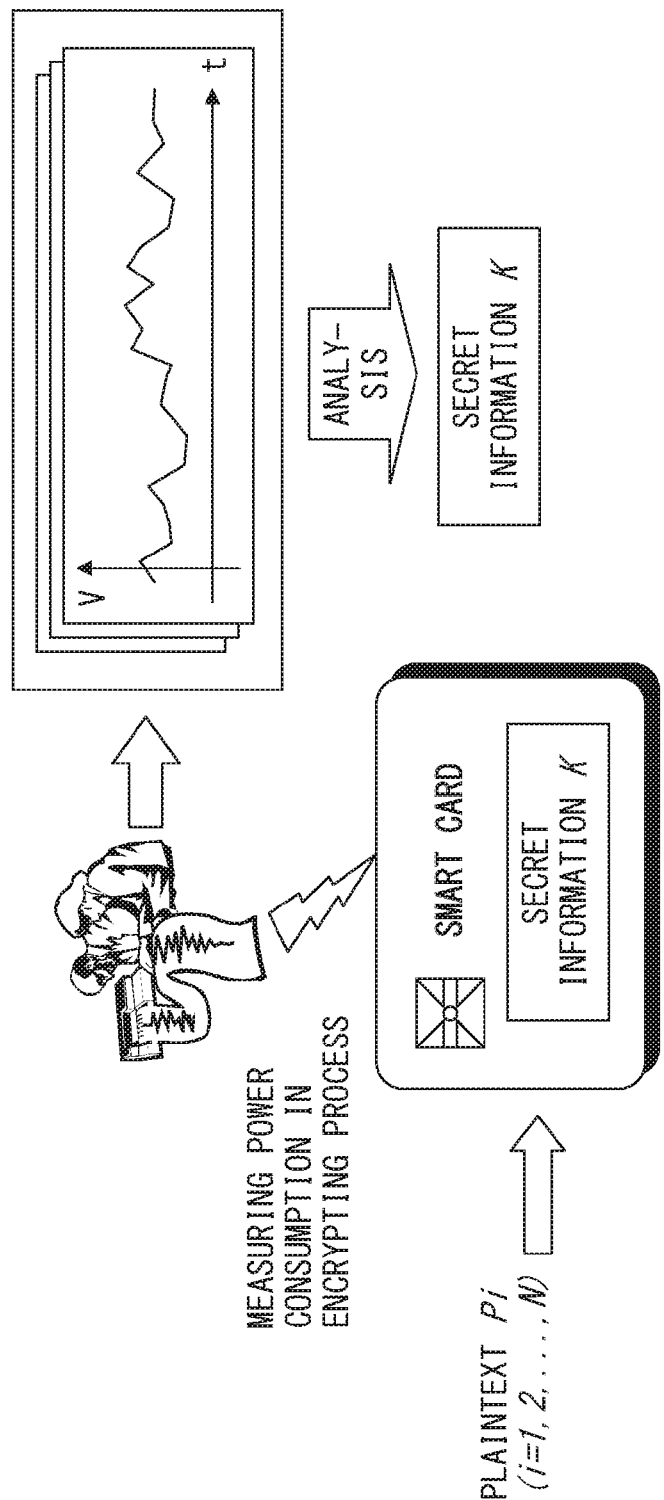
F I G. 1

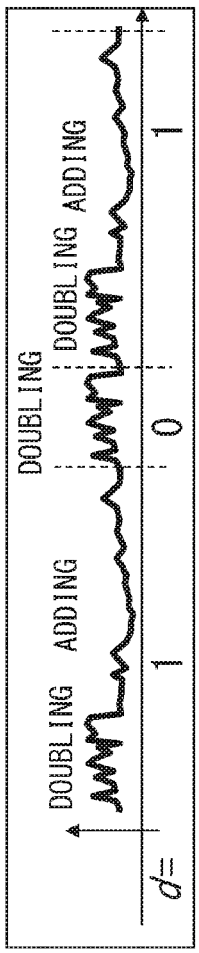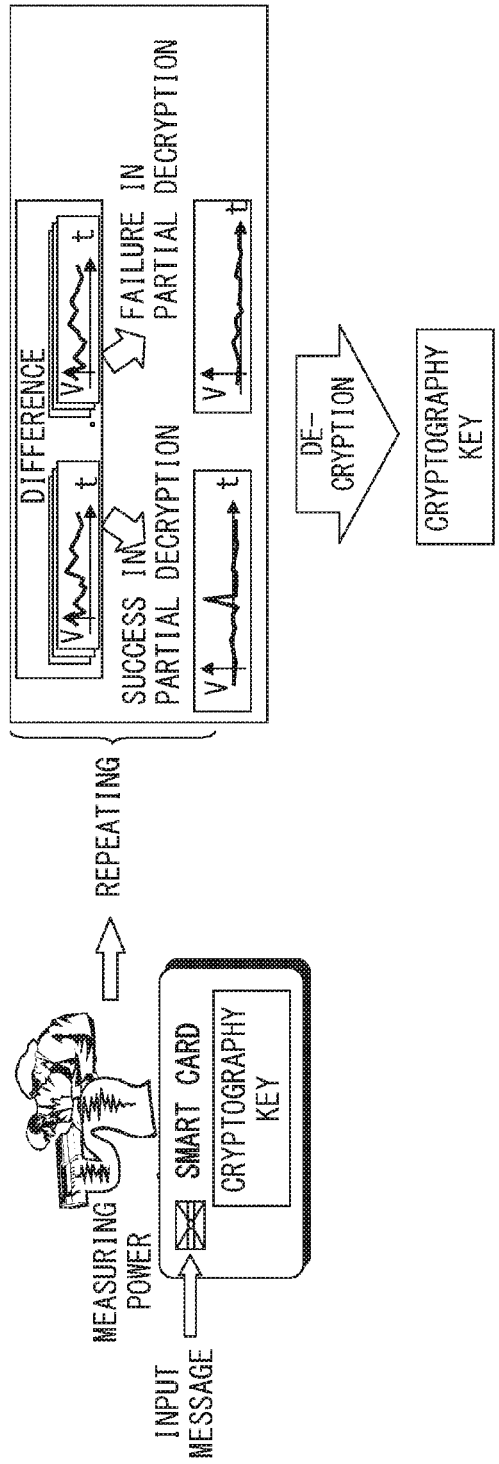
FIG. 2

```
<INPUT VALUE>
d : SCALAR VALUE
u : BIT LENGTH OF d
A : POINT ON ELLIPTICAL CURVE
<OUTPUT VALUE>
V=dA  : d MULTIPLICATION OF A

301   V:=0;   /* INITIAL VALUE IS INFINITE POINT */
302   for(i:=u - - ;  i 0; i:=i - 1) {
            /* PERFORMING DOUBLING ON POINT */
303       V:= ECDBL(V)
            /* d [i] =IF d[i], ADDING POINT */
304       if (d [i] ==1) V := ECADD(V, A);
305   }
306   return V;
```

F I G. 3

CALCULATION OF dA USING BINARY METHOD $d = (1\ 1\ 0\ 0\ 1\ 0\ 1)_2$ $dA = \boxed{2\ (2(2(2(2(2A)0+A)+A)))+A))+A}$

D0 D1 D2 D3 D4 D5 D6 — DOUBLING OF POINT

A6, A5, A2, A0 — ADDITION OF POINT

F I G. 4

```
<INPUT VALUE>
d : PRIVATE KEY, d=d[k×m - 1]||...||d[1]||d[0]  (k×m-bit)
WHERE, d[i] IS i-TH BIT VALUE OF d
A: POINT ON ELLIPTICAL CURVE
<OUTPUT VALUE>
V=dA 801   V:=0;   /* INFINITE POINT */
      /* SETTING TABLE DATA tab[x]= xA (x=0, 1,...,2^k - 1) */
802   tab[0] = 0;  /* INFINITE POINT */
803   for (x:=1; x < 2^k ; x :=x+1) tab[x] := ECADD(tab[x - 1], A);
      /* MAIN PROCESS */
804   for (i:=m - 1 ; i ≧ 0; i:=i - 1) {
      /* DOUBLING OF POINT k TIMES */
805     for (j=0; j<k; j=j+1) V:=ECDBL(V);
      /* PROVIDING k-BIT WINDOW VALUE FOR w[i]*/
806     w[i] := d[i×k+k - 1]|| ... || d[i×k];
      /* PERFORMING ADDITION OF POINT BY TABLE INDEX USING window VALUE AS index VALUE */
807     V := ECADD(V, tab[w[i]]);
808   }
809   return V;
```

F I G. 8

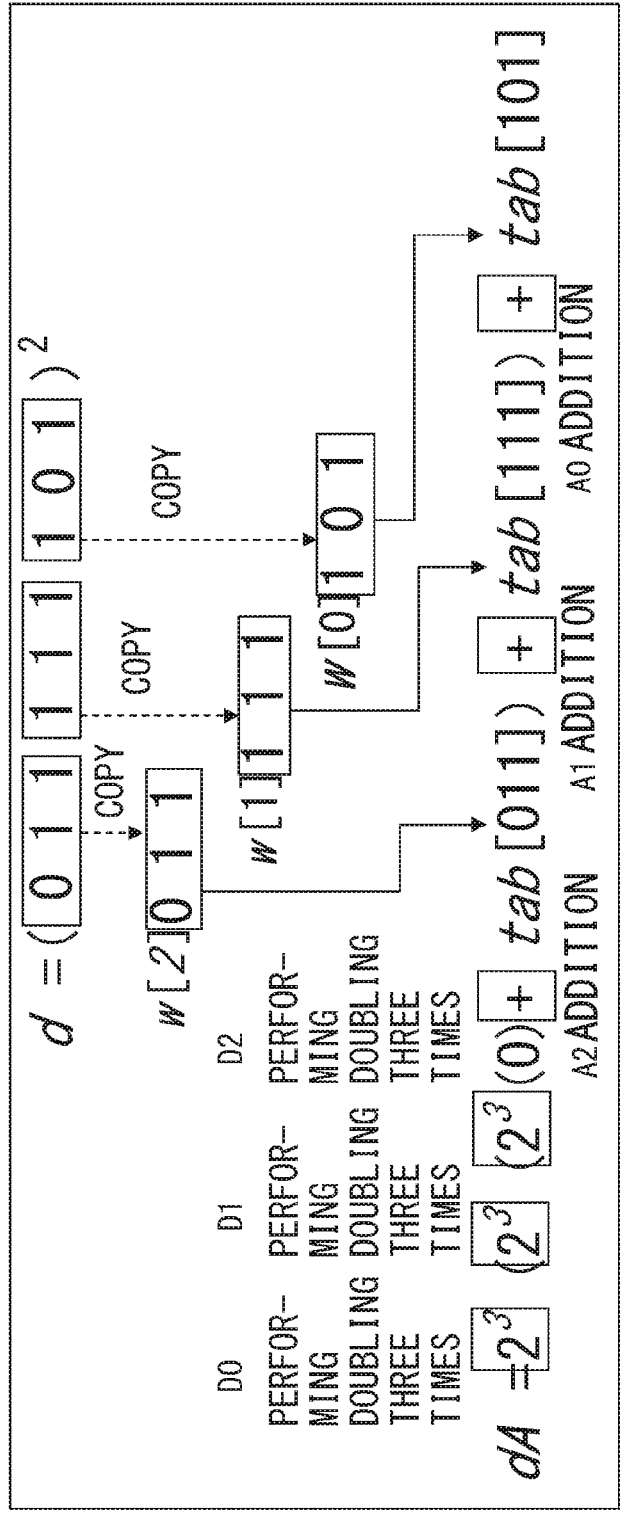

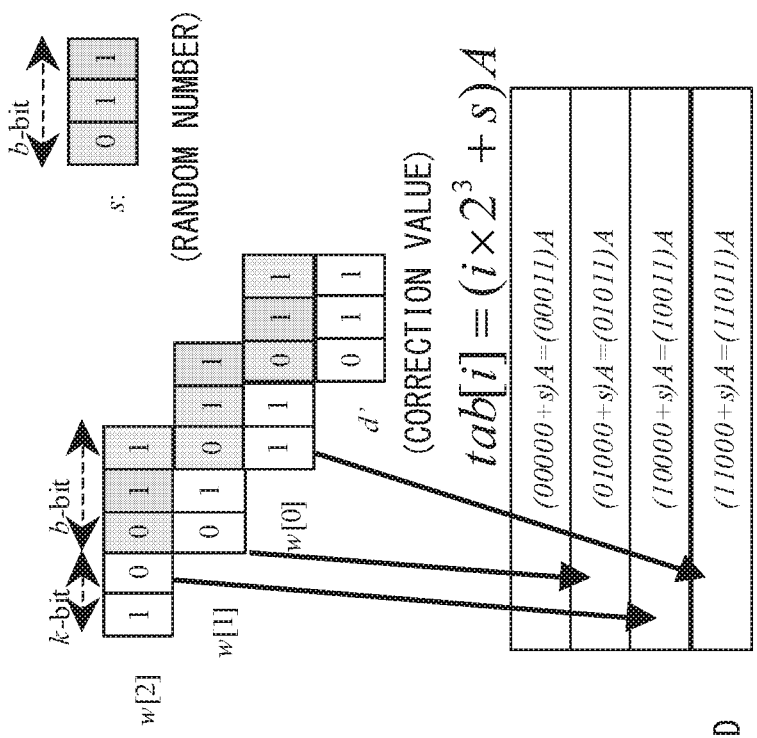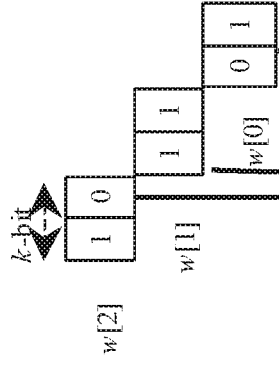
FIG. 11(a) COMMON WINDOW METHOD
FIG. 11(b) RANDOMIZED WINDOW METHOD

```
<INPUT VALUE>
d : PRIVATE KEY, d=d[k×m+b - 1]||...||d[1]||d[0]  (k×m-bit)
WHERE, d[i] IS i-TH BIT VALUE OF d
A: POINT ON ELLIPTICAL CURVE
<OUTPUT VALUE>
V=dA 1201  V:=0;   /* INFINITE POINT */
      /* SETTING RANDOMIZED TABLE DATA tab[x]= (2bx+s)A (x=0,1,...,2k - 1) */
1202  s := (b-bit RANDOM NUMBER);
1203  tab[0] = sA;
1204  for (x:=1; x< 2^k; x:=x+1) tab[x] := ECADD(tab[x - 1], 2^bA);
      /* DETERMINING WINDOW SEQUENCE w[m-1], ..., w[0] AND CORRECTION VALUE d' (B-BIT) FROM PRIVATE KEY d
         AND RANDOM NUMBER s*/
1205  Decide_Window_Seq(w[m-1], ..., w[0], d' , d, s);
      /* MAIN PROCESS */
1206  for (i:=m - 1; i≧0; i:=i - 1) {
          /* DOUBLING OF POINT k TIMES */
1207      for (j=0; j<k; j=j+1) V:=ECDBL(V);
          /* PERFORMING ADDITION OF POINT BY TABLE INDEX USING window VALUE AS index VALUE */
1208      V := ECADD(V, tab[w[i]]);
1209  }
      /* OPERATION BY CORRECTION VALUE d' */
1210  V := ECADD(V, d' A);
1211  return V;
```

F I G. 1 2

FIG. 13 (a)
WINDOW METHOD $$d = (\boxed{0\ 1}\ \boxed{1\ 1}\ \boxed{0\ 0\ 1})_2$$

3　　6　　1
3A　6A　1A

8 PIECES OF TABLE DATA REQUIRED
CORRESPONDING TO 0 ~ 7

| index | value |
|---|---|
| 0 | 0A |
| 1 | 1A |
| 2 | 2A |
| 3 | 3A |
| 4 | 4A |
| 5 | 5A |
| 6 | 6A |
| 7 | 7A |

FIG. 13 (b)
SIGNED WINDOW METHOD $$d = (\boxed{0\ 1}\ \boxed{1\ 1}\ \boxed{0\ 0\ 1})_2$$

carry CORRECTION +1　　-8　window CORRECTION
4A　(-2A)　1A
3　　6　　1

SUBTRACTING POINT 2A

REDUCTION TO 5 PIECES OF TABLE DATA
CORRESPONDING TO 0 ~ 4

| index | value |
|---|---|
| 0 | 0A |
| 1 | 1A |
| 2 | 2A |
| 3 | 3A |
| 4 | 4A |

| METHOD | COUNTERMEASURE AGAINST DPA | CONTROL OF CARRY | TABLE SIZE |
|---|---|---|---|
| RANDOMIZED WINDOW METHOD | ○ | SIMPLE | $2^k$ |
| SIGNED WINDOW METHOD | × | SIMPLE | $2^{k-1}+1$ |
| RANDOMIZED WINDOW METHOD + SIGNED WINDOW METHOD | DIFFICULT TO REALIZE | DIFFICULT TO REALIZE | DIFFICULT TO REALIZE |

F I G. 1 5

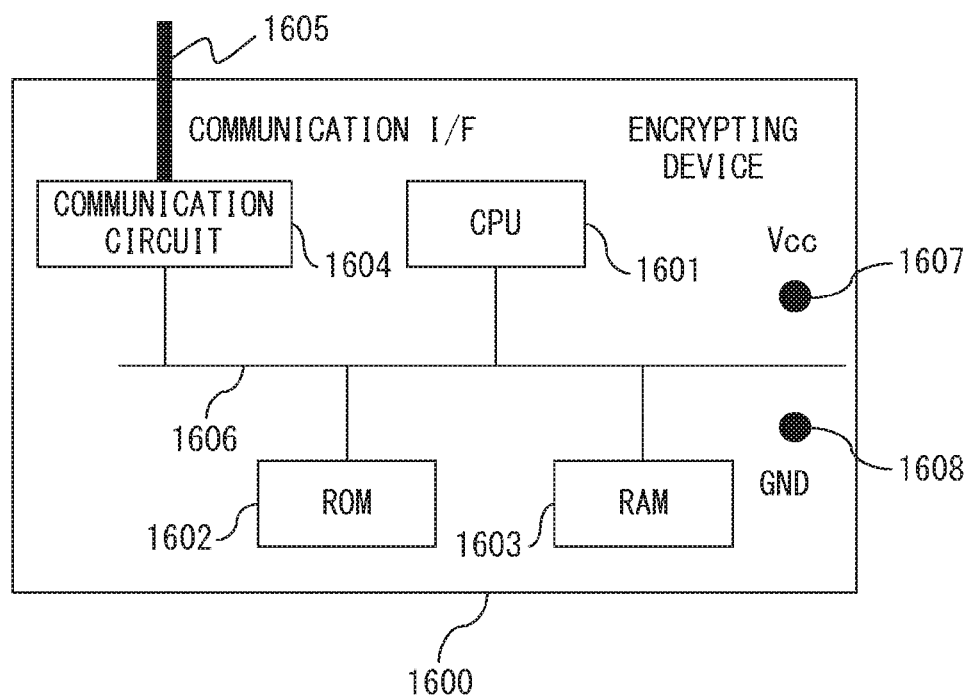
F I G. 1 6

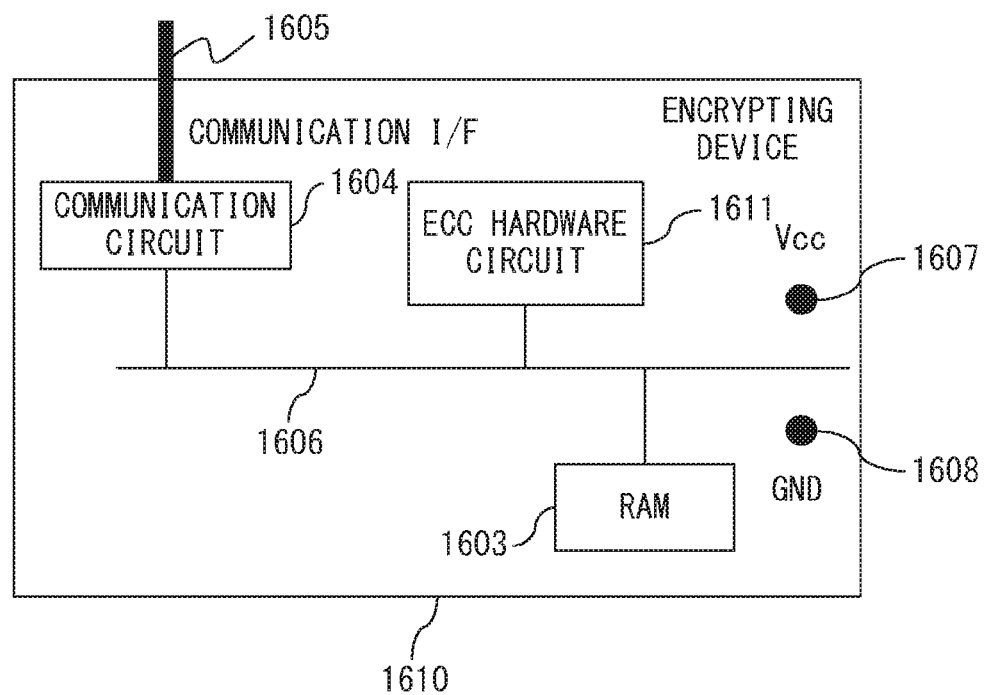
F I G. 17

FIG. 21

EXAMPLE: 2-BIT WINDOW, 4-BIT RANDOM NUMBER, $d = 1011011100101011$, $s = 1011$ RANDOM NUMBER

JUDGING 1 OR NOT AT MOST SIGNIFICANT BIT SUBTRACTION IF 1

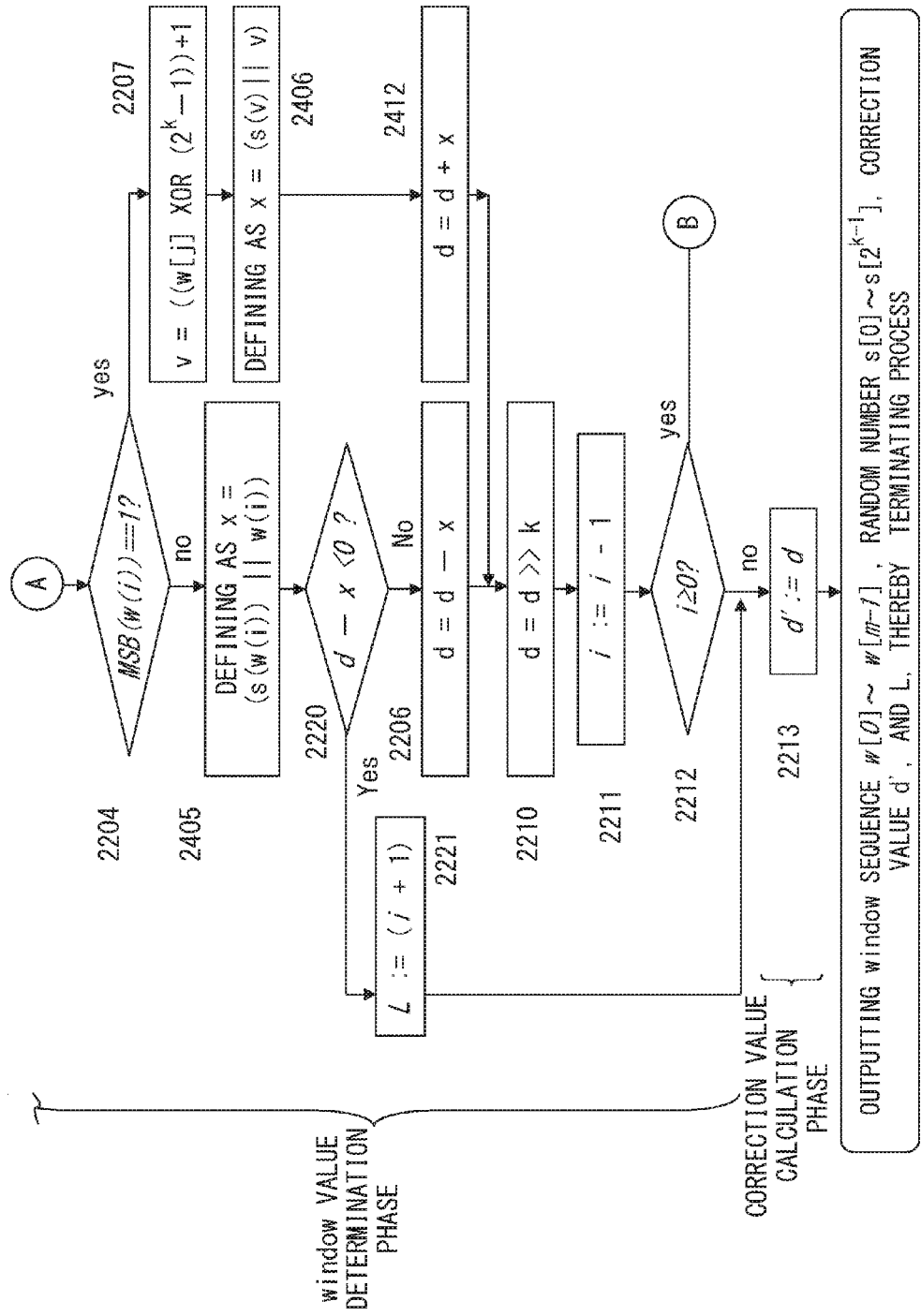
F I G. 23B

EXAMPLE: 2-BIT WINDOW, 4 BIT RANDOM NUMBER, $d = 1101001010101111$,
RANDOM NUMBER $s(0)=0111$, $s(1)=1001$, $s(2)=1100$ $d = 1 1 0 1 0 0 1 0 1 0 1 0 1 1 1 1$ *w4*
                                $1\;1$
$s - \fbox{1 0 0 1 0 1}$ *x*

$d = 1 1 0 1 0 0 1 1 0 1 0 1$ *w3*
                          $\fbox{0 1}$
$s + \fbox{1 0 0 1 0 1}$ *x*

$d = 1 1 0 1 0 0 0 1 0 0$ *w2*
                      $\fbox{0 0}$
$s + \fbox{0 1 1 1 0 0}$ *x*

$d = 1 1 0 0 1 0 1 0 1 0$ *w1*
                      $\fbox{1 0}$
$s - \fbox{1 1 0 0 1 0}$ *x*

$d = 1 1 1 1 1 1$ *w0*
              $\fbox{1 1}$
$s - \fbox{1 0 0 1 0 1}$ *x*

$d' \fbox{1 1 0 0 1}$

F I G. 2 4

SAMPLE: MODULAR EXPONENTIATION OPERATION
2-BIT WINDOW, 5-BIT RANDOM NUMBER, d = 10001100010101101,
RANDOM NUMBER s(0)=01011, s(1)=11000, s(2)=11011, s(3)=00101 d = 1 0 0 0 1 1 0 0 0 1 0 1 1 0 1    0 1 |w4
                               s − | 1 1 0 0 0 | 1 |x d = 1 0 0 0 1 0 1 1 1 0 0 1 1 1    w3
                         s − | 0 0 1 0 1 | 1 1 |x d = 1 0 0 0 1 0 1 0 1 1 1 1    w2
                   s − | 0 0 1 0 1 | 1 1 |x d = 1 0 0 0 1 0 0 0 0    w1
             s − | 0 1 0 1 1 | 0 0 |x d' 1 1 1 0 0 1

F I G. 2 7

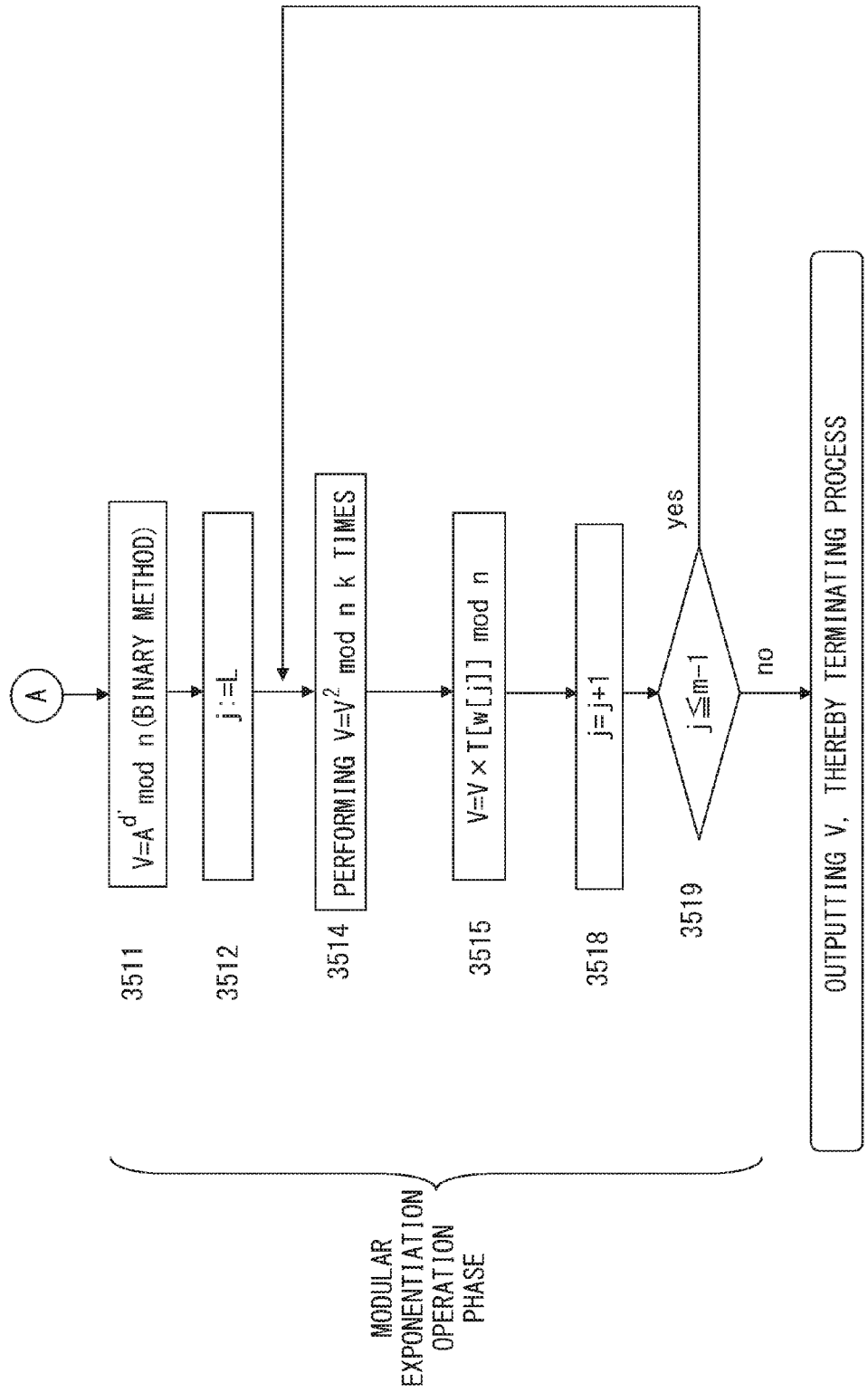

| METHOD | COUNTERMEASURE AGAINST DPA | CONTROL OF CARRY | TABLE SIZE |
|---|---|---|---|
| RANDOMIZED WINDOW METHOD | ○ | SIMPLE | $2^k$ |
| SIGNED WINDOW METHOD | × | SIMPLE | $2^{k-1}+1$ |
| RANDOMIZED WINDOW METHOD + SIGNED WINDOW METHOD | DIFFICULT TO REALIZE | DIFFICULT TO REALIZE | DIFFICULT TO REALIZE |
| FIRST AND SECOND EMBODIMENTS | ○ | SIMPLE | $2^{k-1}+1$ |

F I G. 2 9

ENCRYPTING DEVICE, ENCRYPTING METHOD, AND RECORDING MEDIUM

CROSS-REFERENCE TO RELATED APPLICATIONS

This application is a divisional application of U.S. application Ser. No. 13/927,641, filed Jun. 26, 2013, which is a continuation application of International PCT Application NO. PCT/JP2010/073635 filed on Dec. 27, 2010.

FIELD

The embodiments described below are related to an elliptical curve cryptography device, an encrypting method, and a program for the device and the method.

BACKGROUND

Recently, information security technology has become more and more important. In addition, as one of the basic techniques of information security, public-key cryptography has been more widely studied.

There are some types of public-key cryptography, and a Rivest, Shamir, Adleman (RSA) algorithm which use modular exponentiation calculation, elliptical curve cryptography (ECC) using a scalar multiplication of a point on an elliptical curve, etc. are well known.

In using the public-key cryptography, it is important to keep a private key secret to maintain the security. However, there have been some aggressive methods to break a private key. Therefore, it is necessary for a tamper-proof equipment unit for performing a process using public-key cryptography to be implemented with a countermeasure against at least known aggressive methods.

For example, an aggressive method called a power analysis (PA) attack is known as a type of side channel attack. Furthermore, the PA includes two types of analyses, that is, a simple power analysis (SPA) and a differential power analysis (DPA).

Therefore, when an equipment unit performs a process using the public-key cryptography, it is requested to be secure against the SPA attack and the DPA attack. For example, one of the countermeasures against the SPA attack is a method called a window method, and one of the countermeasures against the DPA attack a method for randomizing data. Furthermore, a cryptography device for realizing a modular exponentiation and scalar multiplication of a point of efficient tamper-proof and for an encrypting method for performing a modular exponentiation, a cryptography processor for making difficult the estimation of a private key using a PA attack have been proposed.

DOCUMENT OF PRIOR ART

Patent Document

[Patent Document 1] Japanese Laid-open Patent Publication No. 2000-132096
[Patent Document 2] Japanese Laid-open Patent Publication No. 2003-233307
[Patent Document 3] International Publication Pamphlet No. WO2009/122461
[Non-patent Document 1] [IEEE P1363] IEEE P1363/D13 (Draft Version 13, Nov. 12, 1999) main document, Standard Specifications for Public Key Cryptography, http://grouper.ieee.org/groups/1363/draft.html
[Non-patent Document 2] [Kocher99] P. Kocher, J. Jaffe and B. Jun "Differential Power Analysis", Crypto '99, LNCS 1666, pp. 388-397, Springer-Verlag, 1999.

When a window method (or a variation of the method) in which the window size is k bits is adopted for a device that performs a scalar multiplication of a point on a elliptical curve as a countermeasure to SPA attack, the memory stores data indicating the point on the elliptical curve corresponding to each index of k bits. Therefore, the amount of used memory is an exponential order of the window size k, and the larger the window side k is, the more the amount of used memory increases.

On the other hand, the use of the cryptography technology has recently becomes widespread in various devices such as embedded device in addition to a general-purpose computer such as a server computer, a personal computer, etc. It is requested to implement a device which performs a scalar multiplication with a countermeasure against both the SPA attack and the DPA attack regardless of the type of device.

However, the amount of the memory of a embedded device is much smaller than the amount of the memory of a general-purpose computer. With a device of a small amount of memory, it is preferable that a process is performed with the smallest possible amount of used memory.

SUMMARY

According to an aspect of the present invention, an encrypting device includes: a random number generation unit which generates a binary random number s of b bits; a window value determination unit which retrieves k bits from the least significant bit of the current secret key d, wherein the (b+m×k) bits of the binary secret key d in elliptical curve cryptography are used as an initial value using b, m, k, and i as natural numbers including 0, and performs a calculation for a binary window sequence w(i); a correction value calculation unit which obtains a binary bit string x=(s∥w(i)) by concatenating the random number s to the more significant bits of the window sequence w(i) if the most significant bit of the window sequence w(i) is 0, subtracts a bit string x from the current secret key d and defines the result as a bit string of a new secret key d, calculates the bit string of a complement of the base number for the window sequence w(i) in binary system if the most significant bit of the window sequence w(i) is 1, obtains a bit string −x=−(s∥v) by adding a minus sign to a bit string obtained by concatenating the random number s to the more significant bits of the bit string v, subtracts the bit string −x from the current secret key d, and defines the result as a bit string of a new secret key d; a control unit which, while changing i from m−1 to 0, repeatedly performs the processes of the window value determination unit and the correction value calculation unit until i reaches 0 or immediately before the value of the bit string of the secret key d becomes a negative value; a window value storage unit which stores each of the window sequence w(i) obtained after completing the operation of the control unit; a correction value storage unit which stores as a correction value d' the bit string of a secret key d obtained after completing the operation of the control unit; a random number storage unit which stores the random number s generated by the random number storage unit; and an encrypting operation execution unit which performs an encrypting operation using the secret key d, the random number s stored in the random number storage unit, each window sequence stored in the window value storage unit, and the correction value d' stored in the correction value storage unit.

According to an aspect of the present invention, adopting the window method maintains the security against the SPA, randomizing table data maintains the security against the DPA, thereby realizing the reduction of the table size and providing an encrypting operation device which also realizes simple carry control.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 1 is an explanatory view of the outline of a power analysis;

FIG. 2 is an explanatory view of a simple power analysis (SPA) and a differential power analysis (DPA);

FIG. 3 illustrates the algorithm of a scalar multiplication process of a point using the binary method;

FIG. 4 is an explanatory view of a scalar multiplication process of a point by the binary method;

FIG. 8 illustrates the algorithm of a scalar multiplication process of a point using the window method;

FIGS. 9A and 9B provide an explanatory view of a scalar multiplication process of a point using the window method;

FIGS. 11A and 11B provide an explanatory view of the difference between a common window method (second comparison example) and a randomized window method (third comparison example);

FIG. 12 illustrates the algorithm of a scalar multiplication process of a point using the randomized window method;

FIGS. 13A and 13B provide an explanatory view of the comparison between a common window method (second comparison example) and a signed window method (fourth comparison example);

FIG. 15 is a chart indicating the comparison among effects of various methods;

FIG. 16 is the first hardware configuration example of an encrypting device according to the first through third embodiments;

FIG. 17 is the second hardware configuration example of an encrypting device according to the first through third embodiments;

FIG. 21 is an explanatory view of the operation of the window value determination algorithm according to the first embodiment;

FIGS. 23A and 23B are a flowchart of the window value determination algorithm according to the second embodiment;

FIG. 24 is an explanatory view of the operation of the window value determination algorithm according to the second embodiment;

FIG. 27 is an explanatory view of the operation of the window value determination algorithm according to the third embodiment;

FIGS. 28A and 28B are a flowchart of the modular exponentiation algorithm according to the third embodiment; and FIG. 29 is a chart indicating the comparison of the effects among the first through third embodiments and various methods.

DESCRIPTION OF EMBODIMENTS

Figure 5:
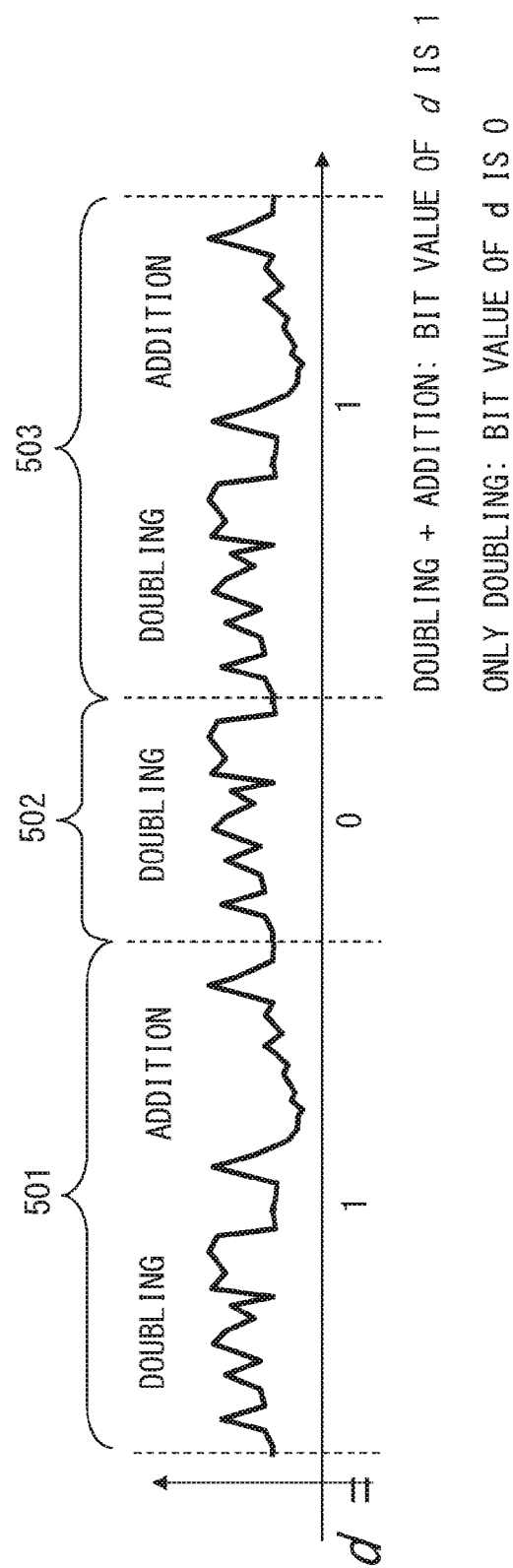
FIG. 5 illustrates an example of a power waveform when the SPA is used for the binary method in FIG. 3.

The embodiments of the present invention are described below in detail with reference to the attached drawings. The order of the explanation is described below.

The encrypting device according to the first through third embodiments described later generates the data for performing the scalar multiplication on the point on an elliptical curve (concretely a window sequence w(i), the random number string s[i], and the correction value d'), and performs a scalar multiplication using the generated data. To help understand the first through third embodiments, the operation on an elliptical curve is first explained below. In addition, to also help understand the first through third embodiments, the first through fourth comparison examples are also explained below.

Then, the common points between the opinion obtained by the applicant of the present application from the survey of the comparison example and the processing method according to the first through third embodiments developed by the applicant based on the opinion is described. In addition, the first through third embodiments are sequentially explained, and other embodiments are finally described.

<Outline of Operations of ECC>

The operations on an elliptical curve are described first. The main elliptical curves used in the ECC are the elliptical curve expressed by the equation (1.1) defined on the prime field (p), and the elliptical curve expressed by the equation (1.2) defined on the extension field GF ($2^m$) (The GF is short for Galois field, and p indicates a prime number).

$$y^2 = x^3 + ax + b \pmod{p} \tag{1.1}$$

where p indicates a prime number;

a and b indicate elliptical curve parameters ($0 \leq a, b < p$) a,b,x,y∈GF(p)

$$y^2 + xy = x^3 + ax^2 + b \pmod{f(x)} \tag{1.2}$$

where f (x) indicates a polynomial of GF ($2^m$), a and b indicate elliptical curve parameters ($0 \leq a, b < p$) a,b,x,y∈GF ($2^m$)

As described above, a and b are called elliptical curve parameters for unique determination of an elliptical curve.

The point A on the elliptical curve expressed by the equation (1.1) is expressed as A=(x,y) by the pair of x and y which satisfy the equation (1.1). Similarly, the point A on the elliptical curve expressed by the equation (1.2) is expressed as A=(x,y) by the pair of x and y which satisfy the equation (1.2).

Furthermore, an infinite point and a base point are defined as specific points on an elliptical curve. The infinite point is hereafter referred to as "O", and the base point is hereafter referred to as "G". The base point G is a point on an elliptical curve, used in common by users of elliptical curve cryptography, and is used various functions using the elliptical curve cryptography in, for example, generating a pair of public key and private key.

The discussion below in the present specification holds true with the elliptical curve expressed by the equation (1.1) and the elliptical curve expressed by the equation (1.2). Therefore, in the descriptions below, the discrimination between the equation (1.1) and the equation (1.2) is not performed, but an "elliptical curve", a "point A", a "point (x,y)", an "x coordinate", a "y coordinate", "elliptical curve parameters a and b", etc. may be expressed.

It is known that when an operation (hereafter referred to as an "addition", and expressed as "+") is defined on the points on an elliptical curve, a set of points on the elliptical curve form a commutative group. The infinite point O corresponds to a zero element (that is, a unit element in an addition). Furthermore, the equation (1.3) holds true for an arbitrary point A (the point A may be the infinite point O) on the elliptical curve.

$$A+O=O+A=A$$

The inverse element of the point A is expressed as −A in the description below. The X and Y coordinates of the point −A may be calculated by an addition or a subtraction on the field GF (p) or GF ($2^m$). To be concrete, the point −A as an inverse element of the point A=(x,y) is expressed by the equation (1.4) when the elliptical curve is defined by the equation (1.1), and is expressed by the equation (1.5) when the elliptical curve is defined by the equation (1.2).

$$-A=(x,-y) \quad (1.4)$$

$$-A=(x,x+y) \quad (1.5)$$

As understood from the equations (1.4) and (1.5), the computational complexity is low in obtaining the point −A from the point A. In the signed window method and the first through third embodiments described later, the amount of the used memory may be reduced by using the computational simplicity of an inverse element. The computational simplicity of an inverse element is contrasted with the computational difficulty in a division of a prime field used in RSA cryptography.

The x and y coordinates of a point $A_3$ expressed as $A_3=A_1+A_2$ with respect to points $A_1$ and $A_2$ may be calculated by an addition, a subtraction, a multiplication and a division on the field GF (p) or GF ($2^m$) using the x and y coordinates of the points $A_1$ and $A_2$. When $A_2=A_1$, $A_3=A_1+A_1$ may also be expressed as $2A_1$, and the operation for obtaining the point $A_3=2A_1$ from the point $A_1$ is referred to as a doubling. The doubling is also realized by an addition, a subtraction, a multiplication and a division on the field GF (p) or GF ($2^m$).

Furthermore, the subtraction is defined as an addition of an inverse element as expressed by the equation (1.6).

$$A_1-A_2=A_1+(-A_2) \quad (1.6)$$

In addition, for the point A on the elliptical curve, the operation referred to as a scalar multiplication is defined using the integer x called a scalar value. The scalar multiplication of a point is to calculate the point V on the elliptical curve which satisfies the following equation (1.7) from the integer x referred to as a scalar value.

$$V=xA \quad (1.7)$$

In the ECC, a process is performed using X as secret information. For example, when an ECDH key is exchanged, a safe key agreement is realized by calculating the value of the point V on the elliptical curve which satisfies the following equation (1.8) where A indicates the point on the elliptical curve as a public key of a communication partner, and d indicates a private key.

$$V=dA \quad (1.8)$$

The third party who is not informed of the value of the private key d is not able to calculate the value of a correct agreed key.

In the equation (1.8), d indicates a private key which is not to be revealed to an unauthorized third party such as an attacker etc. That is, in the ECC, protecting the value of d is an important tamper-proof function.

Although the values other than d are known in the equation (1.8), it is a mathematically difficult discrete logarithm problem to obtain d within a realistic processing time because the computational complexity is too high in calculating the value of d. To be more concrete, when the elliptical curve parameter is 160 bits or more, it is difficult to obtain the value of d although the values of A and V are known.

Relating to the public key and the private key in the elliptical curve cryptography, the public key is given by the value of V which satisfies V=dG where G indicates the base point and d indicates the scalar value. That is, the private key V is a point on the elliptical curve, and the private key d is a scalar value. Although the point G and V are known by an attacker, it is very difficult to calculate the private key d from the point G and V because considerable computational complexity is required, which is also known as the computational difficulty of the above-mentioned discrete logarithm problem.

Furthermore, the ECC is also available for the key agreement by the Diffie-Hellman (DH) algorithm, the digital signature algorithm (DSA), etc. Regardless of the purpose of the use of the ECC, the process performed using the ECC includes the scalar multiplication as described below with reference to the DH key agreement.

For example, assume that the private key of the first device is $d_A$, and the private key of the second device is $d_B$. Then, the public key $Q_A$ is calculated by $Q_A=d_AG$ from the base point G, and the public key $Q_B$ of the second device is calculated by $Q_B=d_BG$ from the base point G. Thus, the scalar multiplication is performed for generating a public key.

The first device transmits its own public key $Q_A$ to the second device, and the second device transmits its own public key $Q_B$ to the first device. Then, the first device calculates the $d_AQ_{Bb}$ by the scalar multiplication. As a result, as indicated by the equation (1.9), the first and second devices may share the same key K.

$$K=d_AQ_B=d_A(d_BG)=d_B(d_AG)=d_BQ_A \quad (1.9)$$

When the ECC is used for the purpose other than the DH key agreement exemplified above, the scalar multiplication is also performed.

<Relating to Power Analysis (PA)>

Thus, it is known that the private key d which is difficult to obtain mathematically may be easily disclosed using a power analysis (PA). The basic mechanism of the PA is much related to the processing procedure of the scalar multiplication on the point of calculating the equation (1.8). In the description below, the PA for the scalar multiplication is explained after describing the operation procedure of the scalar multiplication of a point.

The PA is an analyzing method found in 1998 (non-patent document 2). As illustrated in FIG. 1, it is a method of measuring the power consumption of a device such as a smart card etc. for which a cryptography function is being executed (hereafter referred to as an encrypting process), and estimating and analyzing the secret information about a user stored inside the device using the measured data. (FIG. 1)

<Type of PA: Simple Power Analysis (SPA) and Differential Power Analysis (DPA9)>

There are two types of PA, that is, a simple power analysis (SPA), and a differential power analysis (DPA) (FIG. 2). Any attack is to disclose a private key by observing the inner state of a cryptography device using a power waveform.

The SPA is an aggressive method using a single power waveform. As illustrated in (a) of FIG. 2, a private key (cryptography key, secret key) is disclosed by directly observing the contents of the process being performed by the cryptography device from the shape of the power waveform using the relationship between the contents of the process and the cryptography key.

The DPA is an aggressive method using the difference among a plurality of power waveforms. As illustrated in (b) of FIG. 2, a private key (cryptography key, secret key) is disclosed by indirectly observing the data value processed in the cryptography device from the difference among a plurality of power waveforms using the relationship between the contents of the process and the cryptography key.

As described above, the PA attack is a type of non-destructive attack to disclose a scalar value used as a private key by measuring the power consumption of the device which is performing the scalar multiplication. Therefore, regardless of the purpose of the use of the ECC, it is effective to prevent the power consumption waveform of the device which is performing the scalar multiplication from expressing the characteristic of the private key d as a countermeasure to suppress the reveal of the private key d. If no countermeasure is taken against the PA attack, there is the possibility that the private key d is disclosed from the characteristic of the power consumption waveform of the device which is performing the scalar multiplication. Since the SPA and the DPA are aggressive methods of different types, the countermeasure against both the SPA and the DPA is to be taken as a countermeasure against the PA.

The encrypting device is designed to be safe against the SPA attack and the DPA attack, and to minimize the amount of used memory. For easy understanding of the merits of the first through third embodiments, some comparison examples are described below.

<Binary Method (First Comparison Example>

First, as the first comparison example, the "binary method" is described below. The binary method is weak against the SPA attack and the DPA attack.

For example, when the private key d is assigned 160 bits, d may be a very large number (for example, a number close to $2^{160}$). Therefore, it is impractical to perform the scalar multiplication as defined by the equation (1.8) because the addition of a point is performed a large number of times. The binary method is to suppress the order of the computational complexity for the scalar multiplication to the order of the number of bits of the private key d.

FIG. 3 illustrates the algorithm of the binary method in the scalar multiplication of a point, and FIG. 4 illustrates the outline of the process.

For convenience of explanation below, it is assumed that the bit length of a private key d is u. It is also assumed that the i-th bit of the private key d is d[i] ($0 \leq i \leq u-1$). d[0] is the least significant bit (LSB), and d[u−1] is the most significant bit (MSB). Then, the u-bit private key d is expressed by the equation (2.1).

$$d=d[u-1]\| \ldots \|d[1]\|d[0] \quad (2.1)$$

where "||" indicates the concatenation of the bit strings of the length of 1 bit or more.

Then, the equation (2.2) is obtained from the equation (2.1).

$$dA = 2^{u-1}d[u-1]A + \ldots + 2^1 d[1]A + 2^0 d[0]A \quad (2.2)$$

The binary method is a calculating procedure using the equation (2.2). In the equation (2.2), the bit value d[i] of d is scanned sequentially from the more significant bits to the less significant bits (that is from i=u−1 to 0), and the following equation (2.3) is executed depending on the bit value d[i] of d.

When d[i]=1, an addition(v:=v+a) is performed after doubling(v:=2×v).

When d[i]=0, only the doubling(v:=2×v) is performed. (2.3)

For example, when the case in which the private key d is $(1100101)_2$ is concretely described, the binary method realizes the scalar multiplication by the equation (2.4).

$$dA = 2(2(2(2(2(2(2O+A)+A)))+A))+A = 2^6 A + 2^5 A + 2^2 A + A \quad (2.4)$$

That is, when the result of the scalar multiplication is expressed by the variable V, the variable V is initialized first by the infinite point of 0 as indicated by the equation (2.5) in the binary method (line 301 in FIG. 3)

$$V=O \quad (2.5)$$

Then, the equation (2.3) is executed sequentially from the MSB to the LSB (the loop process in lines 302 through 305 in FIG. 3). That is, 2V is obtained by the doubling (line 303 in FIG. 3). If d[i]=1, the addition of the point A is performed, and the obtained result is substituted for the variable V (line 304 in FIG. 3). The process is repeatedly performed. Then, the value finally obtained as the variable V is output (line 306 in FIG. 3). "ECDBL(V)" in line 303 in FIG. 3 indicates the function process for calculating the doubling of 2V for the value of variable V. "ECADD(V,A)" in line 304 in FIG. 3 indicates the function process for adding the value of the variable A to the value of the variable V.

Concretely, since d[6]=1 holds true, the doubling and the addition are performed corresponding to the 6th bit by the equation (2.6) (D6 and A6 in FIG. 4).

$$V=2O+A \quad (2.6)$$

Then, since d[5]=1 holds true, the doubling and the addition are performed corresponding to the 5th bit by the equation (2.7) (D5 and A5 in FIG. 4).

$$V=2(2O+A)+A \quad (2.7)$$

Since d[4]=0 holds true, only the doubling is performed on the 4th bit by the equation (2.8), and no addition is performed (D4 in FIG. 4).

$$V=2(2(2O+A)+A) \quad (2.8)$$

Similarly, since d[3]=0 holds true, only the doubling is performed on the 3rd bit and no addition is performed by the equation (2.9) (D3 in FIG. 4).

$$V=2(2(2(2O+A)+A)) \quad (2.9)$$

Since d[2]=1 holds true, the doubling and the addition are performed on the 2nd bit by the equation (2.10) (D2 and A2 in FIG. 4).

$$V=2(2(2(2(2O+A)+A)))+A \quad (2.10)$$

Since d[1]=0 holds true, only the doubling is performed on the next 1st bit and no addition is performed by the equation (2.11) (D1 in FIG. 4).

$$V=2(2(2(2(2(2O+A)+A)))+A) \quad (2.11)$$

Then, since d[0]=1 holds true, the doubling and the addition are performed on the last 0th bit by the equation (2.12) (D0 and A0 in FIG. 4).

$$V=2(2(2(2(2(2O+A)+A)))+A))+A \quad (2.12)$$

As described above, the coefficient of the point A added corresponding to the i-th bit where d[i]=1 holds true is $2^i$ as understood from the equation (2.12). Therefore, V=dA is obtained by the equation (2.4) without fail in the procedure exemplified by the equations (2.5) through (2.12).

As clearly indicated by the example above, the frequency of the doubling is equal to the bit length u of the private key d, and the frequency of the addition is equal to the Hamming weight of the private key d in the binary method. Therefore, the computational complexity of the scalar multiplication in the binary method is suppressed not by the order of $2^u$, but by the order of u.

In the binary method, the arithmetic sequence of the doubling and the addition directly depends on the bit value of d, and the SPA discloses d using the feature. That is, as illustrated by the power waveform example in FIG. 5, in the environment in which the difference in process between the addition and the doubling of a point, the following disclosure may be performed. That is, if the addition is performed after the doubling, the bit value of the index d is disclosed into 1 (501 or 503 in FIG. 5). On the other hand, if only the doubling is performed, the bit value of the index d may be disclosed into 0 (502 in FIG. 5). The SPA is successfully performed by performing the disclosure on all bits of d.

A method of obtaining a constant arithmetic pattern of the addition and the doubling regardless of the bit value of d is well known as a countermeasure against the SPA, and the window method described later is also a method of realizing the countermeasure.

The binary method is also weak against the DPA attack. For easy understanding of the explanation about the security against the DPA attack, the basic idea of the DPA attack is described below.

The binary method finally calculates dA while incrementing by 1 the bit of the scalar value (d) from more significant bits as indicated by the following equation to calculate the dA for d=d[u−1]‖ . . . ‖d[1]‖d[0] (equation (2.1)).

$$d[u-1]A \to (d[u-1]\|d[u-2])A \to (d[u-1]\|d[u-2]\|d[u-3])A \to$$

Each time the loop process (302 through 305 in FIG. 3) relating to the variable i illustrated in FIG. 3 is performed once, the calculation result with the index incremented by 1 bit is stored in the variable V.

For example, when d=(1101)2 holds true, the calculation is performed by the following equation.

$$(1)_2 A \to (11)_2 A \to (110)_2 A \to (1101)_2 A$$

The attacker who performs the DPA repeats identifying whether or not the bit-by-bit prediction of the bits of d using the feature of the binary method of "calculating the bit value of a scalar value while incrementing by 1 the bit value" is correct by a power waveform. In the case of an attack by a common round-robin method, the disclosure of a private key requires the operation proportional to the value of d while the DPA may disclose a private key with the operation proportional to the value of $\log_2 d$.

For example, when the most significant bit of d is 0, the data value expressed by 0A (mod n) is calculated in the cryptography device, and loaded and stored in the internal memory. On the other hand, when the most significant bit of d is 1, the data value expressed by 1A (mod n) is calculated in the cryptography device, and loaded and stored in the internal memory.

It is a well-known feature that common hardware including a cryptography device consumes the power proportional to the Hamming weight ('1') of a loaded and stored data value, and the DPA may discriminate whether the loaded and stored data value is 1A or 0A by using the feature. As a result, to disclose a bit value less significant by 1 after knowing that, for example, the most significant bit of d is 1, it is discriminated using a similar procedure whether the loaded and stored data value is $(10)_2 A$ or $(11)_2 A$.

The concrete procedure of the DPA is described below in (DPA-1) through (DPA-6).

(DPA-1) The power consumption $Pow_j(t)$ (j=1, 2, . . . , L) obtained by inputting $V=M_j$ (j=1, 2, . . . , L) as a ciphertext V is measured. The character t indicates time information.

(DPA-2) The initialization is performed as i:=u−1.

(DPA-3) The attacker predicts the bit value of d[i].

(DPA-4) The attacker calculates the value of the following equation for each of j=1, 2, . . . , L from the known $M_j$, d[u−1]‖ . . . ‖d[i+1] and the predicted d[i].

$$G_j = (d[u-1]\| \ldots \|d[i+1]\|d[i])M_j$$

Depending on the result of the calculation above, L pieces of power consumption data $Pow_j(t)$ are classified into two groups.

Group 1: a set of $Pow_j(t)$ in which the least significant bit of the x coordinate (or y coordinate whichever is regarded) of $G_j$ is 1 for $M_j$.

Group 0: a set of $Pow_j(t)$ in which the least significant bit of the x coordinate (or y coordinate whichever is regarded) of $G_j$ is 0 for $M_j$.

(DPA-5) For the grouped power consumption data as described above, a differential waveform Diff(t) expressed as follows is generated.

(Average of $Pow_j(t)$belonging to group1)−(Average of $Pow_j(t)$belonging to group0)

Figure 6:
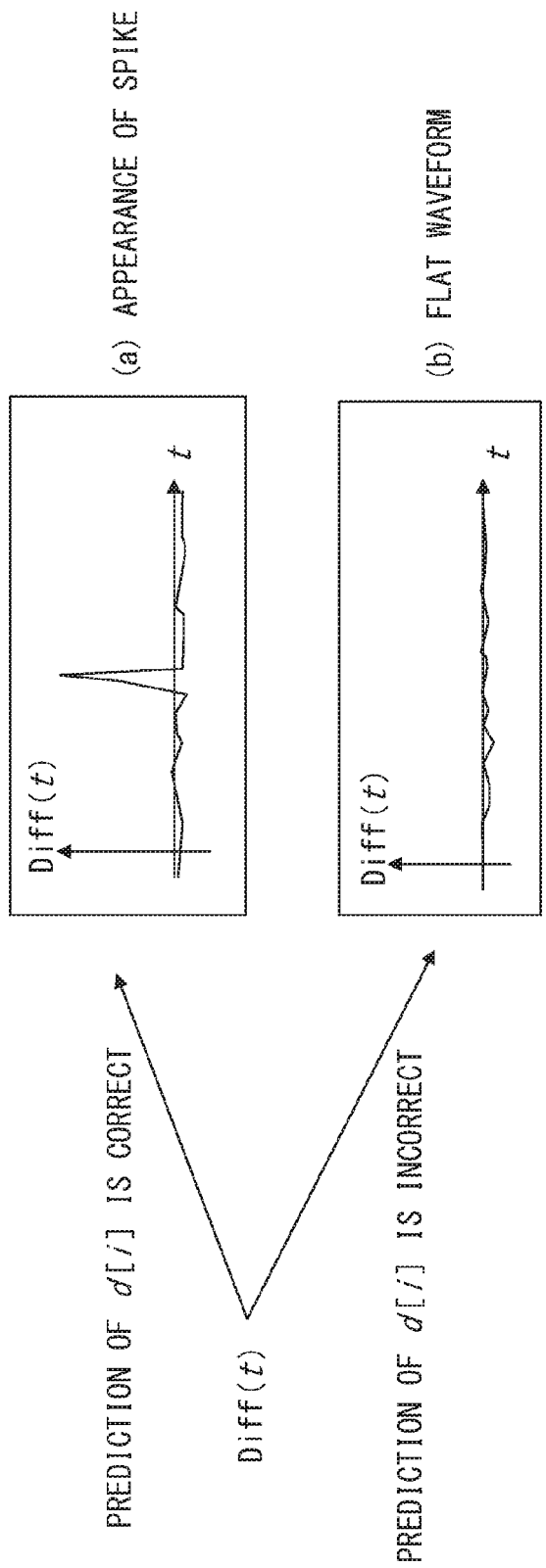
FIG. 6 is an explanatory view of an operation of judging a private key bit by a differential waveform in the DPA.

As a result, when the spike as illustrated by (a) of FIG. 6 appears in the differential waveform, it is judged that the predicted d[i] is correct. When the flat waveform as illustrated by (b) of FIG. 6 appears, it is judged that the predicted k[i] is incorrect.

(DPA-6) When the calculation i:=i−1 is performed, and i≤0 is obtained, there is still a non-disclosed bit, thereby returning control to (DPA-3). When i<0 is obtained, all bit values of display have been disclosed, thereby terminating the process.

When the prediction of d[i] is correct in DPA-5, the group 0 of the power consumption in which the least significant bits of the x coordinates (y coordinates) of the data values expressed by $G_j$ are all "0" is subtracted from the group 1 of the power consumption in which the least significant bits of the x coordinates (y coordinates) are all "1", and therefore the power consumption difference of "0" and "1" appears as the spike ((a) in FIG. 6). When the prediction of d[i] is incorrect, the least significant bit of the x coordinate (y coordinate) of $G_1$ includes the mixture of "0" and "1" in the groups 0 and 1. Accordingly, there is no difference in power consumption, and a flat waveform appears ((b) in FIG. 6).

Figure 7:
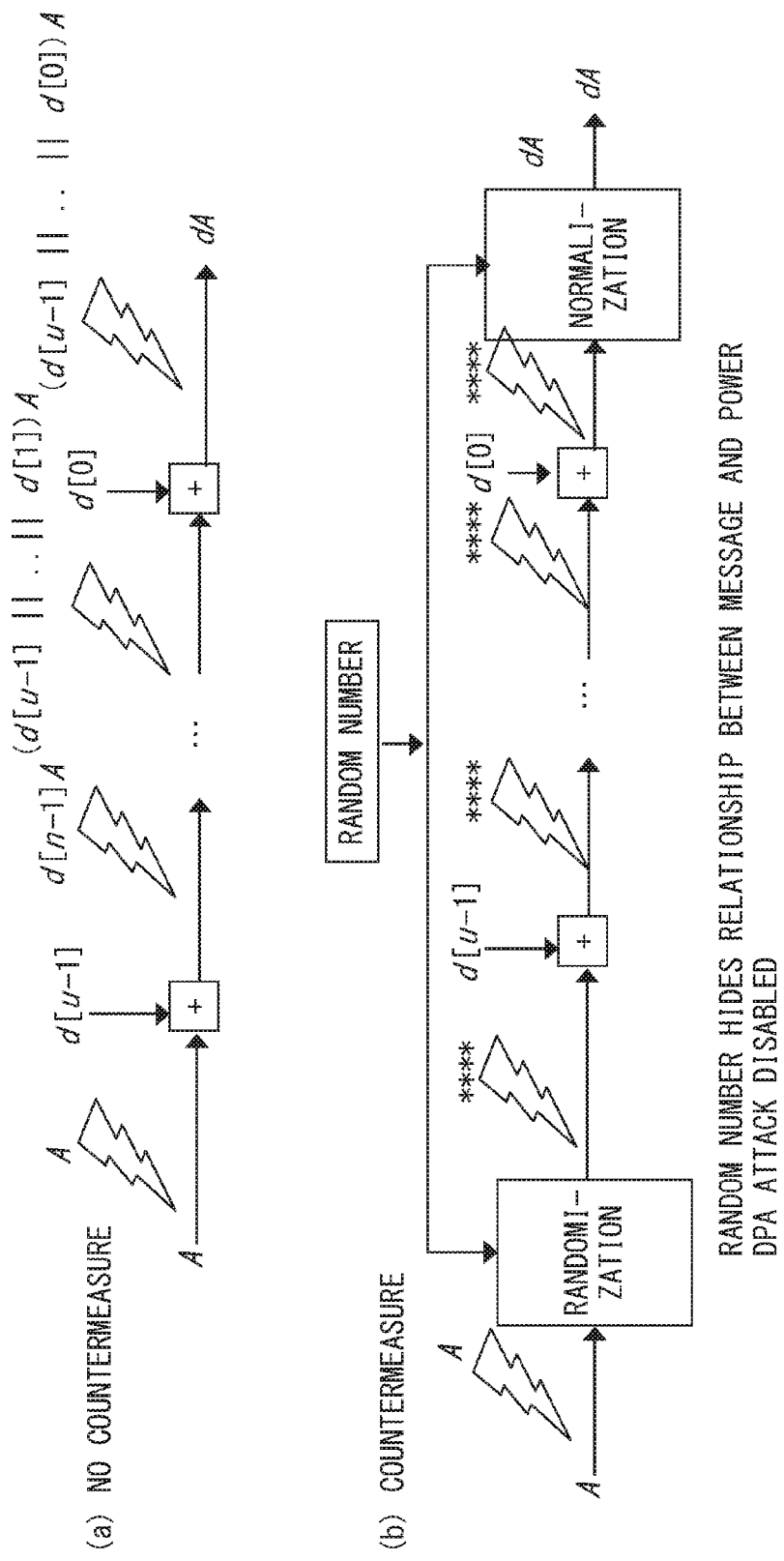
FIG. 7 is an explanatory view of the DPA countermeasure by randomizing data.

As a countermeasure for the DPA, a method of randomizing data as illustrated in FIG. 7 is well known. When there is no countermeasure against the DPA, the behavior as illustrated in (a) in FIG. 7 occurs. That is, the sequence of the calculation data value d[u−1]A→(d[u−1]∥d[u−2])A→(d[u−1]∥d[u−2]∥d[u−3])A→ . . . is uniquely determined from the value of the private key d[i]. On the other hand, as illustrated in (b) in FIG. 7, the sequence values of the calculation data are randomized by disturbing the calculation data value using random numbers. Therefore, the relationship between the power consumption and the private key is hidden, thereby realizing a safe process against the DPA. At the final stage of the operation, a normalizing process is performed for correcting the randomized data, and the scalar multiplication value of dA is finally obtained. In the method (third comparison example) called a "randomized window method" described later, a countermeasure against the SPA is realized based on the window method, and the countermeasure against the DPA may be simultaneously realized by using randomized data in combination.

<Countermeasure Against the PA by Modular Exponentiation Processing Using Window Method (Second Comparison Example)>

As one of the countermeasures against the SPA, a window method is known. As the second comparison example, FIG. 8 illustrates the scalar multiplication algorithm of a point of the ECC, and FIG. 9 illustrated the outline of the window method. While a private key d is scanned bit by bit in the binary method, it is scanned every k bits in the window method. For example, when the scalar multiplication is performed on the point for d=(101001)$_2$, the calculation is performed separately in the following order.
Binary method: 1A→(10)$_2$A→(101)$_2$A→(1010)$_2$A→(10100)$_2$A→(101001)$_2$A 3-bit window method: (101)$_2$A→(101001)$_2$A To perform the operation for every k bits, a private key d is divided into k-bit sections. It is performed by storing the divided k-bit values in w[i] in the process illustrated in line 806 in FIG. 8.

In the subsequent line 807, the adding process is performed using table data tab[w[i]] with w[i] defined as an index value. The table data is expressed as tab[x], and is the data given by calculating in advance the data expressed as tab[x]=xA for each of $2^k$ pieces of data of x=0.1, . . . , $2^k$−1. The value for determination of the table data indexed in the window method such as w[i] is referred to as a window value, and the sequence of window values such as w[m−1], w[m−2], . . . , w[0] is referred to as a window sequence.

In the binary method, the "doubling and addition" or the "doubling" is performed depending on the bit value in the binary method for each bit of a private key d as exemplified in equations (2.5) through (2.12). On the other hand, in the window method, the process of "k times of doubling and one addition" is constantly performed independent of the bit value for every k bits of a private key d. Therefore, although the power consumption waveform of the doubling is different from the power consumption waveform of the addition, the scalar multiplication in the window method is secure against the SPA attack.

For convenience of explanation below, it is assumed that the bit count u of a private key d may be divided by window size k. That is, if m=u/k, m is an integer. For each i in 0≤i≤(m−1), the i-th window value w[i] is defined by the equation (4.1) (line 806 in FIG. 8).

$$w[i]=d[ik+k-1]\| \ldots \|d[ik] \quad (4.1)$$

The meaning of "[i]" in the notation of "w[i]" indicating the i-th window value is different from the meaning of "[i]" in the notation of "d[i]" indicating the i-th bit of a private key d. However, since the meaning of "[i]" is clear from the context, the notation such as "w[i]" is appropriately used in the following descriptions.

For example, when the window size k is assigned 3 bits, and the private key d is (011111101)$_2$, the window value is expressed by the following equations (4.2) through (4.4).

$$w[2]=(011)_2=3 \quad (4.2)$$

$$w[1]=(111)_2=7 \quad (4.3)$$

$$w[0]=(101)_2=5 \quad (4.4)$$

As described above, in the window method, a scalar multiple xA is calculated in advance for each x in 0≤x≤$2^k$−1 using the coordinates of the point A given as a target of the scalar multiplication. Then, the calculated scalar multiple xA is stored in the memory as associated with the index x (lines 802 and 803 in FIG. 8). The scalar multiple xA associated with the index x is expressed as tab [x] as described above, and tab [x] (=xA) is also referred to as "table data". In more detail, the table data tab [x] is expressed by a set of x coordinate and y coordinate of the scalar multiple xA.

When the window size k is assigned 3 bits, the index x may have eight values of (000)$_2$, (001)$_2$, (010)$_2$, (011)$_2$, (100)$_2$, (101)$_2$, (110)$_2$, (111)$_2$. Therefore, the table data may have eight values as illustrated in (b) in FIG. 9. Tab [(000)$_2$] (expressed as tab[000] in FIG. 9) may be (000)$_2$A=infinite point 0 (line 802 in FIG. 8).

As a practical calculating process on the table data tab[x] corresponding to the index x, xA=(x−1)A+A holds true. Therefore, the process of adding A to the table data tab[x−1] corresponding to the index x−1 may be repeatedly performed from x=1 to $2^k$−1. The calculation is performed according to line 803 in FIG. 8. The meaning of "ECADD" is the case according to line 304 in FIG. 3. The initial value of the table data corresponding to x=0 is calculated as tab[0]=tab[(000)$_2$]=O in line 802 in FIG. 8.

In the window method, the calculation of the point dA is performed using the table data by the equation (4.5).

$$dA=2^3(2^3(2^3(O)+\text{tab}[(011)_2])+\text{tab}[(111)_2])+\text{tab}[(101)_2] \quad (4.5)$$

To be more concrete, when the result of the scalar multiplication on the scalar value and the point A is expressed by variable V, the variable V is first initialized by the infinite point 0 by the equation (4.6) (line 801 in FIG. 8).

$$V=O \quad (4.6)$$

Afterwards, after the process of generating the table data in lines 802 and 803 described above, the subsequent loop processing (from line 804 to line 808 in FIG. 8) is performed sequentially from i=m−1 to i=0. That is, the process of "performing the doubling k times (that is, three times) (line 805 in FIG. 8, adding tab[w[i]] (lines 806 and 807 in FIG. 8), and substituting the obtained result to the variable V (line 807 in FIG. 8)" is performed. The meaning of "ECDBL" in line 805 in FIG. 8 is the same as the case in line 303 in FIG. 3.

To be more concrete, the doubling is performed three times, and the addition is performed once by the equation (4.7) on the window value w[2] (D2 and A2 in FIG. 9).

$$V=2^3(O)+\text{tab}[(011)_2] \quad (4.7)$$

Next, the doubling is performed three times, and the addition is performed once by the equation (4.8) on the window value w[1] (D1 and A1 in FIG. 9).

$$V=2^3(2^3(O)+\text{tab}[(011)_2])+\text{tab}[(111)_2] \quad (4.8)$$

Finally, the doubling is performed three times, and the addition is performed once by the equation (4.9) on the window value w[0] (D0 and A0 in FIG. 9).

$$V=2^3(2^3(2^3(O)+\text{tab}[(011)_2])+\text{tab}[(111)_2])+\text{tab}[(101)_2] \quad (4.9)$$

Since the table data used in the window method is to be calculated depending on the input value, the data is stored in the RAM. That is, the larger the bit length k of the window is, the larger the number of tables becomes, thereby increasing the necessary RAM size.

Figure 10:
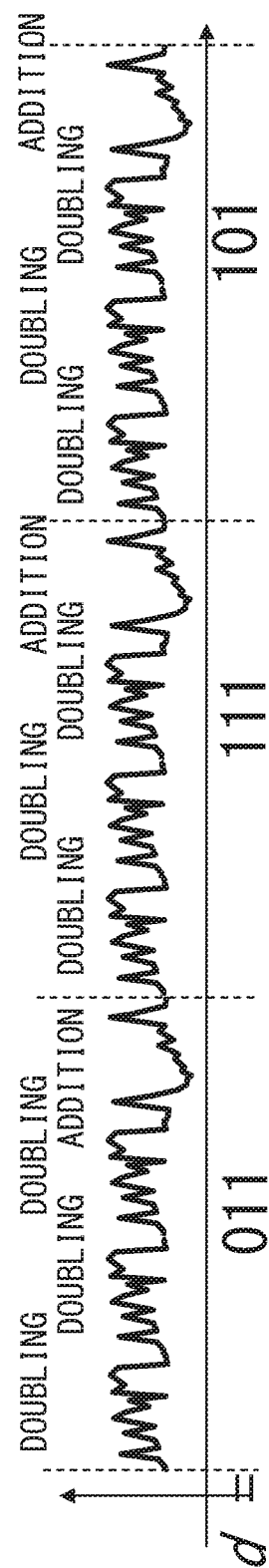
FIG. 10 is an example of a power waveform using the SPA for the window method.

Unlike the binary method, in the window method, the process of performing the doubling k times and performing the addition once is constantly repeated on a point regardless of the bit value (scalar value) of a private key d. Therefore, as illustrated in FIG. 10, a private key is not disclosed from the waveform of the doubling and addition on a point, thereby maintaining security against the SPA.

<Countermeasures Against SPA and DPA by Randomized Window Method (Third Comparison Example)>

Although the SPA may be suppressed by the window method, the DPA is not suppressed. In the procedure of the DPA by the above-mentioned (DPA-1) through (DPA-6), whether or not the prediction is correct is repeatedly identified by a power waveform while predicting the bit of d for each bit. Based on this, if identifying whether or not the prediction is correctly made by a power waveform is repeated as with the case of 1 bit while predicting the bit of d for every k bits in the window method, then the application of the DPA to the window method may be realized. Although the computational complexity increases, many k bit values in the window method may be processed by repeating the process while varying the bit number corresponding to the predicted k.

On the other hand, there is a well known method of simultaneously suppressing the SPA and DPA by randomizing data in the window method (Patent Document 2). This method is called a randomized window method. FIG. 11 illustrates the difference between the window method as the second comparison example and the randomized window method as the third comparison example.

In the randomized window method, table data is randomized by a temporary random number.

That is, in the table data in the common window method, table data is uniquely assigned from the index value x such as tab [x]=xA. On the other hand, in the randomized window method, table data is randomized using a random number s which varies each time the scalar multiplication of a point is performed once such as tab[x]=$(2^b x+s)$A (where s indicates a small integer satisfying a b bit random number).

Since the data is randomized when the scalar multiplication of a point is calculated by randomizing table data, it is difficult to predict each bit of a private key d, thereby maintaining security against the DPA. That is, the relationship between the contents of data and the power consumption is hidden by the randomization. Thus, the differential waveform is not changed by the correctness or incorrectness of the prediction of a bit value by an attacker. Furthermore, like the window method, the operation pattern of the doubling and the addition of a point is constantly uniform regardless of a private key d, thereby maintaining the security also against the SPA.

As illustrated in FIG. 11, a window sequence w[i] is generated from the private key d in the common window method ((a) in FIG. 11). On the other hand, in the randomized window method, a window sequence w[i] and a correction value d' are generated from the private key d and the random number s ((b) in FIG. 11). The correction value d' is to randomize the intermediate data in the course of an operation and adjust the final operation result into dA.

To be more concrete, for example, the index value is processed in the scalar multiplication as is for each of the index values $(00)_2$, $(01)_2$, $(10)_2$, $(11)_2$ in the k=2 bit window sequence, thereby calculating table data in the common window method as illustrated in (a) of FIG. 11. That is, $(00)_2$A, $(01)_2$A, $(10)_2$A, $(11)_2$A (expressed as "00A, 01A, 10A, 11A" in the attached drawings) are calculated as table data. When the scalar multiplication is actually performed, table data is acquired with a window sequence segmented for every k bits from a private key d as an index, thus performing the adding process.

On the other hand, in the randomized window method, window sequences w[2], w[1], w[0] and a correction value d' are generated from the private key d and the b bit random number s which is different for each scalar multiplication operation as illustrated in (b) of FIG. 11. The correction value d' is to adjust the final operation result into dA while randomizing the intermediate data in the course of the operation. That is, first to generate table data, a b bit random number string, for example, each bit string obtained by concatenating $(011)_2$ is generated on the side of a bit string which may appear as the above-mentioned window sequence, for example, on the less significant bit side of each bit string of $(00)_2$, $(01)_2$, $(10)_2$, $(11)_2$. For example, $(00011)_2$, $(01011)_2$, $(10011)_2$, $(11011)_2$ are generated. Then, the table data obtained by performing scalar multiplication on each of the bit strings, for example, $(00011)_2$A, $(01011)_2$A, $(10011)_2$A, $(11011)_2$A (expressed as (00011)A, (01011)A, (10011)A, (11011)A in the figure) is calculated in advance. Each calculation result is stored in a table entry using a bit string which may appear as the window sequence, for example, $(00)_2$, $(01)_2$, $(10)_2$, $(11)_2$ as an index value. When the scalar multiplication operation is actually performed, the table data using the window sequences w[2], w[1], w[0] generated by the above-mentioned private key d and random number S as an index is acquired, thus performing the adding process.

Finally, the result obtained by performing the scalar multiplication using a correction value d' generated from the above-mentioned private key d and random number s is further added to the final addition result, thereby making an adjustment so that a requested scalar multiplication value dA may be acquired.

Assume that the equation (5.1) holds true with the number of bits of the random number s defined as b, m as an integer, and the number of bits of the private key d as u.

$$u=b+km \quad (5.1)$$

It is preferable that the number of bits of the random number S is, for example, 30 or less. For example, assuming that the private key d is 378=$(101111010)_2$, u=9. Furthermore, assume that the window size k is 2, b is 3, and the random number s is $3=(011)_2$. In this case, m=3 by the equation (5.1). In the randomized window method, the k bit window value w[i] is calculated on each i in $0 \leq i \leq (m-1)$, and the b bit correction value d' is calculated so that the equation (5.2) may hold true.

[math 1]

$$d = d' + \sum_{i=0}^{m-1} 2^{ki}(w[i] \| s) \quad (5.2)$$

Since the random number s is assigned b bits, the equation (5.3) is acquired from the equation (5.2).

[math 2]

$$d = d' + \sum_{i=0}^{m-1} 2^{ki+b}(w[i] + 2^{ki}s) \quad (5.3)$$

The equation (5.4) is acquired by the transposition of terms from the equation (5.3).

[math 3]

$$d - \sum_{i=0}^{m-1} 2^{ki}s = d' + \sum_{i=0}^{m-1} 2^{ki+b}(w[i]) \quad (5.4)$$

The left side of the equation (5.4) indicates the value calculated from the private key d and the random numbers. Then, the right side of the equation (5.4) indicates that the window sequence is acquired by segmenting the value calculated by the left side of the equation (5.4) in k bit units from the most significant bit, and that the 0 through b+k b least significant bits of the value calculated by the left side of the equation (5.4) are the correction value d'. FIG. 12 illustrates the scalar multiplication algorithm of a point using the randomized window method.

First, the infinite point of 0 is set as an initial value in the variable V (line 1201 in FIG. 12).

Next, the b bit random number s is generated (line 1202 in FIG. 12).

Using the generated random number s and the coordinates of the point A to be processed in the scalar multiplication, the table data of the equation (5.5) is calculated according to the algorithm below on each x in $0 \leq x \leq 2^k - 1$ as associated with the index x in advance, and the calculation result is stored in the memory.

$$\text{tab}[x] = (2^b x + s)A \quad (5.5)$$

First as the calculation algorithm, as the initial value, the index 0, for example, the table data tab [0] for $(00)_2$ is calculated as tab [0]=sA (line 1203 in FIG. 12). The ground for the calculation is that the scalar multiplication for the window sequence $(00\|s)_2$ obtained by concatenating the random number s to $(00)_2$ is $(00\|s)_2 A = sA$.

Next, using tab [0] as an initial value, the calculation of the table data tab [x] corresponding to the sequentially incremented index x is performed. The calculating process is performed as follows. That is, the bit string processed in the scalar multiplication is first $(x\|s)_2$. Then, the equation $(x\|s)_2 A = (x-1\|s)_2 A + sA$ holds true. Therefore, the table data tab [x] for the index x may be calculated by repeatedly performing the process of adding $2^b A$ to the table data tab[x-1] corresponding to the index x-1 from x=1 to $2^k - 1$. The calculation is performed according to line 1204 in FIG. 12.

For example, when b=3 and $s=(011)_2=3$ hold true as described above, the memory stores the data of the following equations (5.6) through (5.9) as table data.

$$\text{tab}[(00)_2] = \text{tab}[0] = (2^3 \times 0 + 3)A = 3A \quad (5.6)$$

$$\text{tab}[(01)_2] = \text{tab}[1] = (2^3 \times 1 + 3)A = 11A \quad (5.7)$$

$$\text{tab}[(10)_2] = \text{tab}[2] = (2^3 \times 2 + 3)A = 19A \quad (5.8)$$

$$\text{tab}[(11)_2] = \text{tab}[3] = (2^3 \times 3 + 3)A = 27A \quad (5.9)$$

Next, the window sequences w[m−1], . . . , w[0] and the correction value d' are calculated with the private key d and the random number S as input by the above-mentioned equation (5.4) (line 1205 in FIG. 12).

For example, when $d=378=(101111010)_2$ holds true and the random number s is $3=(011)_2$, the left side of the equation (5.4) is calculated by the equation (5.10).

$$378-(2^0 \times 3 + 2^2 \times 3 + 2^4 \times 3) = 378 - (3+12+48) = 315 = (100111011)_2 \quad (5.10)$$

Therefore, the window sequences w[2], w[1], w[0] are obtained by segmenting the value $(100111011)_2$ obtained by the equipment (5.10) in 2-bit units. In addition, the correction value d' is obtained from the b=3 least significant bits of the value $(100111011)_2$. Concretely, it is obtained by the equations (5.11) through (5.14).

$$w[2] = (10)_2 = 2 \quad (5.11)$$

$$w[1] = (01)_2 = 1 \quad (5.12)$$

$$w[0] = (11)_2 = 3 \quad (5.13)$$

$$d' = (011)_2 = 3 \quad (5.14)$$

In the randomized window method, the window sequence w[i] $(0 \leq i \leq m-1)$ and the correction value d' are calculated as described above.

As described above, after obtaining table data, a window sequence, and a correction value, the scalar multiplication dA of the point A is actually performed. In more detail, the following loop process (from line 1206 to line 1209 in FIG. 12) is performed from i=m−1 to i=0, and then the process in line 1210 is finally performed. That is, as the loop process, the process of performing doubling k times (for example, three times) (line 1207 in FIG. 12), adding tab [w[i]], and substituting the obtained result for the variable V (line 1208 in FIG. 12) is performed. Then, after the loop process, the scalar multiplication d' A is calculated by the correction value d', and the calculation result is added to the variable V (line 1210 in FIG. 12).

Concretely, for example, the calculation by the following equation (5.15) is performed.

$$\begin{aligned} dA &= 2^2(2^2(2^2(O) + \text{tab}[w[2]]) + \text{tab}[w[1]]) + \text{tab}[w[0]] + d'A \quad (5.15) \\ &= 4(4(4(O) + 19A) + 11A) + 27A + 3A \\ &= 4(4(O + 19A) + 11A) + 27A + 3A \\ &= 4(4(19A) + 11A) + 27A + 3A \\ &= 4(76A + 11A) + 27A + 3A \\ &= 4(87A) + 27A + 3A \end{aligned}$$

$$= 348A + 27A + 3A$$
$$= 378A$$

Since the correction value d' in the equation (5.14) is calculated by the equation (5.4) to satisfy the equation (5.2), dA (that is, 378A in this example) is obtained by the calculation by the equation (5.15).

By the equation (5.15), the process of performing the doubling k times (k=2 in the example above) and performing the addition once is repeated m times (m=3 in the example above) regardless of the bit value of the private key d, and the scalar multiplication is performed once using the correction value d' and the addition of the point A is performed. Therefore, the randomized window method is secure as with the window method against the SPA attack. Furthermore, since the table data is randomized by the random number s, the randomized window method is also safe against the DPA attack.

<Reduction of Table Data by Signed Window Method (Fourth Comparison Example)>

In the window method or the randomized window method, $2^k$ entries are generated in the table depending on the window size k. On the other hand, in a certain type of device such as an incorporated equipment unit which has a small memory capacity, it is preferable that the amount of the used memory is reduced to perform various processes.

An example of the incorporated equipment unit is a smart card. Another example of the incorporated equipment unit is a part authenticated by an electronic equipment unit such as a printer etc. For example, to remove a forged product, a large scale integration (LSI) called a "authentication chip" may be incorporated into an accessory part such as a secondary battery, a printer cartridge, etc. The authentication of a printer cartridge by a printer may be performed to disable the printing on, for example, a printer cartridge other than a standard product. Obviously, the incorporated equipment unit includes many other various types.

For example, especially in a device such as a smart card, a printer cartridge with an authenticating function, etc., the available memory capacity is small. Therefore, it is preferable to use a process algorithm with a reduced amount of used memory in a scalar multiplication.

Then, as the fourth comparison example, the signed window method is described below. The signed window method is secure against the SPA attack as with the window method, and requires less amount of used memory than the window method.

The above-mentioned window method may be applied to RS cryptography (modular exponentiation operation), but there is a method of reducing the table data approximately by half by specializing the process into the ECC (scalar multiplication of a point). It is a method called a "signed window method".

That is, the signed window method is a medium in which the process load of the calculation for obtaining an inverse element point of −A from the point A on an elliptical curve is relatively light (that is, the calculation cost of the inverse element is low) (refer to equations (1.4) and (1.5), and the description of them).

FIG. 13 illustrates the comparison between the common window method ((a) in FIG. 13) and the signed window method ((b) in FIG. 13). When the bit length of the window is k, $2^k$ pieces of table data is required for the bit length k of the window in the common window method. On the other hand, in the signed window method, the size of the RAM required to store the table data may be halved because $2^{k-1}+1$ pieces of table data is acceptable.

In the case of the 3-bit window method illustrated in (a) of FIG. 13, eight pieces of table data, that is, 0A, 1A, . . . , 7A, are required. On the other hand, in the case of the 3-bit signed window method illustrated in (b) of FIG. 13, five pieces of table data, that is, 0A, 1A, . . . , 4A are required. That is, the 3-bit signed window method may reduce three pieces of table data as compared with the 3-bit window method. In the common window method, a private key d is divided into k-bit units as window values as is. On the other hand, in the signed window method, the private key dissimilarly divided into k-bit units. However, when the value is a constant value ($2^{k-1}$ or $2^{k-1}+1$ or more), $2^k$ is subtracted from the window value (correcting the window). To cancel the negative influence, 1 is added to the window value which is one more significant window value (carry correction). In the case of the 3-bit signed window method in (b) of FIG. 13, in each window value obtained by the 3-bit division, 8 is subtracted from the window value if it is four or more. By the subtraction, 4A, 5A, 6A, and 7A are changed into −4A, −3A, −2A, and −1A. However, the calculation may be performed by executing the subtraction of a point using the table data of 4A, 3A, 2A, and 1A, thereby requiring no table of 5A, 6A, and 7A.

The scalar value obtained by subtracting $2^k$ from the window value, that is, the window value $-2^k$ is $-(2^k-$window value). Then, ($2^k$−window value) is equal to the complement of 2 for the window value. Therefore, (window value$-2^k$) is −(complement of 2 for the window value). That is, the scalar multiplication value of the point A using the scalar value obtained by subtracting $2^k$ from the window value is equal to the value obtained by adding a minus sign to the operation result of the scalar multiplication of the point A using the complement of 2 for the window value as a scalar value. When the window value is $2^{k-1}$ or $2^{k-1}+1$ or more, the complement of 2 is necessarily $2^{k-1}$ or less or $2^{k-1}-1$ or less.

The $2^{k-1}A$ is calculated from the scalar multiplication value 0A for $2^{k-1}+1$ scalar values whose window values are 0 through $2^{k-1}$ in advance, and stores the results in each entry of the table using each of the window values 0 through $2^{k-1}$ as an index value. The scalar multiplication value of the point A using the scalar value obtained by subtracting $2^k$ from the window value in the case in which the window value is $2^{k-1}$ or $2^{k-1}+1$ or more may be obtained as follows. That is, the table storing $2^{k-1}A$ is referred to and an operation result of a corresponding scalar multiplication value is acquired from the operation result OA of the above-mentioned $2^{k-1}+1$ scalar multiplication values using the complement of 2 corresponding to the window value as an index value, and a minus sign is added to the acquisition result. Obviously, when the window value is $2^{k-1}+1$ or less than $2^{k-1}+1$, the operation result of the corresponding scalar multiplication value may be acquired by referring to the table storing $2^{k-1}A$ from the operation result OA of the $2^{k-1}+1$ scalar values using the window value as is as an index value. Thus, the table size may be reduced to $2_{k-1}+1$.

For example, assume that the window size k is 3. Then, the number of indexes used in the signed window method is five, that is, 0, 1, 2, 3, and 4. The table data corresponding to the five indexes is 0A, 1A, 2A, 3A, and 4A. In the signed window method, the table data 5A, 6A, and 7A corresponding to the three indexes 5, 6, and 7 are omitted by using the relationship among the subsequent equations (6.1) through (6.3).

$$5A = 2^k A - 3A = 8A - 3A \quad (6.1)$$

$$6A = 2^k A - 2A = 8A - 2A \quad (6.2)$$

$$7A = 2^k A - 1A = 8A - 1A \quad (6.3)$$

For example, assume that the window size k is 3 bits, and the private key d is $241=(011110001)_2$. In the signed window method, first as with the window method, a provisional window value is obtained. That is, the provisional window value is expressed by the following equations (6.4) through (6.6). Since there is no possibility of disorder, the provisional window value and an actually determined window value are both expressed as w[i].

$$w[2] = (011)_2 = 3 \quad (6.4)$$

$$w[1] = (110)_2 = 6 \quad (6.5)$$

$$w[0] = (001)_2 = 1 \quad (6.6)$$

Then, the provisional window value is scanned sequentially from the least significant bit (that is, w[0]), and each window value is determined as follows. That is, if $w[i] \geq 2^{k-1}+1$ holds true, the value obtained by subtracting $2^k$ from the provisional window value w[i] (that is, $w[i]-2^k$) is set as a window value w[i]. When $2^k$ is subtracted from the i-th provisional window value w[i], 1 is added to the one more significant provisional window value w[i+1] to cancel the influence of the subtraction.

In the following description, the above-mentioned subtraction of $2^k$ is referred to as "window correction", and the above-mentioned addition of 1 is referred to as "carry correction". The condition of $w[i] \geq 2^{k-1}+1$ above may be replaced with the condition of $w[i] \geq 2^{k-1}$, but for convenience of explanation below, it is assumed that the condition of $w[i] \geq 2^{k-1}+1$ is used.

The actual window value may be obtained from the provisional window value in equations (6.4) through (6.6) as follows.

That is, by the equation (6.6), $w[0] < 2^{k-1}+1$ holds true. Therefore, the 0-th (that is, the least significant) window value w[0] is 1 as with the provisional window value.

By the equation (6.5), $w[1] \geq 2^{k-1}+1$ holds true. Therefore, the first window value is obtained by subtracting 8 ($=2^k$) from the provisional window value 6, and determined as w[i]=−2. Accordingly, 1 is added to the provisional window value w[2] in the equation (6.4) by carry correction, thereby obtaining w[2]=4.

The provisional window value w[2]=4 which has been carry-corrected satisfies the expression $w[2] < 2^{k-1}+1$. Therefore, the second (that is, the most significant) window value is determined as w[2]=4.

Using the window values w[0] through w[2] determined as described above, the point dA is calculated by the equation (6.7) in the signed window method.

$$dA = 2^3(2^3(2^3(O) + \text{tab}[w[2]]) - \text{tab}[-w[1]]) + \text{tab}[w[0]] \quad (6.7)$$

To be more concrete, when the result of the scalar multiplication is expressed by the variable V, the variable V is first initialized by the infinite point 0 by the equation (6.8).

$$V = O \quad (6.8)$$

Afterwards, the process of performing the doubling k times, adding tab [w[i]] if the window value w[i] is 0 or more, subtracting tab[−w[i]] if the window value w[i] is negative, and substituting the obtained result for the variable V is performed sequentially from i=m−1 to i=0. The value of m is obtained by dividing the bit length u of the private key d by the window size k, and m=3 holds true in the present embodiment.

After the initialization of the equation (6.8), the process corresponding to i=m−1 is performed. That is, the doubling is performed three times and the addition is performed once according to the equation (6.9) corresponding to the window value w[2] (=4).

$$V = 2^3(O) + \text{tab}[w[2]] \quad (6.9)$$

Next, for the window value w[1] (=−2), the doubling is performed three times and the subtraction is performed once according to the equation (6.10).

$$V = 2^3(2^3(O) + \text{tab}[w[2]]) - \text{tab}[-w[1]] \quad (6.10)$$

Finally, for the window value w[0] (=1), the doubling is performed three times and the subtraction is performed once according to the equation (6.11).

$$V = 2^3(2^3(2^3(O) + \text{tab}[w[2]]) - \text{tab}[-w[1]]) + \text{tab}[w[0]] \quad (6.11)$$

The right side of the equation (6.11) is expanded as indicated by the following equation (6.12). Furthermore, in the present embodiment, the private key d is 241. Therefore, it is understood that the point dA is correctly calculated in the signed window method described above.

$$\begin{aligned} V &= 2^3(2^3(2^3(O) + \text{tab}[4]) - \text{tab}[2]) + \text{tab}[1] \quad (6.12) \\ &= 2^3(2^3(4A) - 2A) + 1A \\ &= 8(32A - 2A) + 1A \\ &= 241A \end{aligned}$$

The signed window method is secured against the SPA attack, but is weak against the DPA attack for the reason similar to the window method.

<Study of Signed Random Window Method (Third+ Fourth Comparison Example)>

The first through fourth comparison examples are described above, but the randomized window method which is secured against both the SPA attack and the DPA attack uses relatively, a large amount of memory, and the signed window method which uses a small amount of memory is weak against the DPA attack. That is, in the above-mentioned four comparison examples, there is no method having the feature of being secured against both the SPA attack and the DPA attack, and requiring a small amount of the memory.

On the other hand, there is the possibility that the PA attack which is a type of side channel attack occurs on an incorporated equipment unit, and some incorporated equipment units have limited capacity of memory. Therefore, it is preferable that the process of scalar multiplication by a device of a small memory capacity such as an incorporated equipment unit is secured against both the SPA attack and the DPA attack, and requires a small amount of memory.

However, according to the study of the Applicant of the present invention, it is clear that the feature of being secured against both the SPA attack and the DPA attack, and requiring a small memory capacity is not obtained by simply combining the randomized window method and the signed window method. On the contrary, the Applicant has found that the randomized window method and the signed window method are not allowed to be simply combined with each other. The details are described below.

When a random number is used, a simple application of the signed window method is rejected. Therefore, when the randomized window method is adopted as a countermeasure against the SPA attack, the reduction of the amount of used memory is not performed by the simple application of the signed window method. That is, the attempt to acquire the security against both the SPA attack and the DPA attack by a small memory capacity by combining the signed window method and the randomized window method it not successfully executed.

The finding is described below in more detail.

Figure 14:
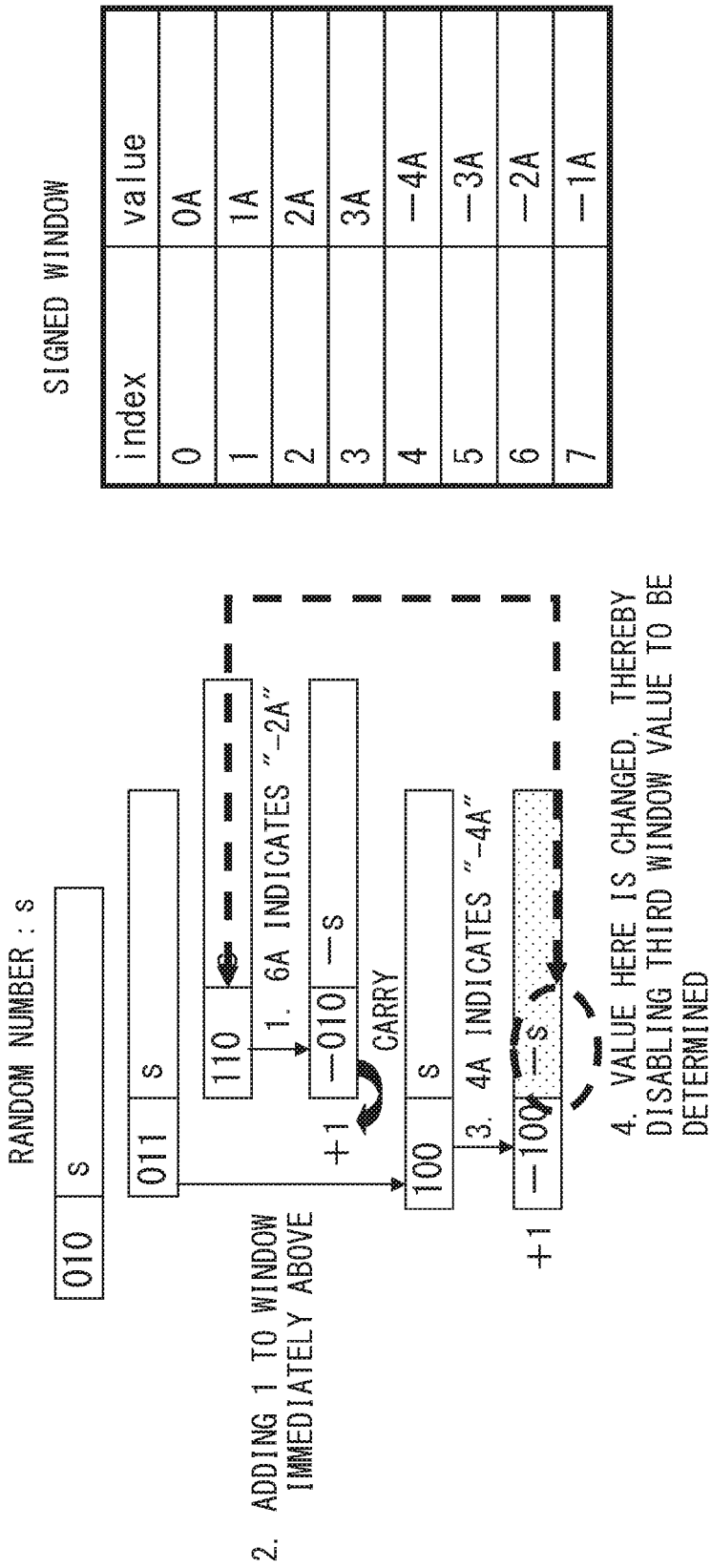
FIG. 14 is an explanatory view of the reason for not being able to combine the randomized window method (third comparison example) and the signed window method (fourth comparison example)

It is difficult to realize the scalar multiplication on a point having the security against the SPA and the DPA by combining the signed window method as the fourth comparison example with the randomized window method as the third comparison example. For example, the example illustrated in FIG. 14 is described below. The following procedures 1 through 5 respectively correspond to the procedures 1 through 5 in FIG. 14.

1. Since 110 is obtained in the third window from the most significant bit, the window value is set as 010, and the subtracting process is performed on the point when the scalar multiplication process is performed. In this case, s in the sequence becomes −s (+s→−s).

2. Since the third window value is set as 010, one bit carry is generated in the second window value.

3. By the carry generated in the procedure 2, +1 is added to the second window value, thereby resulting in 100.

4. Since the third window value is 100 in the procedure 3, −4A is referred to, thereby changing the sign of s (+s→−s).

5. Since the second s has become −s in the procedure 4, it is different from s (+s) which is predicted when the third window value is determined in the procedure 1. Therefore, the third window value is not determined.

As described above, the window value is not uniquely determined with respect to the algorithm in which the window value is determined from the most significant bit to the least significant bit.

The explanation above may be summarized as the table in FIG. 15. First, the randomized window method as the third comparison example is effective against the SPA attack (and also the SPA attack), its carry control is simple, but the table size is as large as $2^k$. On the other hand, the signed window method as the above-mentioned fourth comparison example is simple in carry control, has the table size as small as $2^{k-1}+1$, but is weak against the DPA attack. Then, the randomized window method as the third comparison example is not combined with the signed window method as the fourth comparison example by a simple method. That is, a method in which a table size may be about half ($2^{k-1}+1$) of the size of the normal window method is not realized by a simple combination.

The present application provide a method which is secured against the DPA and in which simple carry control may be realized with a half table size ($2^{k-1}+1$) as compared with the normal window method.

To solve the problem, the present application provides the following features.

A sequence of (s||window values)

Generating a window value based on the application method from the least significant bit to the most significant bit Using the sequence of (s||window values) as the first feature, the intermediate result obtained in the window method is randomized. Therefore, the security against the DPA is maintained. Furthermore, the window method also maintains the security against the SPA.

In addition, by generating a window value according to the algorithm described later from the least significant bit to the most significant bit based on the second feature, a secured scalar multiplication may be realized in a simple method which is free of carry control.

FIG. 16 is the first hardware configuration example of an encrypting device according to the first through third embodiments of the present invention.

An encrypting device 1600 in FIG. 16 includes a central processing unit (CPU) 1601, read only memory (ROM) 1602, random access memory (RAM) 1603, a communication circuit 1604, and a communication interface (I/F) 1605.

The CPU 1601, the ROM 1602, the RAM 1603, and the communication circuit 1604 are interconnected to one another through a bus 1606. The encrypting device 1600 includes a power supply terminal 1607 and a ground terminal 1608, and a power voltage is supplied to each unit in the encrypting device 1600 through the wiring not illustrated in the attached drawings and the power supply terminal 1607. Each unit in the encrypting device 1600 is also connected to the ground terminal 1608 through the wiring not illustrated in the attached drawings.

The CPU 1601 loads into the RAM 1603 a program stored in advance in the ROM 1602, and executes the program using the RAM 1603 as a working area, thereby performing various processes. For example, the CPU 1601 performs a control process illustrated in the flowcharts in FIGS. 20, 22, 23, 25, 26, and 28.

The ROM 1602 may be replaced with another type of non-volatile memory such as flash memory etc. When a rewritable storage device such as flash memory replaces the ROM 1602, the program may be downloaded into the encrypting device 1600 through the communication I/F 1605, and installed to the encrypting device 1600.

The encrypting device 1600 may communicate with other devices through the communication I/F 1605. For example, the encrypting device 1600 may transmit the information about a public key etc. of the encrypting device 1600 itself to other devices through the communication I/F 1605, and receive the information about a public key of another device through the communication I/F 1605.

The type of the communication I/F 1605 may be any type depending on the types of the encrypting device 1600. For example, the encrypting device 1600 may be a smart card, an LSI chip incorporated into an accessory part such as a printer card etc., and an LSI chip incorporated into a domestic electric appliance. For example, when the encrypting device 1600 is a contact type smart card, the communication I/F 1605 may include a communication terminal. When the encrypting device 1600 is anon-contact smart card, the communication I/F 1605 may include an antenna.

The communication circuit 1604 performs an appropriate process depending on the type of the communication I/F 1605 and communication protocol. For example, the communication circuit 1604 may perform the processes such as a digital to analog conversion, an analog to digital conversion, modulation, demodulation, coding, decoding, etc.

An attacker who attempts the PA attack inputs data of a point on an elliptical curve to the encrypting device 1600 through the communication I/F 1605, and measures the power consumption while the encrypting device 1600 is performing a process on the input point, thereby estimating the private key of the encrypting device 1600. For example, the attacker connect a resistor to the power supply terminal 1607, thereby measuring the power consumption.

FIG. 17 is the second hardware configuration example of an encrypting device according to the first through third embodiments. An encrypting device 1610 in FIG. 17 includes an ECC hardware circuit 1611 instead of the CPU 1601 and the ROM 1602.

Furthermore, the encrypting device 1610 includes the RAM 1603, the communication circuit 1604, and the communication I/F 1605 which are similar to those of the encrypting device 1600 in FIG. 16. In the encrypting device 1610, the ECC hardware circuit 1611, the RAM 1603, and the communication circuit 1604 are interconnected through the bus 1606. The encrypting device 1610 also includes the power supply terminal 1607 and the ground terminal 1608 which are similar to those of the encrypting device 1600 in FIG. 16.

In the encrypting device 1610, instead of the CPU 1601 which reads the program from the ROM 1602 and executes it, the ECC hardware circuit 1611 performs the control process illustrated in the flowcharts in FIGS. 20, 22, 23, 25, 26, and 28. The ECC hardware circuit 1611 may be, for example, an application specific integrated circuit (ASIC), or at least a part of the ECC hardware circuit 1611 may be realized by a field programmable gate array (FPGA). Furthermore, the ECC hardware circuit 1611 is connected to the power supply terminal 1607 and the ground terminal 1608 through the wiring not illustrated in the attached drawings.

Depending on the embodiments, the encrypting device may include the CPU 1601 in FIG. 16 as a general-purpose processor, the ROM 1602 in FIG. 16 which stores a program executed by the CPU 1601, and the ECC hardware circuit 1611 in FIG. 17 as a co-processor. Then, the CPU 1601 performs a part of the controlling process illustrated by the flowcharts in FIGS. 20, 22, 23, 25, 26, and 28, and another part may be performed by the ECC hardware circuit 1611. Also in this case, the encrypting device includes the RAM 1603, the communication circuit 1604, and the communication I/F 1605 as illustrated in FIGS. 16 and 17.

Figure 18:
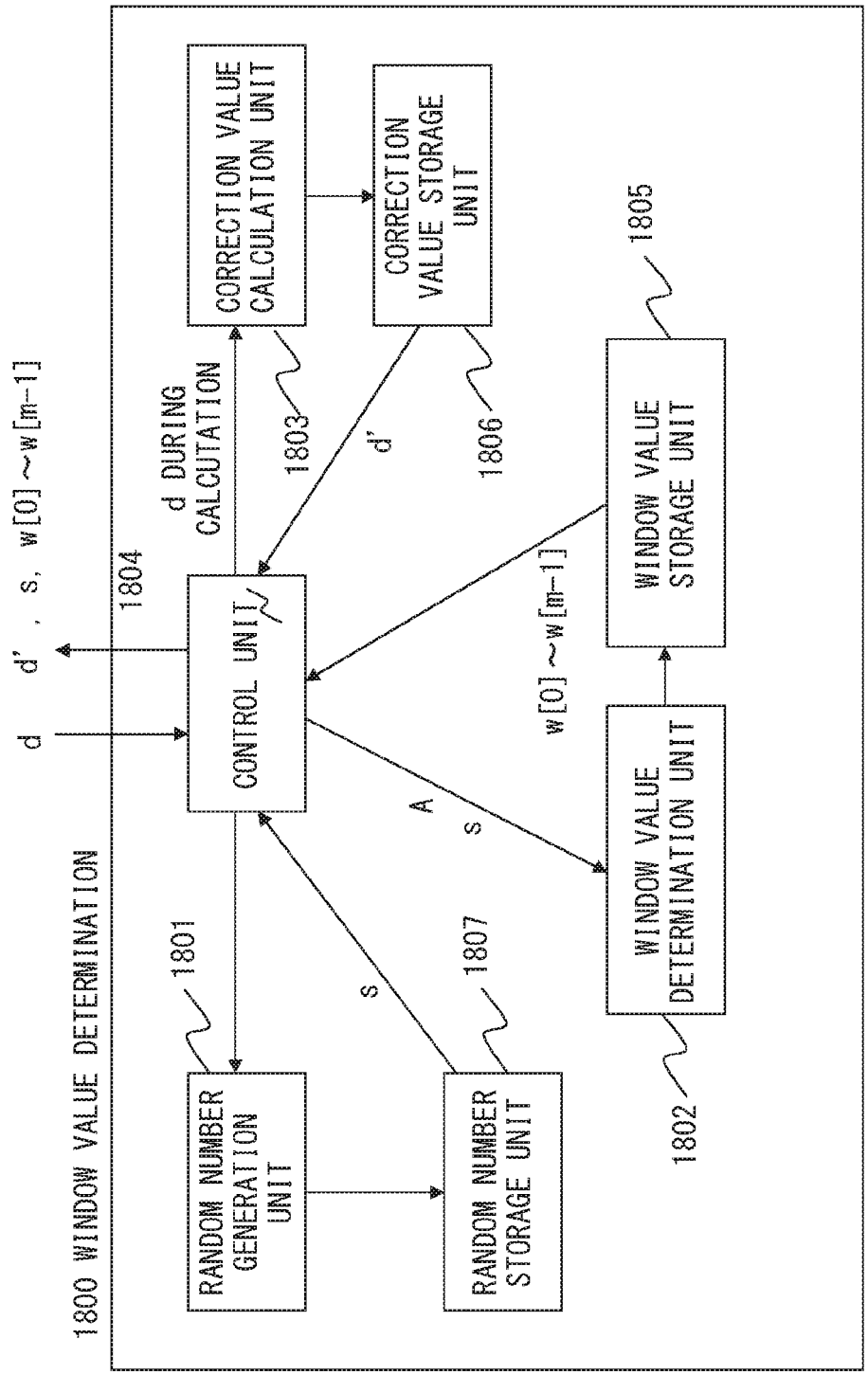
FIG. 18 is an explanatory view of the configuration of the functions of the window value determination unit of the encrypting device according to the first through third embodiments.
Figure 19:
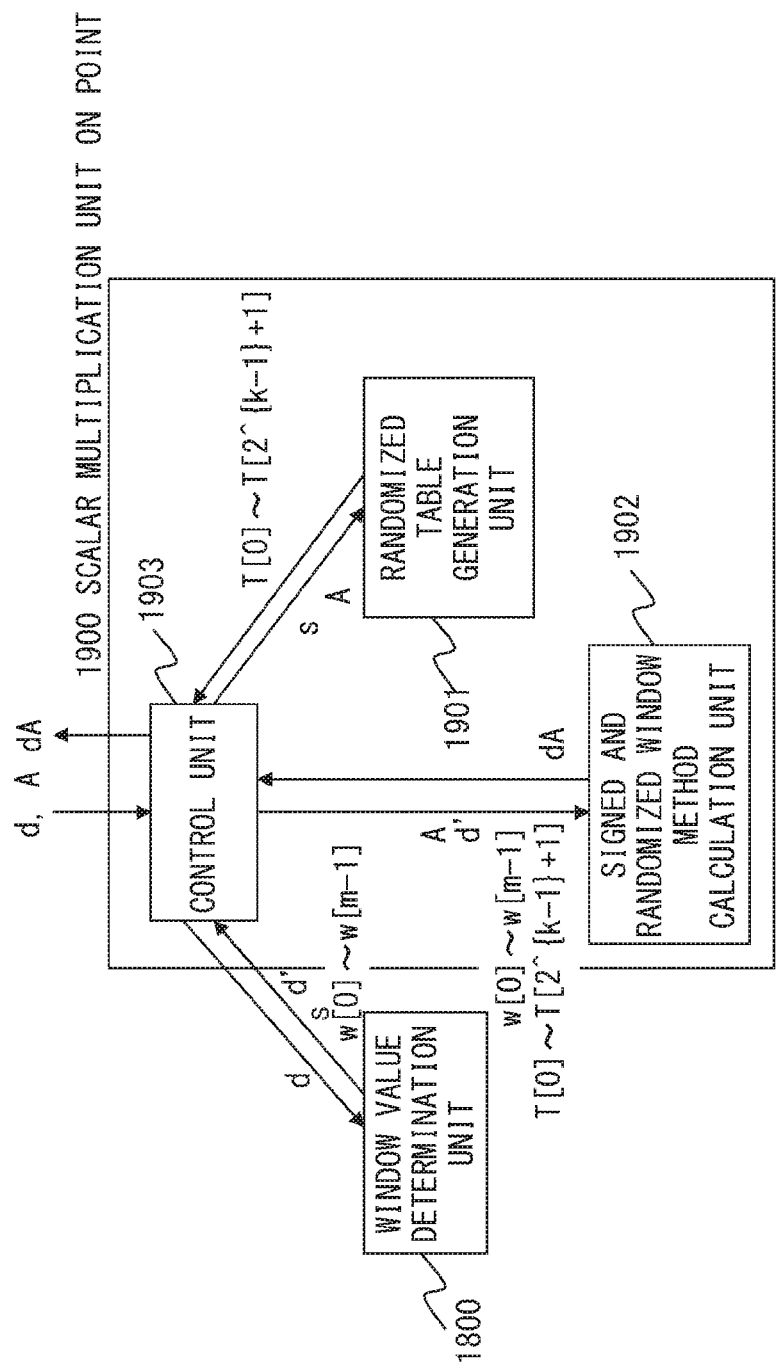
FIG. 19 is an explanatory view of the configuration of the functions of the scalar multiplication calculation unit of the encrypting device according to the first through third embodiments.

FIGS. 18 and 19 are explanatory views of the configuration of the function of the encrypting device according to the first through third embodiments of the present invention. A window value determination unit 1800 illustrated in FIG. 18, and a scalar multiplication unit 1900 for a point as illustrated in FIG. 19 may be realized by the hardware exemplified in FIG. 16 or 17.

First, the window value determination unit 1800 in FIG. 18 includes a random number generation unit 1801, a window value determination unit 1802, a correction value calculation unit 1803, a control unit 1804, a window value storage unit 1805, a correction value storage unit 1806, and a random number storage unit 1807.

The random number generation unit 1801 generates a 2-bit binary random number s.

The window value determination unit 1802 retrieves the least significant k bits of the current secret key d using (b+m×k) bit binary secret key d as the initial value, and performs a calculation as a binary window sequence w(i).

The correction value calculation unit 1803 obtains a binary bit string x=(s∥w(i)) obtained by concatenating the random number s on the more significant bit side of the window sequence w(i) if the most significant bit of the window sequence w(i) is 0, subtracts the bit string x from the current secret key d, and acquires a bit string of a new secret key d. In addition, if the most significant bit of the window sequence w(i) is 1, then the correction value calculation unit 1803 calculates the bit string v of the complement of the base for the window sequence w(i) in binary. Then, a bit string −x=−(s∥v) assigned a minus sign to the bit string obtained by concatenating the random number s to the more significant bit side of the bit string v is obtained, the bit string −x is subtracted from the current secret key d, and a bit string of a new secret key d is obtained.

The control unit 1804 repeatedly performs the process of the window value determination unit 1802 and the process of the correction value calculation unit 1803 until i reaches 0 or until the point immediately before the value of the bit string of the secret key d becomes a negative value while changing i from m−1 to 0.

The window value storage unit 1805 stores each window sequence w(i) obtained after the operation by the control unit 1804 is completed.

The correction value storage unit 1806 stores as a correction value d' the bit string of the secret key d obtained after the operation of the control unit 1804 is completed.

The random number storage unit 1807 stores the random number s generated by the random number generation unit 1801

Next, the scalar multiplication unit 1900 of the point illustrated in FIG. 19 includes a randomized table generation unit 1901, a signed and randomized window method calculation unit 1902, and a control unit 1903. The scalar multiplication unit 1900 performs an encrypting operation on the point A on the elliptical curve by the secret key d from the random number s calculated by the window value determination unit 1800 in FIG. 18 corresponding to the (b+m×k) bit binary secret key d in the elliptical curve cryptography, each window sequence w(i), and the correction value d' (in this example, b, m, k, i, and j are natural numbers including 0).

The randomized table generation unit 1901 performs the scalar multiplication on the point A using as a scalar value the index value obtained by concatenating the random number s on the more significant bit side of the k-bit bit string while sequentially changing the value of the bit string of the number k of bits corresponding to the number of bits of the window sequence w(i), and the calculation result of the scalar multiplication is stored as table data corresponding to the index value, thereby generating a randomized table.

The signed and randomized window method calculation unit 1902 sets as an initial value of the output variable V the calculation result obtained by performing the scalar multiplication on the point A using the correction value d' as a scalar value. Then, the signed and randomized window method calculation unit 1902 repeatedly performs a series of the first and second processes below on each window sequence w(j) from the more significant bits side to the less significant bits. That is, the signed and randomized window method calculation unit 1902 performs the doubling on the elliptical curve the number of times k corresponding to the number of bits of each window sequence as the first process. Next, as the second process, the signed and randomized window method calculation unit 1902 acquires the table data in the randomized table using the window sequence w(j) as an index if the most significant bit of the window sequence w(j) is 0, and adds the data to the output variable V. On the other hand, if the most significant bit of the window sequence w(j) is 1, the unit acquires the table data in the randomized table using as an index the bit string of the complement of the base for the window sequence w(j) in binary, and adds the value obtained by adding a minus sign to the output variable V.

The control unit 1903 controls the repeated operation on each window sequence w(j) by the signed and randomized window method calculation unit 1902 from the more significant bits side to the less significant bits side.

Then, the control unit 1903 outputs as a result of the encrypting operation the value of the output variable V finally obtained as a result of the repetitive operation above.

In FIGS. 18 and 19, the random number generation unit 1801, the window value determination unit 1802, the correction value calculation unit 1803, the control unit 1804, the randomized table generation unit 1901, the signed and randomized window method calculation unit 1902, and the control unit 1903 may be realized as the following configuration. That is, each of these units may be the process performed by the CPU 1601 in FIG. 16, may be the process performed by the ECC hardware circuit 1611 in FIG. 17, and may be the process performed by the combination of the CPU 1601 and the ECC hardware circuit 1611. In this case, the program for executing the processes may be executed by being stored in the ROM 1602 or the RAM 1603 in FIG. 16 or 17. Furthermore, the secret key d may be stored in the ROM 1602 in FIG. 16 or 17. In addition, the window value storage unit 1805, the correction value storage unit 1806, and the random number storage unit 1807 in FIG. 18 may be stored in, for example, the RAM 1603 in FIG. 16 or 17.

In FIG. 19, the point A may be given from the device other than the encrypting device according to the first through third embodiments to the encrypting device according to the first through third embodiments. For example, the point A may be a public key of an external device. The public key of the external device may be notified from, for example, the external device to the encrypting device according to the first through third embodiments for a DH key agreement, and may be notified from the external device to the encrypting device according to the first through third embodiments for the authentication by the DSA.

When the point A is given from the device other than the encrypting device according to the first through third embodiments to the encrypting device according to the first through third embodiments, the point A is acquired by the communication I/F 1605 and the communication circuit 1604.

The control unit 1903 in FIG. 19 performs an appropriate process using the xy coordinates of the value of the output variable V. For example, the control unit 1903 may transmit the point V to another device, may perform the process for authentication by the DSA, and may perform the process for a DH key agreement. The control unit 1903 may output the point V externally using the communication circuit 1604 and the communication I/F 1605 depending on the case. For example, if the encrypting device according to the first through third embodiments is included in the accessory parts (for example, a printer cartridge etc.) authenticated by the host device (for example, a printer etc.), then the control unit 1903 includes the communication circuit 1604 for communication with the host device and the communication I/F 1605.

Described next below is the first embodiment of the concrete process of the window value determination unit 1800 in FIG. 18 and the scalar multiplication unit 1900 on a point in FIG. 19.

Figure 20A:
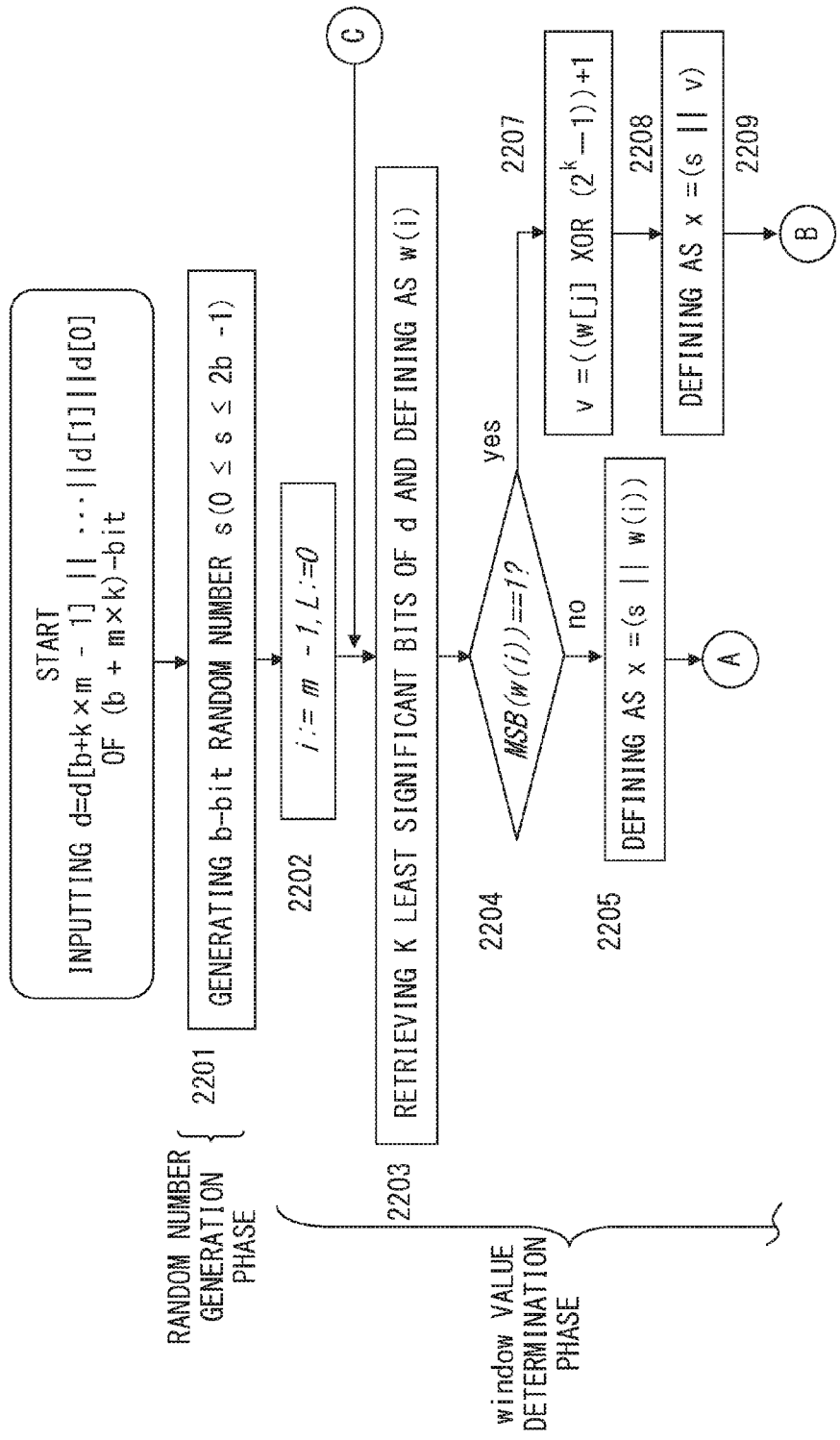
FIGS. 20A and 20B are a flowchart of the window value determination algorithm according to the first embodiment.
Figure 20B:
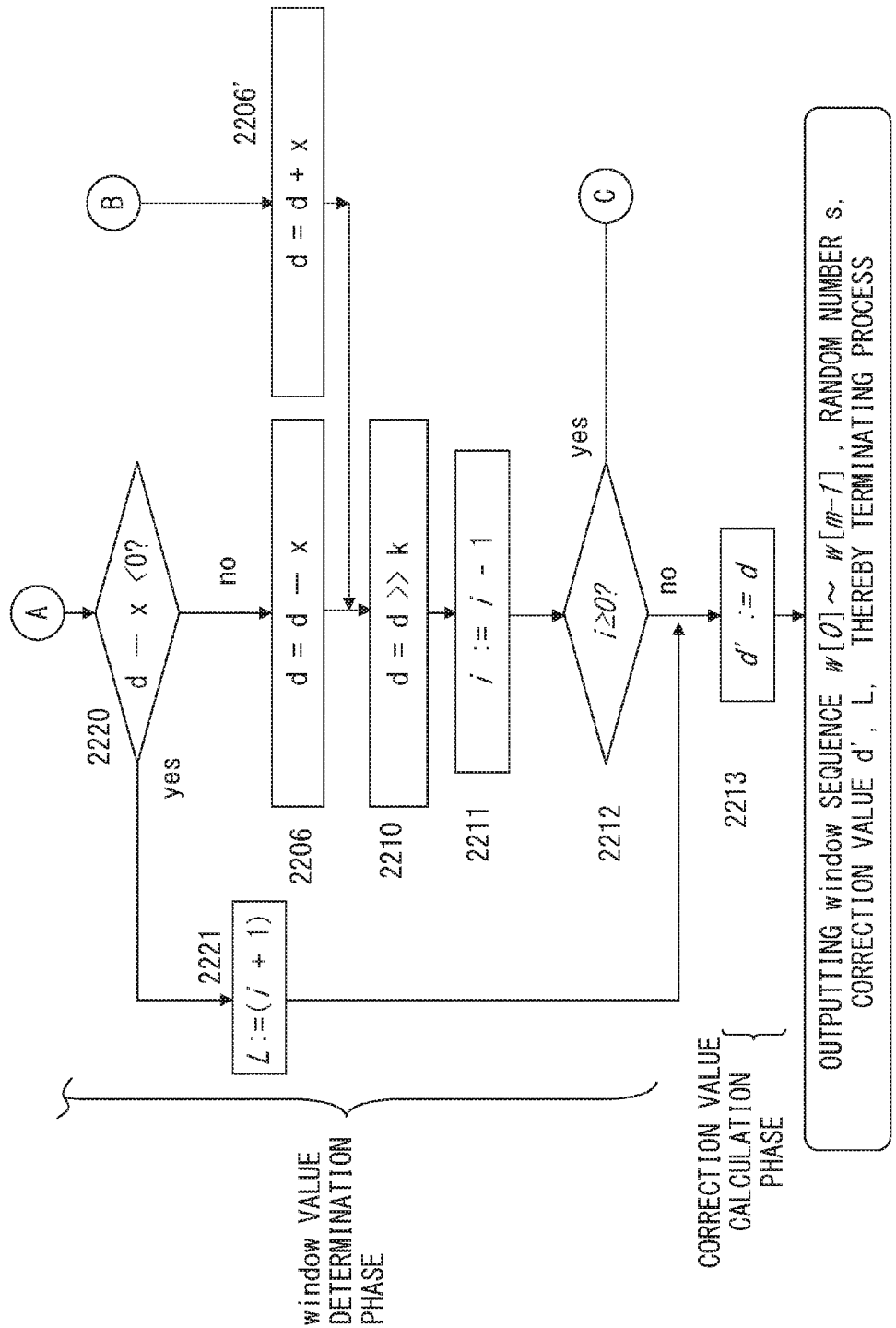

FIGS. 20A and 20B are a flowchart of the window value determination algorithm according to the first embodiment which illustrates the process of the window value determination unit 1800 in FIG. 18. The process according to the flowchart is described below.

As an input, the process is started upon input of the (b+m×k) bit binary secret key d=d[b+m×k]∥ . . . ∥d[1]∥d[0] in the elliptical curve cryptography where k indicates the number of bits of the window value, m indicates the number of window sequences, and b indicates the number of bits of the random number s.

Then, the b-bit binary random number s is first generated (step 2201). It corresponds to the function of the random number generation unit 1801 in FIG. 18.

Next, the value of the variable i is initialized to m−1, and the value of the variable L is initialized to 0 (step 2202).

Next, the k least significant bits are retrieved from the bit string of the current secret key d, and is defined as the window sequence w(i) (step 2203). It corresponds to the function of the window value determination unit 1802 in FIG. 18.

Next, it is determined whether or not the most significant bit (MSB) in the window sequence w(i) is 1 (step 2204).

If the most significant bit in the window sequence w(i) is 0, a binary bit string x=(s∥w(i)) is obtained by concatenating the random number s on the more significant bits side of the window sequence w(i) (steps 2204→2205).

Then, the bit string x is subtracted from the current secret key d, and it is determined whether or not the subtraction result is smaller than 0 (step 2220).

Unless the subtraction result is smaller than 0, the subtraction result above is defined as the bit string of a new secret key d (step 2220→2206).

The case in which the subtraction result is smaller than 0 is described later.

On the other hand, when the most significant bit of the window sequence w(i) is 1, the bit string v of the complement of the base for the window sequence w(i) in binary system is calculated (step 2207). To be more concrete, each bit of the window sequence w(i) is inverted by calculating the exclusive OR (XOR) for each corresponding bit between the window sequence w(i) and the bit string $2^k-1$, 1 is added to the inversion result, and the addition result is set as v.

Next, the random number s is combined on the more significant bits side of the bit string v, thereby obtaining the bit string x=(s∥v) (step 2208).

Then, the bit string −x obtained by adding a negative sign to the bit string x is subtracted from the current secret key d, thereby obtaining the bit string of a new secret key d. That is, the calculation is performed by d=d−(−x)=d+x (step 2206').

The series of processes in steps 2204 through 2209 correspond to the function of the correction value calculation unit in FIG. 18.

Next, when a new secret key d is calculated in step 2206 or 2206', the bit string of the secret key d is right shifted by k bits, and the k least significant bits are truncated (step 2210). In this example, d>>k indicates the operation of right-shifting the secret key d by k bits.

Next, the value of the variable i is subtracted by 1 (step 2211).

Then, it is judged whether or not the value of the variable i is 0 or more (step 2212).

If the value of the variable i is 0 or more, control is returned to step 2203, and the series of processes from step 2203 to step 2209 are performed (step 2212→2203).

When the value of the variable i is 0 or less, control is passed to step 2213 (step 2212→2213).

Furthermore, when the value of d−x is 0 or less in step 2220, control is passed to step 2213 after the value of the current i+1 is set as the value of the variable L (step 2220→2221). The process is described later.

The controlling process in steps 2210 through 2212, 2220, and 2221 corresponds to the function of the control unit 1804 in FIG. 18.

Finally, the value of the current secret key d is set as the correction value d' (step 2213).

Then, the finally obtained window sequences w[0] through w[m−1], the random number s, the correction value d', and the value of the variable L indicating the window starting position are output, thereby terminating the process of the window value determination algorithm.

A concrete calculation example of the process of the window value determination algorithm according to the first embodiment is described below with reference to the explanatory view in FIG. 21.

First, k indicates a bit length of a window value as described above, and a parameter t be determined in advance; and b indicates a bit length of a random number s as described above, and a parameter for determination of a minimum value in advance. The value of m depends on the length (u) of the secret key d, k, and b. For example, the values are determined as follows.

[math 4]

$$h = u - b \quad 1.$$
$$m = \lfloor h/k \rfloor \quad 2.$$
$$b = u - k \times m \quad 3.$$

where b depends on the determined value of m.
There may be another example as listed below.

[math 5]

$$h = u - b \quad 1.$$
$$m = \lceil h/k \rceil \quad 2.$$
$$b = u - k \times m \quad 3.$$

There may be a further example below.

[math 6]

$$h = u - b \quad 1.$$
$$m = \lfloor h/k \rfloor \quad 2.$$
$$b = b \quad 3.$$

There may be a further example below.

[math 7]

$$h = u - b \quad 1.$$
$$m = \lceil h/k \rceil \quad 2.$$
$$b = b \quad 3.$$

There are many other deriving methods.

There is a following example of a recommended parameter length.

k=2, 3, 4, 5, etc.
b=10, 12, 16, 20, 30, 40, 50, 60, 70, 80, 90, 100, etc. for arbitrary lengths
 length of d: u=512, 1024, 2048, 3072, 4096,
 160, 192, 224, 256, 384, 521, 163, 233, 239, 283, 409, 571, etc.

Assume an elliptical curve cryptography calculating process when, for example, k=2, b=4, d=$(10110111001011)_2$, (length of d: u=14 bits). In this case, $$h = u - b = 10$$

$$m = 5$$

$$b = u - k \times m = 14 - 2 \times 5 = 4 (\text{no change})$$

according to the calculation example by math 4.

Under the condition, first in step 2201, for example, $(1011)_2$ is generated as a b=4 bit random number.

Next, in step 2202, the initialization is performed for i=m−1=5−1=4, L=0.

Next, in step 2203 in the first cycle, the 2 least significant bits of d are retrieved and assigned w[4]=$(11)_2$ as illustrated in FIG. 21.

Next, in step 2204 in the first cycle, it is judged that the most significant bit of w[4] is 1.

As a result, in step 2207 in the first cycle, the complement of 2 is calculated for w[4]=$(11)_2$, thereby obtaining v=$(01)_2$.

Next, in step 2208 in the first cycle, x=(s∥v)=$(101101)_2$ is calculated.

Then, in step 2209 in the first cycle, the value −x obtained by adding a minus sign to x illustrated in FIG. 21 is subtracted from the value of the current secret key d. That is, a new secret key d is calculated as d=d−(−x)=d+x= $(10110111001011)_2 + (101101)_2 = (10110111111000)_2$.

Next, in step 2210 in the first cycle, the secret key d above is 2 bits right-shifted. That is, d=d>>2=$(101101111110)_2$ is calculated.

Next, in step 2211 in the first cycle, 1 is subtracted from the value of the variable i. That is, i=i−1=3.

Next, in step 2212 in the first cycle, it is judged that the variable i=3 is 0 or more, and control is returned to step 2203 in the second cycle.

Next, in step 2203 in the second cycle, as illustrated in FIG. 21, 2 least significant bits are retrieved from d as w[3]=$(10)_2$.

Next, in step 2204 in the second cycle, it is judged that the most significant bit of w[3] is 1.

As a result, in step 2207 in the second cycle, the complement of 2 is calculated for w[3]=$(10)_2$, thereby obtaining v=$(10)_2$.

Then, in step 2208 in the second cycle, x=(s∥v)=$(101110)_2$ is calculated.

In step 2209 in the second cycle, the value −x obtained by adding a minus sign to x illustrated in FIG. 21 is subtracted from the value of the current secret key d. That is, a new secret key d is calculated as d=d−(−x)=d+x= $(101101111110)_2 + (101110)_2 = (101110101100)_2$.

Next, in step 2210 in the second cycle, the secret key d is 2 bits right-shifted. That is, d=d>>2=$(1011101011)_2$ is calculated.

Next, in step 2211 in the second cycle, 1 is subtracted from the value of the variable i. That is, i=i−1=2.

Next, in step 2212 in the second cycle, it is judged that the variable i=2 is 0 or more, and control is returned to step 2203 in the third cycle.

Next, in step 2203 in the third cycle, as illustrated in FIG. 21, 2 least significant bits are retrieved from d as w[2]=$(11)_2$.

Next, in step 2204 in the third cycle, it is judged that the most significant bit of w[2] is 1.

As a result, in step 2207 in the third cycle, the complement of 2 is calculated for w[2]=$(11)_2$, thereby obtaining v=$(01)_2$.

Then, in step 2208 in the third cycle, x=(s∥v)=$(101101)_2$ is calculated.

In step 2209 in the third cycle, the value −x obtained by adding a minus sign to x illustrated in FIG. 21 is subtracted from the value of the current secret key d. That is, anew secret key d is calculated as d=d−(−x)=d+x= $(1011101011)_2 + (101101)_2 = (1100011000)_2$.

Next, in step 2210 in the third cycle, the secret key d is 2 bits right-shifted. That is, d=d>>2= $(11000110)_2$ is calculated.

Next, in step 2211 in the third cycle, 1 is subtracted from the value of the variable i. That is, i=i−1=1.

Next, in step 2212 in the third cycle, it is judged that the variable i=1 is 0 or more, and control is returned to step 2203 in the fourth cycle.

Next, in step 2203 in the fourth cycle, as illustrated in FIG. 21, 2 least significant bits are retrieved from d as w[1]= $(10)_2$.

Next, in step 2204 in the fourth cycle, it is judged that the most significant bit of w[1] is 1.

As a result, in step 2207 in the fourth cycle, the complement of 2 is calculated for w[1]= $(10)_2$, thereby obtaining v= $(10)_2$.

Then, in step 2208 in the fourth cycle, x=(s∥v)= $(101110)_2$ is calculated.

In step 2209 in the fourth cycle, the value −x obtained by adding a minus sign to x illustrated in FIG. 21 is subtracted from the value of the current secret key d. That is, anew secret key d is calculated as d=d−(−x)=d+x= $(11000110)_2$ + $(101110)_2 = (11110100)_2$.

Next, in step 2210 in the fourth cycle, the secret key d is 2 bits right-shifted. That is, d=d>>2= $(111101)_2$ is calculated.

Next, in step 2211 in the fourth cycle, 1 is subtracted from the value of the variable i. That is, i=i−1=0.

Next, in step 2212 in the fourth cycle, it is judged that the variable i=0 is 0 or more, and control is returned to step 2203 in the fifth cycle.

Next, in step 2203 in the fifth cycle, as illustrated in FIG. 21, 2 least significant bits are retrieved from d as w[0]= $(01)_2$.

Next, in step 2204 in the fifth cycle, it is judged that the most significant bit of w[0] is not 1.

As a result, in step 2205 in the fifth cycle, as illustrated in FIG. 21, x=(s∥w[0])= $(101101)_2$ is calculated.

Next, in step 2220 in the fifth cycle, it is judged that d−x= $(111101)_2 − (101101)_2 = (010000)_2$ is not less than 0.

Then, in step 2206 in the fifth cycle, the value of d−x= $(010000)_2$ is the value of a new secret key d.

Next, in step 2210 in the fifth cycle, the secret key d is 2 bits right-shifted. That is, d=d>>2= $(0100)_2$ is calculated.

Next, in step 2211 in the fifth cycle, 1 is subtracted from the value of the variable i. That is, i=i−1=−1.

Next, in step 2212 in the fifth cycle, it is judged that the variable i=−1 is not 0 or more, and control is passed to step 2213. As a result, the finally obtained secret key d= $(0100)_2$ is a correction value d' as illustrated in FIG. 21.

As a result of the process above, the finally obtained window sequences w[0] through w[4], the random number s, the correction value d', and the value of the variable L=0 indicating the window starting position (indicating the start from w[0]) are output, and the process of the window value determination algorithm terminates.

In the above-mentioned process of the window value determination algorithm, k less significant bits of the window sequence w(i) are retrieved from the secret key d. If the most significant bit of the window sequence is 1, the complement of 2 is calculated for the window sequence w[i] and the window value is corrected based on the same principle as the case described above efficiency FIG. 13, thereby halving the table size in the window method. Simultaneously, according to the present embodiment, the random number s is concatenated on the more significant bit side of the window sequence. Then, the shift of the secret key d by the coupling of the correction of the window value and the random number s is corrected in step 2206 or 2206' and step 2210, and the k subsequent bit are segmented in the window sequence with respect to the corrected secret key d. Thus, according to the present embodiment, the shift of the secret key d by the correction of the window value for halving the table size and the coupling of the random number s for randomization to the more significant bits side is propagated to the more significant bit side of the secret key d. As a result, the bit string of the secret key d remaining after the segmentation of the necessary number of window sequences w[m−1] through w[0] may be output as the correction value d'.

Using the determined window sequences w[0] through w[m−1], correction value d', and random numbers, the randomization and the signed window method may be simultaneously attained.

Depending on the selection condition of the parameters u, k, b, and m, the value of d−x may be less than 0 before all windows are processed. In this case, sequentially in steps 2220, 2221, and 2213, the window sequence up to the point immediately before the value of d−x is 0 or less and the value of the secret key d at the point are output as the correction value d'. The suffix of the finally truncated window sequence is output as the variable L=i+1. That is, the output window sequence normally maintains L=0 by the process in step 2202. Therefore, w[0] through w[m−1] hold true. However, when the condition of d−x<0 holds true, L=0 does not hold true. Therefore, w[0]≠w[L] through w[m−1] is output. That is, the variable L indicates the window starting position in the encrypting process.

Figure 22A:
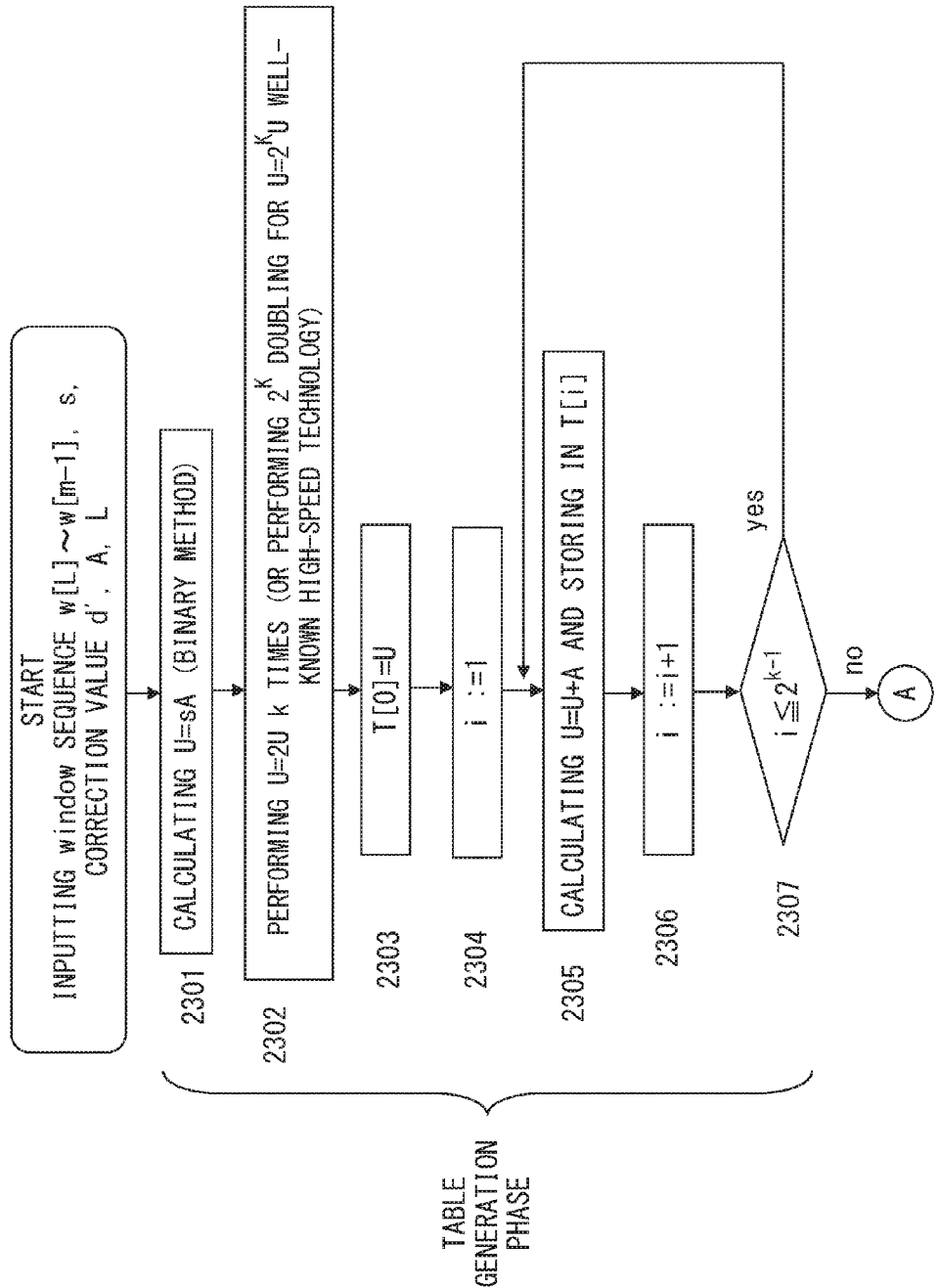
FIGS. 22A and 22B are a flowchart of the scalar multiplication algorithm of a point according to the first embodiment.
Figure 22B:
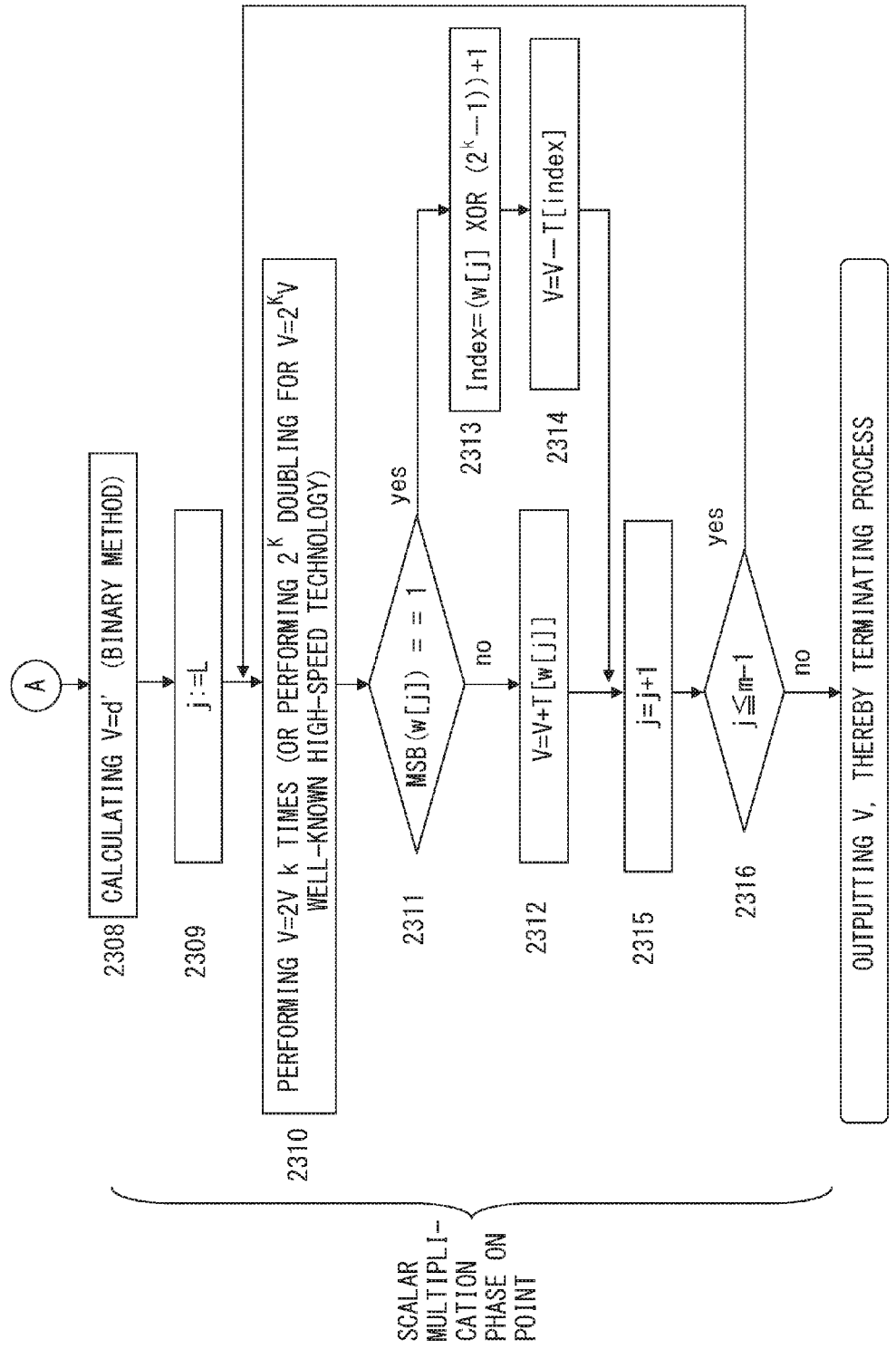

FIGS. 22A and 22B are a flowchart of the scalar multiplication algorithm of a point according to the first embodiment, and illustrates the process of the scalar multiplication unit 1900 of a point in FIG. 19. Described below is the process according to the flowchart.

The window sequences w[L] through w[m−1] calculated by the window value determination algorithm in FIGS. 20A and 20B, the random numbers, the correction value d', and the window stating point L are input. Furthermore, a point A on the elliptical curve for a scalar multiplication is input.

First in steps 2301 through 2307, the process of the table generation phase for the signed random window method is performed. The controlling process corresponds to the function of the randomized table generation unit 1901 in FIG. 19.

In this example, the random number s is set in more significant bits, and a scalar multiplication operation is performed on the bit string in which the values of k less significant bits change from 0 to $2^{k-1}$. Then, the scalar multiplication result is stored in the entry of the table which includes k less significant bits as index values.

First, the scalar multiplication sA for the point A having the random numbers as a scalar value is calculated, and the result is stored in the variable U (step 2301). The normal binary method may be applied to the calculation.

Next, to obtain a scalar multiplication result in the state in which the random number s is arranged on the more significant bit side, the arithmetic process which performs doubling=2U on the value of the variable U calculated in step 2301 and obtains a new variable U is performed k times (step 2302). Otherwise, the doubling process using U= $2^k$U may be performed by well-known high speed technology. Thus, an arithmetic component of the scalar multiplication on the random number s is obtained in the state in which the random number s is concatenated to the window sequence of k less significant bits.

The arithmetic component of the scalar multiplication performed by changing the less significant bit window sequence is added to the thus obtained arithmetic component, thereby generating table data.

That is, first, the value of the variable U is stored as is in the table entry T[0] when the value by k less significant bits is 0 (step 2303) because, when the value by the k less significant bits is 0, the arithmetic component of the scalar multiplication using the value is also 0.

Next the initial value of the variable i is set to 1 (step 2304).

Then, the addition of the point of U=U+A is performed, and the result is stored in the table entry T[i] (step 2305).

Next, 1 is added to the value of variable i (step 2306).

Then, it is judged whether or not the value of the variable i is $2^{k-1}$ or less (step 2307).

If the value of the variable i is $2^{k-1}$ or less, control is returned to step S2305, and the calculation of the subsequent table entry is performed.

The repetitive process from step 2305 to step 2307 is an arithmetic operation of the scalar multiplication based on the increment by A to the result of the scalar multiplication on the point A when the value of k less significant bits is incremented by 1. Thus, the table data from T[0] to T[$2^{k-1}$] is generated. Consider that the size of the table data may be about half of $2^k$, that is, $2^{k-1}+1$.

When the value of the variable i reaches $2^{k-1}$, the table generation phase is terminated, and control is passed to the process of the scalar multiplication phase on the point to be treated actually in the next encrypting process. It refers to steps 2308 through 2316. The controlling process corresponds to the function of the signed and randomized window method calculation unit 1902 in FIG. 19.

First, the scalar multiplication component for the correction value d' is calculated where V=d'A (step 2308). An arithmetic operation in a normal binary method may be applied to the calculation because the value of the correction value d' may be disclosed, but it is still difficult to disclose the secret key d. The variable V is an output variable with which the output value of the encrypting process may be finally obtained.

Next, the value of the variable j is initialized to the first suffix L of the window sequence (step 2309).

Next, in the loop processing in steps 2310 through 2316, the repetitive process of performing the scalar multiplication with reference to the table generated in the table generation phase is performed from the more significant bits to the less significant bits of the secret key d.

First, the process of performing doubling 2V on the value of the output variable V is performed k times (step 2310). Otherwise, the $2^k$ doubling process with V=$2^k$V may be performed by well-known high speed technology. In the process, the digital positions of the correction value d' and the first more significant bit side window sequence w[L] are aligned.

Next, it is judged whether or not the most significant bit (MSB) of the window sequence w(j) is 1 (step 2311).

If the most significant bit of the window sequence w(i) is 0, the table data T[w(j)] having the window sequence w(j) as an index is acquired, and the data is added to the output variable V (step 2312).

On the other hand, if the most significant bit of the window sequence w(i) is 1, then the bit string index of the complement of the base for the window sequence w(j) in binary system is calculated (step 2313). To be more concrete, when an exclusive OR (XOR) is calculated for each corresponding bit between the window sequence w(j) and the bit string $2^k-1$, each bit of the window sequence w(j) is inverted, 1 is added to the inversion result, and the addition result is the value of the variable index.

Next, the table data T[index] using the value of the variable index as an index is acquired, and is added to the output variable V (step 2314).

After the process in step 2312 or 2314, 1 is added to the value of the variable j (step 2315).

Then, it is judged whether or not the value of the variable j is m−1 or less (step 2316)

If the value of the variable j is m−1 or less, control is returned to the process in step 2310 to perform the scalar multiplication on the less significant bit side of the window sequence.

If the value of the variable j exceeds m−1, the process equivalent to the scalar multiplication of the point A with respect to the entire secret key d is terminated, the value of the output variable V is output as a result of the encrypting process, and the process of the scalar multiplication algorithm on a point illustrated in FIGS. 22A and 22B is terminated (NO as the judgment in step 2311).

Described below is an example of a concrete numerical operation of the process using the scalar multiplication algorithm of a point according to the first embodiment described above.

The window sequences w[0] through w[4], the random number s, the correction value d', and the variable L indicating the window starting position which are all input here are obtained in the numerical operation example in FIG. 21.

First, an example of a numerical operation of the table generation phase is described.

First in step 2301, U=$(1011)_2$×A is calculated using the random number s=$(1011)_2$ (FIG. 21).

Next, in step 2302, the doubling process of U is performed k=2 times. That is, U=$2^2$U=$2^2$×$(1011)_2$×A=4×11×A=44A holds true.

Next, in step 2303, the table entry T[0] corresponding to the index value 0 stores U=44A.

Next, in step 2304, the initialization is performed as variable i=1.

Next, in step 2305 in the first cycle, U=U+A=45A is stored in the table entry T[1] corresponding to the index value 1.

Next, in step 2306 in the first cycle, the variable i=i+1=2 holds true.

Next, in step 2307 in the first cycle, the judgment of the variable i=2≤$2^1$=2 is YES, and control is returned to step 2305 in the second cycle.

Next, in step 2305 in the second cycle, U=U+A=46A is stored in the table entry T[2] corresponding to the index value 1.

Next, in step 2306 in the second cycle, the variable i=i+1=3 holds true.

Next, in step 2307 in the second cycle, the judgment of the variable i=3≤$2^1$=2 is NO, thereby terminating the table generation phase.

Thus, $2^{k-1}$+1=3 pieces of table data of T[0], T[1], T[2] are generated.

Described next is an example of a numerical operation of the scalar multiplication phase of a point.

First, in step 2308, since the correction value d'=$(0100)_2$ (FIG. 21), V=d'A=$(0100)_2$×A=4A is calculated.

Next, in step 2309, the variable j=L=0 holds true.

Next, in step 2310 in the first cycle, the doubling process of V is performed k=2 times. That is, V=$2^k$V=$2^2$V=4×4A=16A holds true.

Next, in step 2311 in the first cycle, it is judged that the MSB is not 1 for the first window sequence w[0]=(01)$_2$ on the more significant bit side (FIG. 21).

As a result, in step 2312 in the first cycle, V=V+T[w[0]]=V+T[1]=16A+45A=61A holds true.

Next, in step 2315 in the first cycle, the variable j=j+1=1 holds true.

Next, in step 2316 in the first cycle, the judgment of the variable j=1≤m−1=5−1=4 is YES.

As a result, control is returned to step 2310 in the second cycle.

Next, in step 2310 in the second cycle, the doubling process of V is performed k=2 times. That is, V=2$^k$V=2$^2$V=4×61A=244A holds true.

Next, in step 2311 in the second cycle, it is judged that the MSB is 1 for the second window sequence w[1]=(10)$_2$ on the more significant bit side (FIG. 21).

As a result, in step 2313 in the second cycle, the complement of 2 is calculated for w[1]=(10)$_2$, and Index=(10)$_2$=2 is calculated.

Next, V=V−T[Index]=V−T[2]=244A−46A=198A holds true.

Next, in step 2315 in the second cycle, the variable j=j+1=2 holds true.

Next, in step 2316 in the second cycle, the judgment of the variable j=2≤m−1=5−1=4 is YES.

As a result, control is returned to step 2310 in the third cycle.

Next, in step 2310 in the third cycle, the doubling process of V is performed k=2 times. That is, V=2$^k$V=2$^2$V=4×198A=792A holds true.

Next, in step 2311 in the third cycle, it is judged that the MSB is 1 for the third window sequence w[2]=(11)$_2$ on the more significant bit side (FIG. 21).

As a result, in step 2313 in the third cycle, the complement of 2 is calculated for w[2]=(11)$_2$, and Index=(01)$_2$=1 is calculated.

Next, V=V−T[Index]=V−T[1]=792A−45A=747A holds true.

Next, in step 2315 in the third cycle, the variable j=j+1=3 holds true.

Next, in step 2316 in the third cycle, the judgment of the variable j=3≤m−1=5−1=4 is YES.

As a result, control is returned to step 2310 in the fourth cycle.

Next, in step 2310 in the fourth cycle, the doubling process of V is performed k=2 times. That is, V=2$^k$V=2$^2$V=4×747A=2988A holds true.

Next, in step 2311 in the fourth cycle, it is judged that the MSB is 1 for the fourth window sequence w[3]=(10)$_2$ on the more significant bit side (FIG. 21).

As a result, in step 2313 in the fourth cycle, the complement of 2 is calculated for w[3]=(10)$_2$, and Index=(10)$_2$=2 is calculated.

Next, V=V−T[Index]=V−T[2]=2988A−46A=2942A holds true.

Next, in step 2315 in the fourth cycle, the variable j=j+1=4 holds true.

Next, in step 2316 in the fourth cycle, the judgment of the variable j=4≤m−1=5−1=4 is YES.

As a result, control is returned to step 2310 in the fifth cycle.

Next, in step 2310 in the fifth cycle, the doubling process of V is performed k=2 times. That is, V=2$^k$V=2$^2$V=4×2942A=11768A holds true.

Next, in step 2311 in the fifth cycle, it is judged that the MSB is 1 for the fifth window sequence w[4]=(11)$_2$ on the more significant bit side (FIG. 21).

As a result, in step 2313 in the fifth cycle, the complement of 2 is calculated for w[4]=(11)$_2$, and Index=(01)$_2$=1 is calculated.

Next, V=V−T[Index]=V−T[1]=11768A−45A=11723A holds true.

Next, in step 2315 in the fifth cycle, the variable j=j+1=5 holds true.

Next, in step 2316 in the fifth cycle, the judgment of the variable j=5≤m−1=5−1=4 is NO.

As a result, the value of the output variable V is output as a final result of the encrypting operation process. It corresponds to the result ((10110111001011)$_2$×A=11723A) of the scalar multiplication in a normal method. Then, the present embodiment is secured against the SPA by the window method, also secured against the DPA by randomized table data, capable of realizing the reduction ($2^{k-1}$+1 pieces) of table size, and also capable of realizing an encrypting operation process for simple carry control.

Described next is the second embodiment of a concrete process performed by the window value determination unit 1800 illustrated in FIG. 18 and the scalar multiplication unit 1900 for a point illustrated in FIG. 19.

In the second embodiment, in addition to the process according to the first embodiment, a different random number s (i) is used for each value of a window sequence. As a result, further confusion may be attained.

Figure 23A:
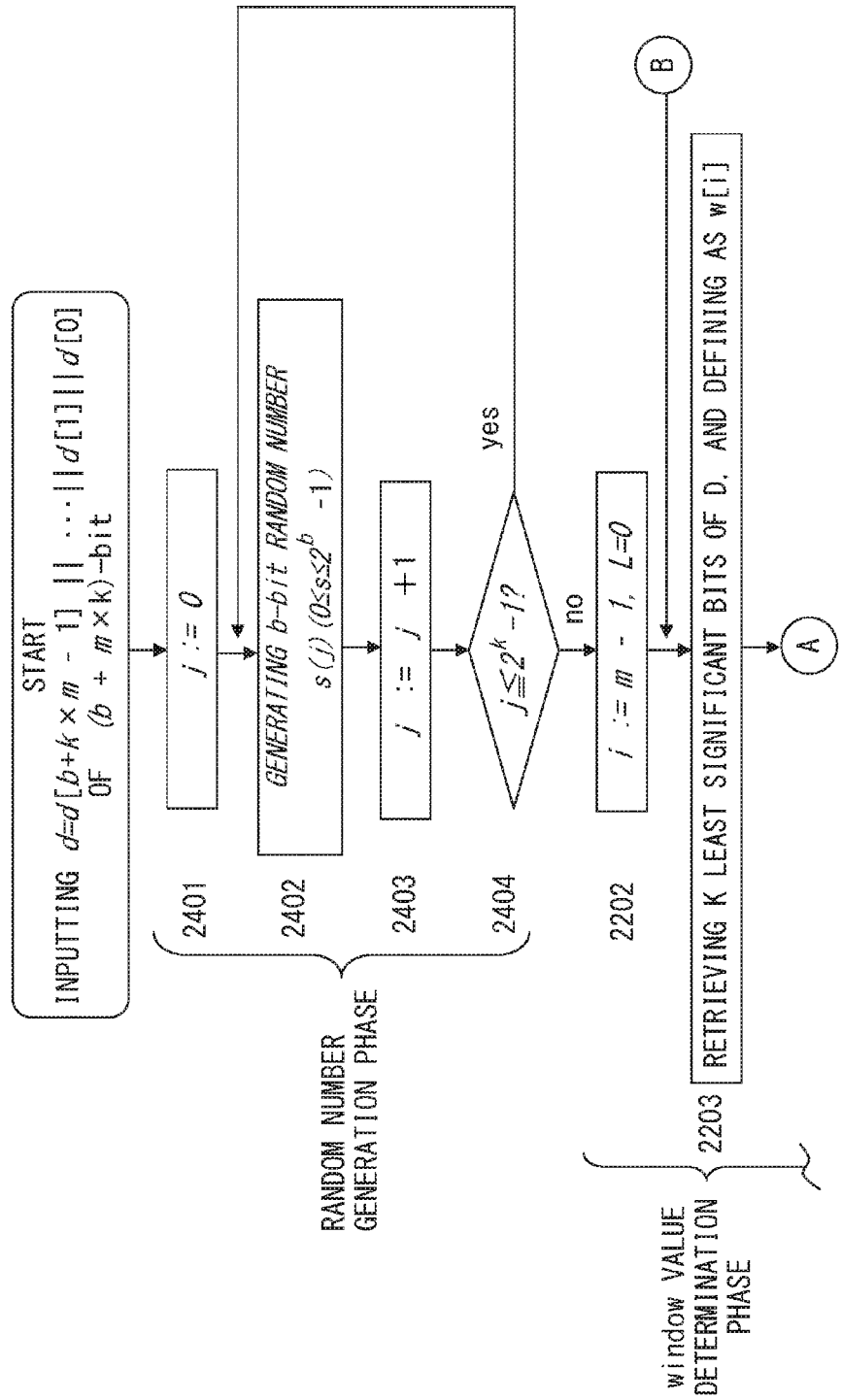

FIGS. 23A and 23B are a flowchart of the window value determination algorithm according to the second embodiment, and illustrates the process of the window value determination unit 1800 in FIG. 18. Described below is the process according to the flowchart.

In FIGS. 23A and 23B, the step in which the same process as the flowchart in FIGS. 20A and 20B according to the first embodiment is assigned the same reference numeral.

The process in FIGS. 23A and 23B is different from the process in FIGS. 20A and 20B first in the process in the random number generation phase. In the process, after the value of the variable j is initialized to 0 (step 2401), the value of the variable j is incremented up to $2^{k-1}$ (steps 2403 and 2404), and b-bit random number s (j) is generated for each variable j (step 2402).

Then, in step 2405 in FIGS. 23A and 23B corresponding to step 2205 in FIGS. 20A and 20B, a binary bit string x=(s(w(i))∥w(i)) obtained by concatenating the random number s (w(i)) corresponding to the value of the window sequence w(i) is acquired on the more significant bit side of the window sequence w(i).

Furthermore, in step 2406 in FIGS. 23A and 23B corresponding to step 2208 in FIGS. 20A and 20B, the bit string x=(s(v)∥v) is obtained by coupling the random number s(v) corresponding to the value of the bit string v on the more significant bit side of the bit string v (step 2406).

Thus described window values w[0] through w[m−1] are output with the random numbers s[0] through s[$2^{k-1}$], the correction value d', and the variable L indicating the window starting position.

An example of a concrete numeral calculation of the process of the window value determination algorithm in the second embodiment is described below with reference to the explanatory view of FIG. 24.

The values u, k, b, and m are determined as with the first embodiment.

For example, assume the elliptical curve cryptography where k=2, b=4, d=(11010010101111)$_2$ (length of d: u=14 bits). In this case, the following equations hold true by the calculation example by math 4.

$$h=u-b=10$$

$$m=5$$

$$b=u-k \times m=14-2\times5=4 \text{(no change)}$$

Under the conditions, first in step 2401, the variable j=0 is set as initial value.

Next, in step 2402 in the first cycle, for example, $(0111)_2$ is generated as a 4-bit random number s(0).

Next, in step 2403 in the first cycle, variable j=j+1=1.

Then, in step 2404 in the first cycle, the judgment of the variable $j=1 \leq 2^{2-1}=2$ is YES, and control is returned to step 2402 in the second cycle.

Next, in step 2402 in the second cycle, for example, $(1001)_2$ is generated as a 4-bit random number s(1).

Next, in step 2403 in the second cycle, the variable j=j+1=2 holds true.

Then, in step 2404 in the second cycle, the judgment of the variable $j=2 \leq 2^{2-1}=2$ is YES, and control is returned to step 2402 in the third cycle.

Next, in step 2402 in the third cycle, for example, $(1100)_2$ is generated as a 4-bit random number s(2).

Next, in step 2403 in the third cycle, the variable j=j+1=3.

Then, in step 2404 in the third cycle, the judgment of the variable $j=3 \leq 2^{2-1}=2$ is NO, thereby terminating the process in the random number generation phase.

Next, in step 2202, the initialization is performed for i=m-1=5-1=4, L=0.

Next, in step 2203 in the first cycle, the 2 least significant bits of d are retrieved and assigned $w[4]=(11)_2$ as illustrated in FIG. 24.

Next, in step 2204 in the first cycle, it is judged that the most significant bit bit of w[4] is 1.

As a result, in step 2207 in the first cycle, the complement of 2 is calculated for $w[4]=(11)_2$, thereby obtaining $v=(01)_2$.

Then, in step 2406 in the first cycle, $x=(s((01)_2)\|v)=(100101)_2$ is calculated using the random number $s(v)=s((01)_2)$ corresponding to $v=(01)_2$.

Then, in step 2209 in the first cycle, the value −x obtained by adding a minus sign to x in FIG. 24 is subtracted from the value of the current secret key d. That is, a new secret key d is calculated as $d=d-(-x)=d+x=(11010010101111)_2+(100101)_2=(11010011010100)_2$.

Next, in step 2210 in the first cycle, the secret key d above is 2 bits right-shifted. That is, $d=d\gg 2=(110100110101)_2$ is calculated.

Next, in step 2211 in the first cycle, 1 is subtracted from the value of the variable i. That is, i=i−1=3.

Next, in step 2212 in the first cycle, it is judged that the variable i=3 is 0 or more, and control is returned to step 2203 in the second cycle.

Next, in step 2203 in the second cycle, as illustrated in FIG. 24, 2 least significant bits are retrieved from d as $w[3]=(01)_2$.

Next, in step 2204 in the second cycle, it is judged that the most significant bit of w[3] is not 1.

As a result, in step 2405 in the second cycle, as illustrated in FIG. 24, $x=(s((01)_2)\|w[3])=(100101)_2$ is calculated using the random number $s(w[3])=s((01)_2)$ corresponding to $w[3]=(01)_2$.

Next, in step 2220 in the second cycle, it is judged that $d-x=(110100110101)_2-(100101)_2=(110100010000)_2$ is not 0 or less.

Then, in step 2206 in the second cycle, the value $d-x=(110100010000)_2$ above is the value of a new secret key d.

Next, in step 2210 in the second cycle, the secret key d above is 2 bits right-shifted. That is, $d=d\gg 2=(1101000100)_2$ is calculated.

Next, in step 2211 in the second cycle, 1 is subtracted from the value of the variable i. That is, i=i−1=2.

Next, in step 2212 in the second cycle, it is judged that the variable i=2 is 0 or more, and control is returned to step 2203 in the third cycle.

Next, in step 2203 in the third cycle, as illustrated in FIG. 24, 2 least significant bits are retrieved from d as $w[2]=(00)_2$.

Next, in step 2204 in the third cycle, it is judged that the most significant bit of w[2] is not 1.

As a result, in step 2405 in the third cycle, as illustrated in FIG. 24, $x=(s((00)_2)\|w[2])=(011100)_2$ is calculated using the random number $s(w[2])=s((00)_2)$ corresponding to $w[2]=(00)_2$.

Next, in step 2220 in the third cycle, it is judged that $d-x=(1101000100)_2-(011100)_2=(1100101000)_2$ is not 0 or less.

Then, in step 2206 in the third cycle, the value $d-x=(1100101000)_2$ above is the value of a new secret key d.

Next, in step 2210 in the third cycle, the secret key d above is 2 bits right-shifted. That is, $d=d\gg 2=(11001010)_2$ is calculated.

Next, in step 2211 in the third cycle, 1 is subtracted from the value of the variable i. That is, i=i−1=1.

Next, in step 2212 in the third cycle, it is judged that the variable i=1 is 0 or more, and control is returned to step 2203 in the fourth cycle.

Next, in step 2203 in the fourth cycle, as illustrated in FIG. 24, 2 least significant bits are retrieved from d as $w[1]=(10)_2$.

Next, in step 2204 in the fourth cycle, it is judged that the most significant bit of w[1] is 1.

As a result, in step 2207 in the fourth cycle, the complement of 2 is calculated for $w[1]=(10)_2$, thereby obtaining $v=(10)_2$.

Then, in step 2406 in the fourth cycle, $x=(s((10)_2)\|v)=(110010)_2$ is calculated using the random number $s((10)_2)$ corresponding to $v=(10)_2$.

Then, in step 2209 in the fourth cycle, the value −x obtained by adding a minus sign to x in FIG. 24 is subtracted from the value of the current secret key d. That is, a new secret key d is calculated as $d=d-(-x)=d+x=(11001010)_2+(110010)_2=(11111100)_2$.

Next, in step 2210 in the fourth cycle, the secret key d above is 2 bits right-shifted. That is, $d=d\gg 2=(111111)_2$ is calculated.

Next, in step 2211 in the fourth cycle, 1 is subtracted from the value of the variable i. That is, i=i−1=0.

Next, in step 2212 in the fourth cycle, it is judged that the variable i=0 is 0 or more, and control is returned to step 2203 in the fifth cycle.

Next, in step 2203 in the fifth cycle, as illustrated in FIG. 24, 2 least significant bits are retrieved from d as $w[0]=(11)_2$.

Next, in step 2204 in the fifth cycle, it is judged that the most significant bit of w[0] is 1.

As a result, in step 2207 in the fifth cycle, the complement of 2 is calculated for $w[0]=(11)_2$, thereby obtaining $v=(01)_2$.

Then, in step 2406 in the fifth cycle, $x=(s((01)_2)\|=(100101)_2$ is calculated using the random number $s((01)_2)$ corresponding to $v=(01)_2$.

Then, in step 2209 in the fifth cycle, the value −x obtained by adding a minus sign to x in FIG. 24 is subtracted from the value of the current secret key d. That is, a new secret key d is calculated as d=d−(−x)=d+x=(111111)$_2$+(100101)$_2$= (1100100)$_2$.

Next, in step 2210 in the fifth cycle, the secret key d above is 2 bits right-shifted. That is, d=d>>2=(11001)$_2$ is calculated.

Next, in step 2211 in the fifth cycle, 1 is subtracted from the value of the variable i. That is, i=i−1=−1.

Next, in step 2212 in the fifth cycle, it is judged that the variable i=−1 is not 0 or more, and control is passed to step 2213. As a result, the finally obtained secret key d=(11001)$_2$ is correction value d' as illustrated in FIG. 24.

As a result of the processes above, the finally obtained values of window sequences w[0] through w[4], the random numbers s[0] through s[$2^{k-1}$], the correction value d', and the variable L=0 indicating the window starting position, thereby terminating the process of the window value determination algorithm.

Figure 25A:
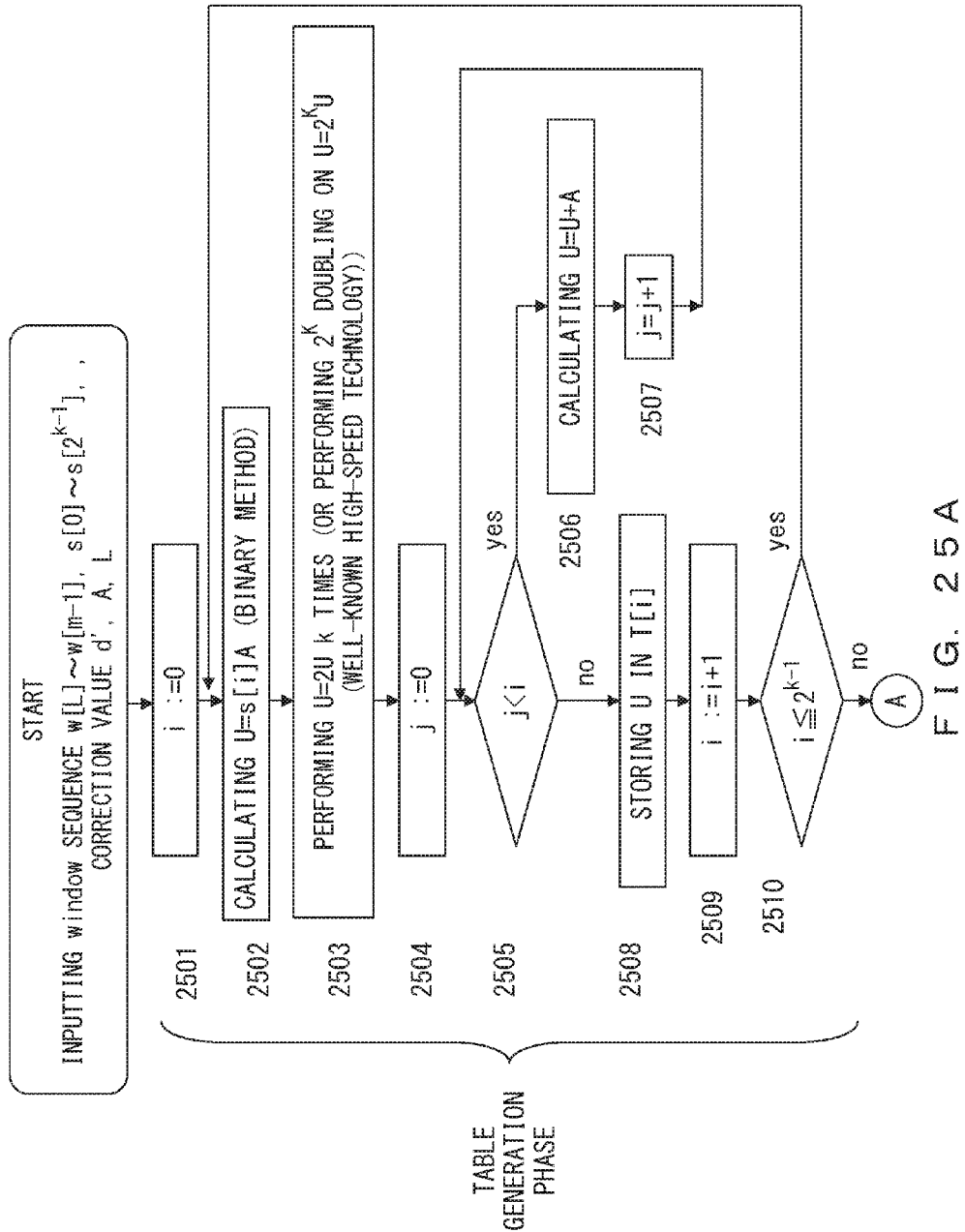
FIGS. 25A and 25B are a flowchart of the scalar multiplication algorithm of a point according to the first embodiment.
Figure 25B:
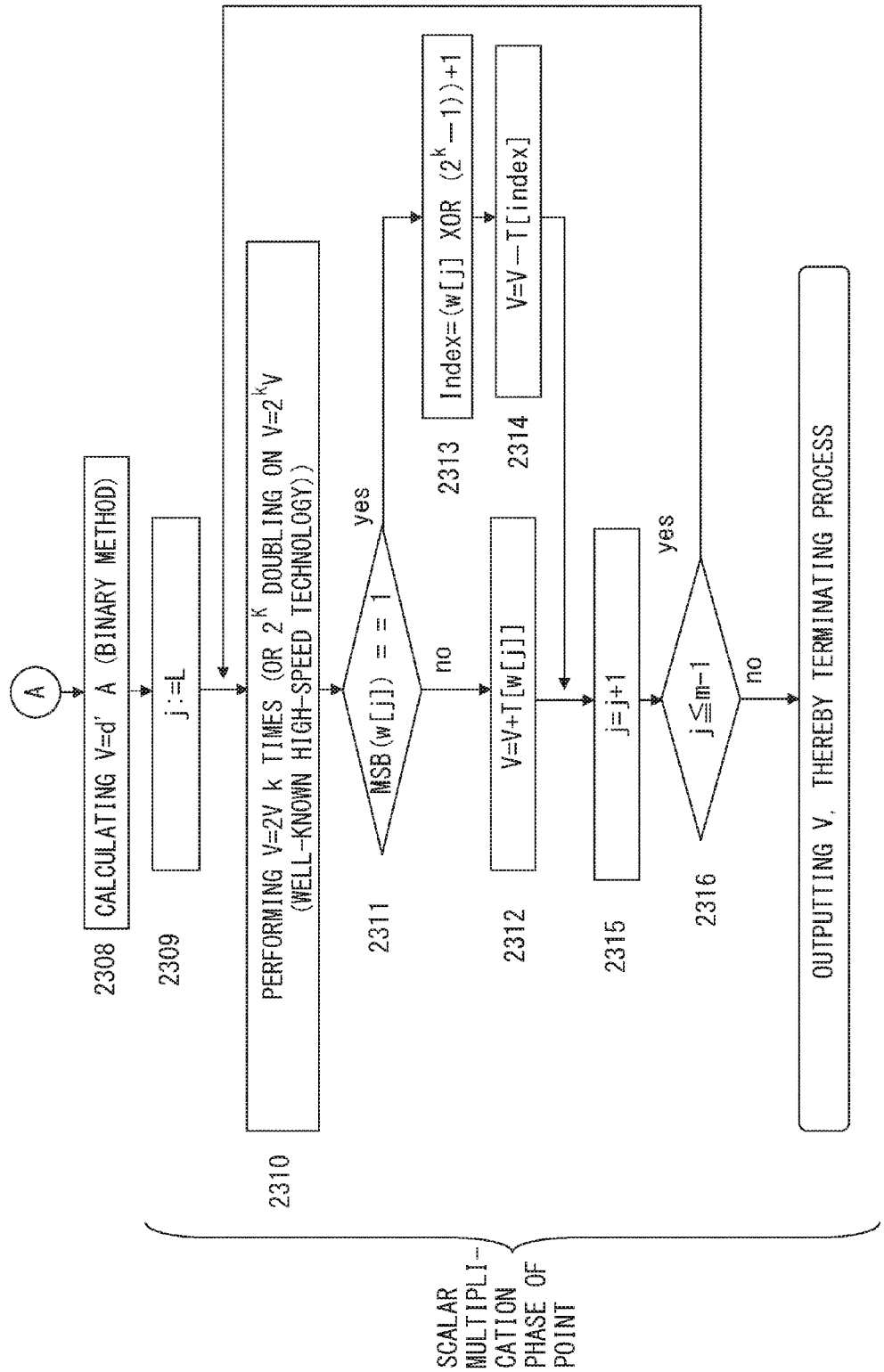

FIGS. 25A and 25B are a flowchart of the scalar multiplication algorithm according to the second embodiment, and illustrates the process of the scalar multiplication unit 1900 of a point in FIG. 19. Described below is the process according to the flowchart.

In FIGS. 25A and 25B, the step in which the same process as the flowchart in FIGS. 22A and 22B according to the first embodiment is assigned the same reference numeral.

The process in FIGS. 25A and 25B is different from the process in FIGS. 22A and 22B in the process of the table generation phase in steps 2501 through 2510. The process of the scalar multiplication phase of a point in steps 2308 through 2316 is the same as that in FIGS. 22A and 22B.

The window sequences w[L] through w[m−1] calculated by the window value determination algorithm in FIGS. 23A and 23B, the random numbers s[0] through s[$2^{k-1}$], the correction value d', and the variable L indicating the window stating position are input. Furthermore, a point A on the elliptical curve for a scalar multiplication is input.

First, the value of the variable i is initialized to 0 (step 2501). The variable i determines a table entry.

Next, the scalar multiplication s[i]A for the point A having the random number s[i] corresponding to the current variable i as a scalar value is calculated, and the result is stored in the variable U (step 2502). The normal binary method may be applied to the calculation.

Next, to obtain a scalar multiplication result in the state in which the random number s[i] is arranged on the more significant bit side, the arithmetic process which performs doubling=2U on the value of the variable U calculated in step 2502 and obtains a new variable U is performed k times (step 2503). Otherwise, the doubling process using U=$2^k$U may be performed by well-known high speed technology. Thus, an arithmetic component of the scalar multiplication on the random number s[i] is obtained in the state in which the random number s[i] is concatenated to the window sequence of k less significant bits.

Next, the value of the variable j is initialized to 0 (step 2504).

Then, the adding process of the point of U=U+A is repeated (step 2506) so far as the value of the variable j is smaller than the value of the variable i (step 2505) while incrementing the value of the variable j (step 2507).

When the value of the variable j reaches the value of the variable i, the addition result of the variable U is stored in the table entry T[i] (step 2508).

Next, 1 is added to the value of variable i (step 2509).

Then, it is judged whether or not the value of the variable i is $2^{k-1}$ or less (step 2510).

If the value of the variable i is $2^{k-1}$ or less, control is returned to step S2502, and the calculation of the subsequent table entry is performed.

As described above, table data T[i] may be generated using the random number s[i] different for each table entry. Thus, the confusion of table data is further attained, thereby intensifying the fastness against the DPA.

Hereafter, the encrypting operation process is performed using the contents of the table data T[i] in the scalar multiplication phase of a point in steps 2308 through 2316.

Described below is a concrete example of a numerical operation in the process of the scalar multiplication algorithm of a point according to the second embodiment.

The input values of the window sequences w[0] through w[4], the random numbers s[0] through s[2], the correction value d', and the variable L indicating the window starting position are obtained in the above-mentioned example of the numerical operation in FIG. 24. Described first is an example of a numerical operation of the table generation phase.

First, in step 2501, the variable i=0 holds true. Next, in step 2502 in the first cycle of the variable i, U=(0111)$_2$×A is calculated using the random numbers [0]=(0111)$_2$ (FIG. 24).

Next, in step 2503 in the first cycle of the variable i, the doubling process of U is performed k=2 times. That is, U=$2^2$U=$2^2$×(0111)$_2$×A=4×7×A=28A holds true.

Next, in step 2504 in the first cycle of the variable i, the variable j=0 holds true.

Next, in step 2505 in the first cycle of the variable j in the first cycle of the variable i, the judgment of j=0<i=0 is NO.

As a result, in step 2508 in the first cycle of the variable i, U=28A is stored in the table entry T[0] corresponding to the index value 0.

Next, in step 2509 in the first cycle, the variable i=i+1=1 holds true.

Next in step 2510 in the first cycle, the judgment of the variable i=1≤$2^1$=2 is YES, and control is returned to step 2502 in the second cycle.

Next, in step 2502 in the second cycle of the variable i, U=(1001)$_2$×A is calculated using the random number s[1]=(1001)$_2$ (FIG. 24).

Next, in step 2503 in the second cycle of the variable i, the doubling process of U is performed k=2 times. That is, U=$2^2$U=$2^2$×(1001)$_2$×A=4×9×A=36A holds true.

Next, in step 2504 in the second cycle of the variable i, the variable j=0 holds true.

Next, in step 2505 in the first cycle of the variable j in the second cycle of the variable i, the judgment of j=0<i=1 is YES.

As a result, in step 2506 in the first cycle of the variable j in the second cycle of the variable i, U=U+A=36A+A=37A is calculated.

Next, in step 2507 in the first cycle of the variable j in the second cycle of the variable i, the variable j=j+1=1 holds true, thereby returning control to step 2505 in the second cycle of the variable j.

Next, in step 2505 in the second cycle of the variable j in the second cycle of the variable i, the judgment of j=1<i=1 is NO.

As a result, in step 2508 in the second cycle of the variable i, U=37A is stored in the table entry T[1] corresponding to the index value 1.

Next, in step 2509 in the second cycle, the variable i=i+1=2 holds true.

Next in step 2510 in the second cycle, the judgment of the variable i=2≤$2^1$=2 is YES, and control is returned to step 2502 in the third cycle.

Next, in step 2502 in the third cycle of the variable i, $U=(1100)_2 \times A$ is calculated using the random number s $[2]=(1100)_2$ (FIG. 24).

Next, in step 2503 in the third cycle of the variable i, the doubling process of U is performed k=2 times. That is, $U=2^2U=2^2 \times (1100)_2 \times A = 4 \times 12 \times A = 48A$ holds true.

Next, in step 2504 in the third cycle of the variable i, the variable j=0 holds true.

Next, in step 2505 in the first cycle of the variable j in the third cycle of the variable i, the judgment of j=0<i=2 is YES.

As a result, in step 2506 in the first cycle of the variable j in the third cycle of the variable i, U=U+A=48A+A=49A is calculated.

Next, in step 2507 in the first cycle of the variable j in the third cycle of the variable i, the variable j=j+1=1 holds true, thereby returning control to step 2505 in the second cycle of the variable j.

Next, in step 2505 in the second cycle of the variable j in the third cycle of the variable i, the judgment of j=1<i=2 is YES.

As a result, in step 2506 in the second cycle of the variable j in the third cycle of the variable i, U=U+A=49A+A=50A is calculated.

Next, in step 2507 in the second cycle of the variable j in the third cycle of the variable i, the variable j=j+1=2 holds true, thereby returning control to step 2505 in the third cycle of the variable j.

Next, in step 2505 in the third cycle of the variable j in the third cycle of the variable i, the judgment of j=2<i=2 is NO.

As a result, in step 2508 in the third cycle of the variable i, U=50A is stored in the table entry T[2] corresponding to the index value 2.

Next, in step 2509 in the third cycle, the variable i=i+1=3 holds true.

Next in step 2510 in the third cycle, the judgment of the variable $i=3 \leq 2^1=2$ is NO, thereby terminating the process of the random number generation phase.

Thus, $2^{k-1}+1=3$ table data, that is, T[0], T[1], and T[2] are generated.

Described next is an example of a numerical operation in the scalar multiplication phase of a point.

First, in step 2308, the correction value $d'=(11001)_2$ holds true (FIG. 24), $V=d'A=(11001)_2 \times A=25A$ is calculated.

Next, in step 2309, the variable j=L=0 holds true.

Next, in step 2310 in the first cycle, the doubling process of V is performed k=2 times. That is, $V=2^kV=2^2V=4 \times 25=100A$ holds true.

Next, in step 2311 in the first cycle, it is judged that the MSB is 1 for the first window sequence $w[0]=(11)_2$ on the more significant bit side (FIG. 24).

As a result, in step 2313 in the first cycle, the complement of 2 is calculated for $w[0]=(11)_2$, and $Index=(01)_2=1$ is calculated.

Next, V=V−T[Index]=V−T[1]=100A−37A=63A is calculated.

Next, in step 2315 in the first cycle, the variable j=j+1=1 holds true.

Next, in step 2316 in the first cycle, the judgment of the variable j=1≤m−1=5−1=4 is YES.

As a result, control is returned to step 2310 in the second cycle.

Next, in step 2310 in the second cycle, the doubling process of V is performed k=2 times. That is, $V=2^kV=2^2V=4 \times 63A=252A$ holds true.

Next, in step 2311 in the second cycle, it is judged that the MSB is 1 for the second window sequence $w[1]=(10)_2$ on the more significant bit side (FIG. 24).

As a result, in step 2313 in the second cycle, the complement of 2 is calculated for $w[1]=(10)_2$, and $Index=(10)_2=2$ is calculated.

Next, V=V−T[Index]=V−T[2]=252A−50A=202A holds true.

Next, in step 2315 in the second cycle, the variable j=j+1=2 holds true.

Next, in step 2316 in the second cycle, the judgment of the variable j=2≤m−1=5−1=4 is YES.

As a result, control is returned to step 2310 in the third cycle.

Next, in step 2310 in the third cycle, the doubling process of V is performed k=2 times. That is, $V=2^kV=2^2V=4 \times 202A=808A$ holds true.

Next, in step 2311 in the third cycle, it is judged that the MSB is not 1 for the third window sequence $w[2]=(00)_2$ on the more significant bit side (FIG. 24).

As a result, in step 2312 in the third cycle, V=V+T[w[2]]=V+T[0]=808A+28A=836A holds true.

Next, in step 2315 in the third cycle, the variable j=j+1=3 holds true.

Next, in step 2316 in the third cycle, the judgment of the variable j=3≤m−1=5−1=4 is YES.

As a result, control is returned to step 2310 in the fourth cycle.

Next, in step 2310 in the fourth cycle, the doubling process of V is performed k=2 times. That is, $V=2^kV=2^2V=4 \times 868A=3344A$ holds true.

Next, in step 2311 in the fourth cycle, it is judged that the MSB is not 1 for the fourth window sequence $w[3]=(01)_2$ on the more significant bit side (FIG. 24).

As a result, in step 2312 in the fourth cycle, V=V+T[w[3]]=V+T[1]=3344A+37A=3381A holds true.

Next, in step 2315 in the fourth cycle, the variable j=j+1=4 holds true.

Next, in step 2316 in the fourth cycle, the judgment of the variable j=4≤m−1=5−1=4 is YES.

As a result, control is returned to step 2310 in the fifth cycle.

Next, in step 2310 in the fifth cycle, the doubling process of V is performed k=2 times. That is, $V=2^kV=2^2V=4 \times 3381A=13524A$ holds true.

Next, in step 2311 in the fifth cycle, it is judged that the MSB is 1 for the fifth window sequence $w[4]=(11)_2$ on the more significant bit side (FIG. 24).

As a result, in step 2313 in the fifth cycle, the complement of 2 is calculated for $w[4]=(11)_2$, and $Index=(01)_2=1$ is calculated.

Next, V=V−T[Index]=V−T[1]=13524A−37A=13487A holds true.

Next, in step 2315 in the fifth cycle, the variable j=j+1=5 holds true.

Next, in step 2316 in the fifth cycle, the judgment of the variable j=5≤m−1=5−1=4 is NO.

As a result, the value of the output variable V is output as a final result of the encrypting operation process. It corresponds to the result $((11010010101111)_2 \times A=13487A)$ of the scalar multiplication in a normal method. Then, in the present embodiment, the table data is randomized by the random number s[i] for each entry in addition to the effect according to the first embodiment, thereby attaining further security against the DPA.

Described below is the third embodiment. In the third embodiment, the technology of improving the confusion by using a different random number s(i) for each value of a window sequence as with the second embodiment is applied to the modular exponentiation operation (RSA) encrypting process other than the elliptical curve cryptography.

The third embodiment may be embodied with the same configuration as the window value determination unit 1800 in FIG. 18 and the configuration in which the scalar multiplication unit 1900 of a point in FIG. 19 is replaced with an modular exponentiation calculation unit.

Figure 26A:
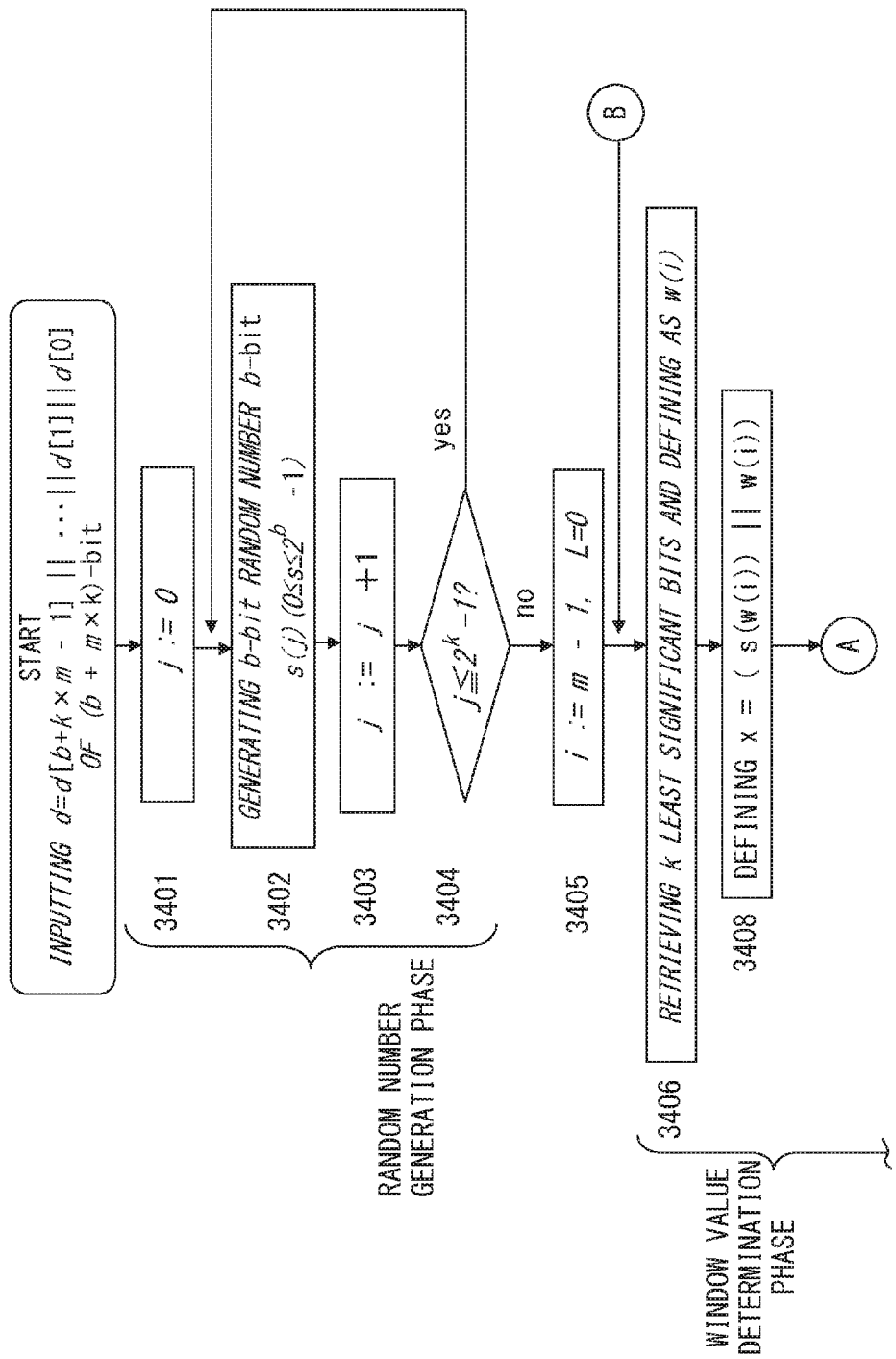
FIGS. 26A and 26B are a flowchart of the window value determination algorithm according to the third embodiment.
Figure 26B:
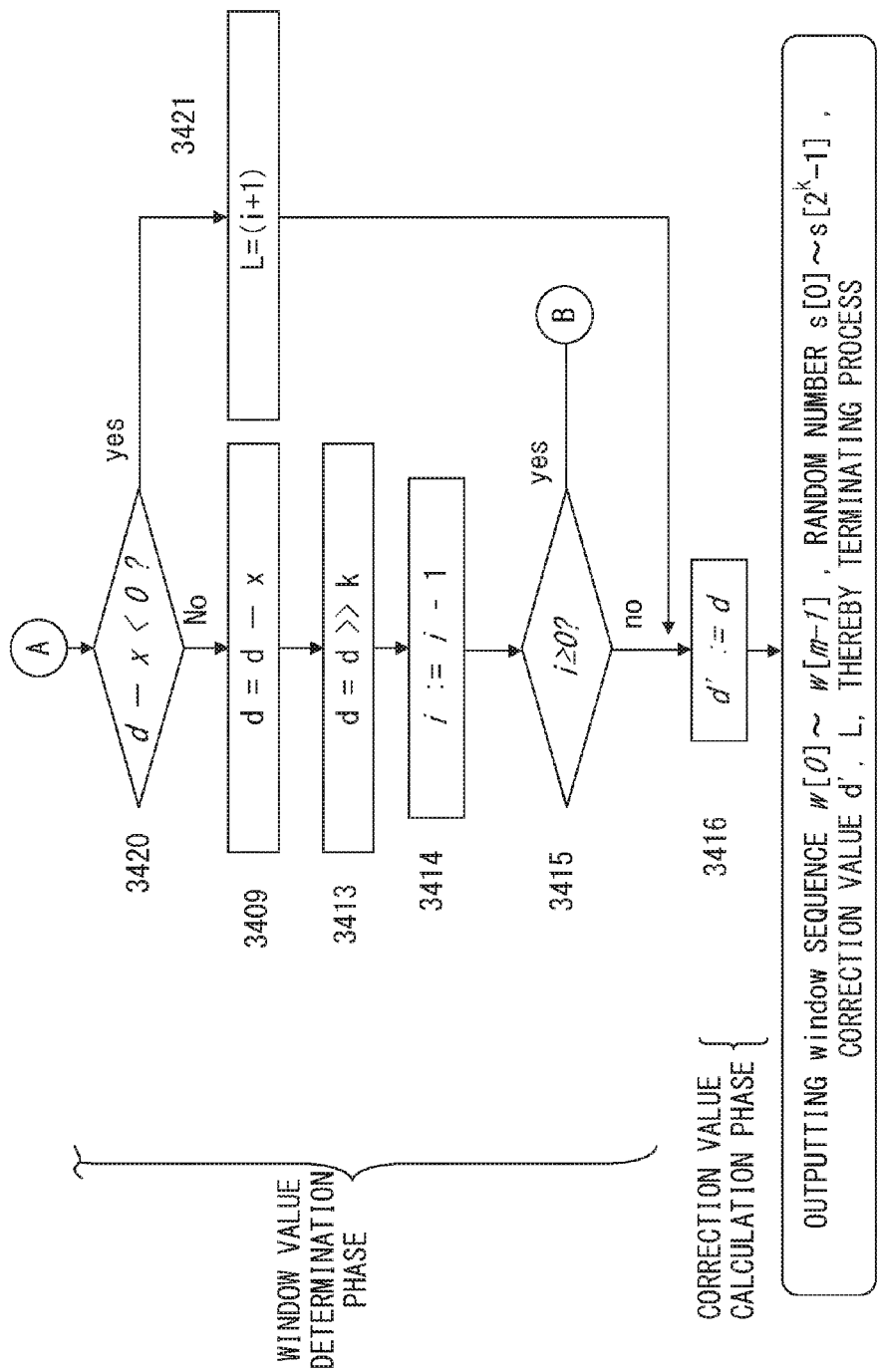

FIGS. 26A and 26B are a flowchart of the window value determination algorithm according to the third embodiment. Described below is the process according to the flowchart. First, the process in a random number generation phase is performed in steps 3401 through 3404. In this process, after the value of the variable j is initialized to 0 (step 3401), the value of the variable j is incremented by $2^k-1$ (steps 3403 and 3401), thereby generating a b-bit random number s(j) (step 3402).

In the process of the random number generation phase, a b-bit random number s(j) is generated for each value from 0 to $2^k-1$ which may be changed as a window value. Next, the process of the window value determination phase in steps 3405 through 3415 is described.

First, the value of the variable i is initialized to m−1, and the value of the variable L is initialized to 0 (step 3405).

Next, k least significant bits of the current secret key d are retrieved and defined as a window sequence w(i) (step 3406).

Next, a binary bit string x=(s(w(i))||w(i)) is obtained by concatenating the random number s(w(i)) corresponding to the value of the window sequence w(i) on the more significant bit side of the window sequence w(i) (step 3408).

Then, a bit string x is subtracted from the current secret key d, and it is described whether or not the subtraction result is less than 0 (step 3420).

Unless the subtraction result is less than 0, the subtraction result is the bit string of anew secret key d (step 3420→3409).

Next, if a new secret key d is calculated in step 3409, the bit string of the secret key d is right-shifted by k bits, and the k least significant bits are truncated (step 3410).

Next, 1 is subtracted from the value of the variable i (step 3414).

Then, it is judged whether or not the value of the variable i is 0 or more (step 3415).

If the value of the variable i is 0 or more, control is returned to step 3406, and a series of processes from step 3406 to step 3415 are performed again (step 3415→3406).

If the value of the variable i is less than 0 as a result of the repeated operations above, control is passed to step 3416 (step 3415→3416).

In addition, also when the value of d−x is less than 0 in step 3420 above, control is passed to step 3416 after the value of the current i+1 is set to the value of the variable L (step 3420→3421). The process is described later.

Finally, the value of the current secret key d is defined as the correction value d′ (step 3416).

Then, the finally obtained window sequences w[0] through w[m−1], random numbers s[0] through s[$2^k-1$], correction value d′, and variable L indicating the window starting position are output, thereby terminating the process of the window value determination algorithm.

A concrete numerical operation example of the process of the window value determination algorithm according to the third embodiment is described below with reference to the explanatory view in FIG. 27.

In this example, assume the process of the modular exponentiation operation cryptography (RSA cryptography etc.) when k=2, b=4, d=(100011000101101)$_2$ (length of d:

u=15 bits) holds true. In this case, the following equations hold true by the calculation example by math 4.

$$h=u-b=11$$

$$m=5$$

$$b=u-k\times m=15-2\times 5=5 \text{(changed)}$$

Under the conditions, first in step 3401, the variable j=0 is set as initial value.

Next, in step 3402 in the first cycle, for example, (01011)$_2$ is generated as a 5-bit random number s(0).

Next, in step 3403 in the first cycle, variable j=j+1=1.

Then, in step 3404 in the first cycle, the judgment of the variable j=1≤$2^2-1$=3 is YES, and control is returned to step 3402 in the second cycle.

Next, in step 3402 in the second cycle, for example, (11000)$_2$ is generated as a 5-bit random number s(1).

Next, in step 3403 in the second cycle, the variable j=j+1=2.

Then, in step 3404 in the second cycle, the judgment of the variable j=2≤$2^2-1$=3 is YES, and control is returned to step 2402 in the third cycle.

Next, in step 3402 in the third cycle, for example, (11011)$_2$ is generated as a 5-bit random number s(2).

Next, in step 3403 in the third cycle, variable j=j+1=3.

Then, in step 3404 in the third cycle, the judgment of the variable j=3≤$2^2-1$=3 is YES, and control is returned to step 3402 in the fourth cycle.

Next, in step 3402 in the fourth cycle, for example, (00101)$_2$ is generated as a 5-bit random number s(3).

Next, in step 3403 in the fourth cycle, the variable j=j+1=4 holds true.

Then, in step 3404 in the fourth cycle, the judgment of the variable j=4≤$2^2-1$=3 is NO, thereby terminating the process in the random number generation phase.

Next, in step 3405, the initialization of i=m−1=5−1=4, L=0 is performed.

Next, in step 3406 in the first cycle, as illustrated in FIG. 27, 2 least significant bits of d are retrieved for w[4]=(01)$_2$.

Next, in step 3408 in the first cycle, as illustrated in FIG. 27, x=(s (01)$_2$||w[4]) (1100001)$_2$ is calculated using the random number s(w[4])=s((01)$_2$) corresponding to w[4]=(01)$_2$.

Next, in step 3420 in the first cycle, it is judged that d−x=(100011000101101)$_2$−(1100001)$_2$= (100010111001100)$_2$ is not less than 0.

Then, in step 3420 in the first cycle, the value d−x= (100010111001100)$_2$ above is the value of a new secret key d.

Next, in step 3413 in the first cycle, the secret key d is right shifted by 2 bits. That is, d=d>>2=(1000101110011)$_2$ is calculated.

Next, in step 3414 in the first cycle, 1 is subtracted from the value of variable i. That is, i=i−1=3 holds true.

Next, in step 3415 in the first cycle, it is judged that the variable i=3 is 0 or more, thereby returning control to step 3406 in the second cycle.

Next, in step 3406 in the second cycle, as illustrated in FIG. 27, two least significant bits of d are retrieved as w[3]=(11)$_2$.

Next, in step 3408 in the second cycle, as illustrated in FIG. 27, x=(s((11)$_2$)||w[3])=(00101111)$_2$ is calculated using the random number s(w[3])=s((11)$_2$) corresponding to w[3]=(11)$_2$.

Next, in step 3420 in the second cycle, it is judged that) d−x=(1000101110011)$_2$−(0010111)$_2$=(1000101011100)$_2$ is not less than 0.

Then, in step 3420 in the second cycle, the value d−x (1000101011100)$_2$ above is the value of a new secret key d.

Next, in step 3413 in the second cycle, the secret key d is right shifted by 2 bits. That is, d=d>>2=(10001010111)$_2$ is calculated.

Next, in step 3414 in the second cycle, 1 is subtracted from the value of variable i. That is, i=i−1=2 holds true.

Next, in step 3415 in the second cycle, it is judged that the variable i=2 is 0 or more, thereby returning control to step 3406 in the third cycle.

Next, in step 3406 in the third cycle, as illustrated in FIG. 27, two least significant bits of d are retrieved as w[2]=(11)$_2$.

Next, in step 3408 in the third cycle, as illustrated in FIG. 27, x=(s((11)$_2$)∥w[2])=(0010111)$_2$ is calculated using the random number s(w[2])=s((11)$_2$) corresponding to w[2]= (11)$_2$.

Next, in step 3420 in the third cycle, it is judged that d−x=(10001010111)$_2$−(0010111)$_2$=(10001000000)$_2$ is not less than 0.

Then, in step 3420 in the third cycle, the value d−x= (10001000000)$_2$ above is the value of a new secret key d.

Next, in step 3413 in the third cycle, the secret key d is right shifted by 2 bits. That is, d=d>>2=(100010000)$_2$ is calculated.

Next, in step 3414 in the third cycle, 1 is subtracted from the value of variable i. That is, i=i−1=1 holds true.

Next, in step 3415 in the third cycle, it is judged that the variable i=1 is 0 or more, thereby returning control to step 3406 in the fourth cycle.

Next, in step 3406 in the fourth cycle, as illustrated in FIG. 27, two least significant bits of d are retrieved as w[1]=(00)$_2$.

Next, in step 3408 in the fourth cycle, as illustrated in FIG. 27, x=(s((00)$_2$)∥w[1])=(0101100)$_2$ is calculated using the random number s(w[1])=s((00)$_2$) corresponding to w[1]=(00)$_2$.

Next, in step 3420 in the fourth cycle, it is judged that d−x=(100010000)$_2$−(0101100)$_2$=(11100100)$_2$ is not less than 0.

Then, in step 3420 in the fourth cycle, the value d−x= (11100100)$_2$ above is the value of a new secret key d.

Next, in step 3413 in the fourth cycle, the secret key d is right shifted by 2 bits. That is, d=d>>2=(111001)$_2$ is calculated.

Next, in step 3414 in the second cycle, 1 is subtracted from the value of variable i. That is, i=i−1=0 holds true.

Next, in step 3415 in the fourth cycle, it is judged that the variable i=0 is 0 or more, thereby returning control to step 3406 in the fifth cycle.

Next, in step 3406 in the fifth cycle, as illustrated in FIG. 27, two least significant bits of d are retrieved as w[0]=(01)$_2$.

Next, in step 3408 in the fifth cycle, as illustrated in FIG. 27, x=(s((01)$_2$)∥w[0])=(1100001)$_2$ is calculated using the random number s(w[0])=s((01)$_2$) corresponding to w[0]= (01)$_2$.

Next, in step 3420 in the fifth cycle, it is judged that d−x=(111001)$_2$−(1100001)$_2$ is less than 0.

As a result, in step 3421 in the fifth cycle, L=i+1=0+1=1 holds true. Thus, the window sequence w[0] is not adopted.

Then, control is passed to step 3416, and the value of the current secret key d is defined as the correction value d'=(111001)$_2$.

When the judgment of d−x<0 in step 3420 is not YES, and it is judged in step 3415 that the value of the variable i is less than 0, that is, when the window sequence is determined by the set number, control is passed to step 3416, and the correction value d' is calculated.

As described above, the window sequences w[1] through w[4], the random numbers s[0] through s[3], the correction value d', and the variable L indicating the window starting position are output, thereby terminating the process.

Figure 28A:
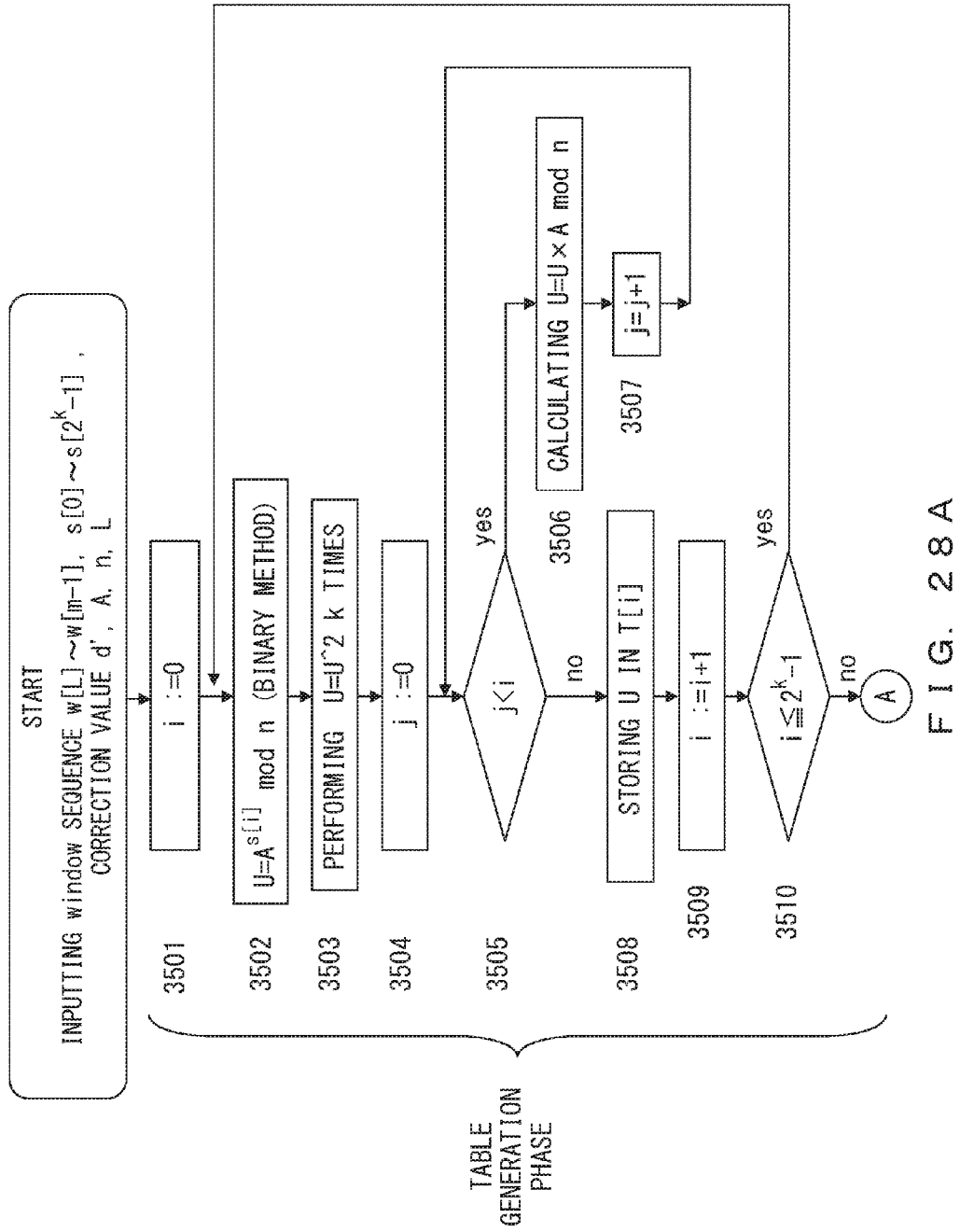

FIGS. 28A and 28B are a flowchart of the modular exponentiation algorithm according to the third embodiment. Described below is the process according to the flowchart.

The window sequences w[L] through w[m−1] calculated by the window value determination algorithm in FIGS. 23A and 23B, the random numbers s[0] through s[$2^{k-1}$], the correction value d', and the variable L indicating the window stating position are input. Furthermore, an input value A and a modulo number n for modular exponentiation operation are input.

First, the value of the variable i is initialized to 0 (step 3501). The variable i determines a table entry.

Next, the modular exponentiation operation $A^{s[i]}$ mod n for the point A having the random number s[i] corresponding to the current variable i as an exponential value is calculated, and the result is stored in the variable U (step 3502). The normal binary method may be applied to the calculation.

Next, to obtain an modular exponentiation operation result in the state in which the random number s[i] is arranged on the more significant bit side, the arithmetic process which performs $U=U^2$ k times on the value of the variable U calculated in step 3502 and obtains a new variable U is performed (step 3503). Thus, an arithmetic component of the modular exponentiation operation on the random number s[i] is obtained in the state in which the random number s[i] is concatenated to the window sequence of k less significant bits.

Next, the value of the variable j is initialized to 0 (step 3504).

Then, the arithmetic process of U=U×A mod n is repeated (step 3506) so far as the value of the variable j is smaller than the value of the variable i (step 3505) while incrementing the value of the variable j (step 3507).

When the value of the variable j reaches the value of the variable i, the addition result of the variable U is stored in the table entry T[i] (step 3508).

Next, 1 is added to the value of variable i (step 3509).

Then, it is judged whether or not the value of the variable i is $2^{k-1}$ or less (step 3510).

If the value of the variable i is $2^{k-1}$ or less, control is returned to step 3502, and the calculation of the subsequent table entry is performed.

As described above, table data T[i] may be generated using the random number s[i] different for each table entry. Thus, the randomness of table data is further attained, thereby intensifying the fastness against the DPA.

When the value of the variable i reaches $2^{k-1}$, the table generation phase is terminated, and control is passed to the process of the modular exponentiation phase to be treated actually in the next encrypting process. It refers to steps 3511 through 3519.

First, the modular exponentiation component for the correction value d' is calculated where $V=A^{d'}$ mod n (step 3511). An arithmetic operation in a normal binary method may be applied to the calculation because the value of the correction value d' may be disclosed, but it is still difficult to disclose the secret key d. The variable V is an output variable with which the output value of the encrypting process may be finally obtained.

Next, the value of the variable j is initialized to the first suffix L of the window sequence (step 3512).

Next, in the loop processing in steps 3514 through 3519, the repetitive process of performing the modular exponentiation operation with reference to the table generated in the table generation phase is performed from the more significant bits to the less significant bits of the secret key d.

First, the process $V=V^2$ mod n of performing square modular exponentiation operation on the value of the output variable V and obtaining a new value of V is performed k times (step 3514). In the process, the digital positions of the correction value d' and the first more significant bit side window sequence w[L] are aligned.

Next, the table data T[w(j)] using the window sequence w(j) as an index is acquired. Using the data, the operation of $V=V \times T[w(j)]$ mod n is performed (step 3515).

Then, 1 is added to the value of the variable j (step 3518).

Then, it is judged whether or not the value of the variable j is m−1 or less (step 3519)

If the value of the variable j is m−1 or less, control is returned to the process in step 3514 to perform the modular exponentiation operation on the less significant bit side of the window sequence.

If the value of the variable j exceeds m−1, the process equivalent to the exponential residue operation of the input value A with respect to the entire secret key d is terminated, the value of the output variable V is output as a result of the encrypting process, and the process of the exponential residue algorithm illustrated in FIGS. 28A and 28B is terminated (NO as the judgment in step 3519).

Described below is an example of a concrete numerical operation of the process using the modular exponentiation operation algorithm according to the third embodiment described above.

The window sequences w[1] through w[4], the random number s[0] through s[3], the correction value d', and the variable L indicating the window starting position which are all input here are obtained in the numerical operation example in FIG. 27.

First, an example of a numerical operation of the table generation phase is described.

First, in step 3501, the variable i=0 holds true.

Next in step 3502 in the first cycle of the variable i, $U=A^{(01011)}$ mod n is calculated using the random number $s[0]=(01011)_2$ (FIG. 27).

Next, in step 3503 in the first cycle of the variable i, the operation of $U=U^4$ mod $n=A^{(01011) \times 4}$ mod $n=A^{44}$ mod n is performed.

Next, in step 3504 in the first cycle of the variable i, the variable j=0 holds true.

Next, in step 3505 in the first cycle of the variable j in the first cycle of the variable i, the judgment of j=0<i=0 is NO.

As a result, in step 3508 in the first cycle of the variable i, $U=A^{44}$ mod n is stored in the table entry T[0] corresponding to the index value 0.

Next, in step 3509 in the first cycle, the variable i=i+1=1 holds true.

Next, in step 3510 in the first cycle, the judgment of the variable $i=1 \leq 2^2-1=3$ is YES, and control is returned to step 3502 in the second cycle.

Next, in step 3502 in the second cycle of the variable i, $U=A^{(11000)}$ mod n is calculated using the random number $s[1]=(11000)_2$ (FIG. 27).

Next, in step 3503 in the second cycle of the variable i, the operation of $U=U^4$ mod $n=A^{(11000) \times 4}$ mod $n=A^{96}$ mod n is performed.

Next, in step 3504 in the second cycle of the variable i, the variable j=0 holds true.

Next, in step 3505 in the first cycle of the variable j in the second cycle of the variable i, the judgment of j=0<i=1 is YES.

As a result, in step 3506 in the first cycle of the variable j in the second cycle of the variable i, $U=U \times A$ mod $n=A^{97}$ mod n is calculated.

Next, in step 3507 in the first cycle of the variable j in the second cycle of the variable i, the variable j=j+1=1 holds true, and control is returned to step 3505 in the second cycle of the variable j.

Next, in step 3505 in the second cycle of the variable j in the second cycle of the variable i, the judgment of j=1<i=1 is NO.

As a result, in step 3508 in the second cycle of the variable i, $U=A^{97}$ mod n is stored in the table entry T[1] corresponding to the index value 1.

Next, in step 3509 in the second cycle, the variable i=i+1=2 holds true.

Next, in step 3510 in the second cycle, the judgment of the variable $i=2 \leq 2^2-1=3$ is YES, and control is returned to step 3502 in the third cycle.

Next, in step 3502 in the third cycle of the variable i, $U=A^{(11011)}$ mod n is calculated using the random number $s[2]=(11011)_2$ (FIG. 27).

Next, in step 3503 in the third cycle of the variable i, the operation of $U=U^4$ mod $n=A^{(11011) \times 4}$ mod $n=A^{108}$ mod n is performed.

Next, in step 3504 in the third cycle of the variable i, the variable j=0 holds true.

Next, in step 3505 in the first cycle of the variable j in the second cycle of the variable i, the judgment of j=0<i=2 is YES.

As a result, in step 3506 in the first cycle of the variable j in the third cycle of the variable i, $U=U \times A$ mod $n=A^{109}$ mod n is calculated.

Next, in step 3507 in the first cycle of the variable j in the third cycle of the variable i, the variable j=j+1=1 holds true, and control is returned to step 3505 in the second cycle of the variable j.

Next, in step 3505 in the second cycle of the variable j in the third cycle of the variable i, the judgment of j=1<i=2 is YES.

As a result, in step 3506 in the second cycle of the variable j in the third cycle of the variable i, $U=U \times A$ mod $n=A^{110}$ mod n is calculated.

Next, in step 3507 in the second cycle of the variable j in the third cycle of the variable i, the variable j=j+1=2 holds true, and control is returned to step 3505 in the third cycle of the variable j.

Next, in step 3505 in the third cycle of the variable j in the third cycle of the variable i, the judgment of j=2<i=2 is NO.

As a result, in step 3508 in the third cycle of the variable i, $U=A^{110}$ mod n is stored in the table entry T[2] corresponding to the index value 2.

Next, in step 3509 in the third cycle, the variable i=i+1=3 holds true.

Next, in step 3510 in the third cycle, the judgment of the variable $i=3 \leq 2^2-1=3$ is YES, and control is returned to step 3502 in the fourth cycle.

Next, in step 3502 in the fourth cycle of the variable i, $U=A^{(00101)}$ mod n is calculated using the random number $s[3]=(00101)_2$ (FIG. 27).

Next, in step 3503 in the fourth cycle of the variable i, the operation of $U=U^4$ mod $n=A^{(00101) \times 4}$ mod $n=A^{20}$ mod n is performed.

Next, in step 3504 in the fourth cycle of the variable i, the variable j=0 holds true.

Next, in step 3505 in the first cycle of the variable j in the fourth cycle of the variable i, the judgment of j=0<i=3 is YES.

As a result, in step 3506 in the first cycle of the variable j in the fourth cycle of the variable i, U=U×A mod n=$A^{21}$ mod n is calculated.

Next, in step 3507 in the first cycle of the variable j in the fourth cycle of the variable i, the variable j=j+1=1 holds true, and control is returned to step 3505 in the second cycle of the variable j.

Next, in step 3505 in the second cycle of the variable j in the fourth cycle of the variable i, the judgment of j=1<i=3 is YES.

As a result, in step 3506 in the second cycle of the variable j in the fourth cycle of the variable i, U=U×A mod n=$A^{22}$ mod n is calculated.

Next, in step 3507 in the second cycle of the variable j in the fourth cycle of the variable i, the variable j=j+1=2 holds true, and control is returned to step 3505 in the third cycle of the variable j.

Next, in step 3505 in the third cycle of the variable j in the fourth cycle of the variable i, the judgment of j=2<i=3 is YES.

As a result, in step 3506 in the third cycle of the variable j in the fourth cycle of the variable i, U=U×A mod n=$A^{23}$ mod n is calculated.

Next, in step 3507 in the third cycle of the variable j in the fourth cycle of the variable i, the variable j=j+1=3 holds true, and control is returned to step 3505 in the fourth cycle of the variable j.

Next, in step 3505 in the fourth cycle of the variable j in the fourth cycle of the variable i, the judgment of j=3<i=3 is NO.

As a result, in step 3508 in the fourth cycle of the variable i, U=$A^{23}$ mod n is stored in the table entry T[3] corresponding to the index value 3.

Next, in step 3509 in the fourth cycle, the variable i=i+1=4 holds true.

Next, in step 3510 in the fourth cycle, the judgment of the variable i=4≤$2^2$−1=3 is NO, thereby terminating the process of the random number generation phase.

As described above, $2^k$=4 pieces of table data for T[0], T[1], T[2], and T[3] are generated.

Described next is an example of a numerical calculation of the modular exponentiation operation phase.

First in step 3511, since the correction value d′=$(111001)_2$ holds true (FIG. 27), V=$A^{d'}$ mod n=$A^{(111001)}$ mod n=$A^{57}$ mod n is calculated.

Next, in step 3512, the variable j=L=1 holds true (as illustrated in FIG. 27, the starting position of the window sequence is w[1]).

Next, in step 3514 in the first cycle, V=$V^2$ mod n is calculated k times=$(A^{57})^2)^2$ mod n=$A^{228}$ mod n.

Next, in step 3515 in the first cycle, V=V×T[w[1]]=$A^{228}$×$A^{44}$ mod n=$A^{272}$ mod n is calculated.

Next, in step 3518 in the first cycle, the variable j=j+1=2 holds true.

Next, in step 3519 in the first cycle, the judgment of the variable j=2≤m−1=5−1=4 is YES.

As a result, control is returned to step 3514 in the second cycle.

Next, in step 3514 in the second cycle, V=$V^2$ mod n is calculated k times=$(A^{272})^2)^2$ mod n=$A^{1088}$ mod n.

Next, in step 3515 in the second cycle, V=V×T[w[2]]=$A^{1088}$×$A^{23}$ mod n=$A^{1111}$ mod n is calculated.

Next, in step 3518 in the second cycle, the variable j=j+1=3 holds true.

Next, in step 3519 in the second cycle, the judgment of the variable j=3≤m−1=5−1=4 is YES.

As a result, control is returned to step 3514 in the third cycle.

Next, in step 3514 in the third cycle, V=$V^2$ mod n is calculated k times=$(A^{1111})^2)^2$ mod n=$A^{4444}$ mod n.

Next, in step 3515 in the third cycle, V=V×T[w[3]]=$A^{4444}$×$A^{23}$ mod n=$A^{4457}$ mod n is calculated.

Next, in step 3518 in the third cycle, the variable j=j+1=4 holds true.

Next, in step 3519 in the third cycle, the judgment of the variable j=4≤m−1=5−1=4 is YES.

As a result, control is returned to step 3514 in the fourth cycle.

Next, in step 3514 in the fourth cycle, V=$V^2$ mod n is calculated k times=$(A^{4467})^2)^2$ mod n=$A^{17868}$ mod n.

Next, in step 3515 in the fourth cycle, V=V×T[w[4]]=$A^{17868}$×$A^{23}$ mod n=$A^{17965}$ mod n is calculated.

Next, in step 3518 in the fourth cycle, the variable j=j+1=5 holds true.

Next, in step 3519 in the fourth cycle, the judgment of the variable j=5≤m−1=5−1=4 is NO.

As a result, the value of the output variable V is output as a final result of the encrypting process. It corresponds to the result ($A^{11010010101111}$ mod n=$A^{17965}$ mod n) of the modular exponentiation operation in a normal method, and realizes a process secured against the DPA and SPA.

The effect of the present embodiment may be summarized as an addition to the chart in FIG. 15 as illustrated in FIG. 29. FIG. 29 illustrates the encrypting process provided with simple carry control by the table size of about half ($2^{k-1}$+1) of a normal method with security against the DPA (and SPA) according to the first and second embodiments.

Although not illustrated in FIG. 29, the second and third embodiments realize an encrypting process which provides table data with high randomness and high security against the DPA.

Furthermore, the third embodiment may provide a further secured encrypting process against the DPA in a modular exponentiation operation.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present invention has (have) been described in detail, it should be understood that the various changes, substitutions, and alterations could be made hereto without departing from the spirit and scope of the invention.

The invention claimed is:

1. An encrypting device which performs an encrypting operation on a point A on an elliptical curve by a secret key d using b, m, k, i, and j as natural numbers excluding 0, and a random number s, each window sequence w(i), and a correction value d′ corresponding to the secret key d, the secret key d being a binary secret key in elliptical curve cryptography, a bit length of the secret key d being (b+m×k) bits, the encrypting device comprising:
   a window sequence storage device that stores each window sequence w(i);
   a correction value storage that stores the correction value d′;

a random number storage that stores the random number s;

a memory that stores instructions; and a processor device that executes the instructions stored in the memory to perform a process including:

obtaining an index value by concatenating the random number s, stored in the random number storage, on a more significant bit side of a bit string of k bits while sequentially changing a value of the bit string of k bits, where k indicates a number of bits of each window sequence w(i) stored in the window sequence storage device, performing scalar multiplication on the point A using the index value as a scalar value, generating a randomized table by storing a calculation result of the scalar multiplication as table data corresponding to the index value, setting as an initial value of an output variable V a calculation result obtained by performing the scalar multiplication on the point A using the correction value d' stored in the correction value storage as the scalar value, performing a first process and a second process on each obtained window sequence w(j) from a more significant bit side to a less significant bit side, each obtained window sequence w(j) being obtained by selecting each window sequence w(i) from the window sequence storage device, the first process including executing doubling on the elliptical curve, the doubling being executed k times, where k indicates a number of bits of each window sequence w(i) stored in the window sequence storage device, and the second process including acquiring table data in the randomized table using the obtained window sequence w(j) as an index and adding the acquired table data to the output variable V when a most significant bit of the obtained window sequence w(j) is 0, and acquiring the table data in the randomized table using as an index a bit string of a complement of a base for the obtained window sequence w(j) in binary system and adding to the output variable V a value obtained by adding a minus sign to the acquired table data when a most significant bit of the obtained window sequence w(j) is 1; and outputting a value of the output variable V as a result of the encrypting operation.

2. The encrypting device according to claim 1, wherein the random number storage stores the random number s for each value of each window sequence w(i), and in the obtaining of the index value, the index value is obtained by concatenating with the bit string of k bits the random number s corresponding to the value of the bit string of k bits.

3. An encrypting method used by a computer which performs an encrypting operation on a point A on an elliptical curve by a secret key d using b, m, k, i, and j as natural numbers excluding 0, and a random number s, each window sequence w(i), and a correction value d' corresponding to the secret key d, the secret key d being a binary secret key in elliptical curve cryptography, a bit length of the secret key d being (b+m×k) bits, the encrypting method comprising:

obtaining, by a hardware processor from a memory device, an index value by concatenating the random number s on a more significant bit side of a bit string of k bits while sequentially changing a value of the bit string of k bits; wherein k indicates a number of bits of each window sequence w(i) stored in a window sequence storage device;

performing scalar multiplication on the point A using the index value as a scalar value;

generating a randomized table by storing a calculation result of the scalar multiplication as table data corresponding to the index value;

setting as an initial value of an output variable V a calculation result obtained by performing the scalar multiplication on the point A using the correction value d' as the scalar value;

performing a first process and a second process on each obtained window sequence w(j) from a more significant bit side to a less significant bit side, each obtained window sequence w(j) being obtained by selecting each window w(i) from the window sequence storage device, the first process including executing doubling on the elliptical curve, the doubling being executed k times, where k indicates a number of bits of each window sequence w(i), and the second process including acquiring table data in the randomized table using the obtained window sequence w(j) as an index and adding to the acquired table data to the output variable V when a most significant bit of the obtained window sequence w(j) is 0, and acquiring the table data in the randomized table using as an index a bit string of a complement of a base for the obtained window sequence w(j) in binary system and adding to the output variable V a value obtained by adding a minus sign to the acquired table data when a most significant bit of the obtained window sequence w(j) is 1; and outputting a value of the output variable V as a result of the encrypting operation.

4. A non-transitory computer-readable recording medium storing a program for executing a process by a computer to perform elliptical curve cryptography by performing an encrypting operation on a point A on an elliptical curve by a secret key d using b, m, k, i, and j as natural numbers excluding 0, and a random number s, each window sequence w(i), and a correction value d' corresponding to the secret key d, the secret key d being a binary secret key in elliptical curve cryptography, a bit length of the secret key d being (b+m×k) bits, the process comprising:

obtaining, by a computer from a memory device, an index value by concatenating the random number s on a more significant bit side of a bit string of k bits while sequentially changing a value of the bit string of k bits where k indicates to a number of bits of each window sequence w(i) stored in a window sequence storage device;

performing scalar multiplication on the point A using the index value as a scalar value;

generating a randomized table by storing a calculation result of the scalar multiplication as table data corresponding to the index value;

setting as an initial value of an output variable V a calculation result obtained by performing the scalar multiplication on the point A using the correction value d' as the scalar value;

performing a first process and a second process on each obtained window sequence w(j) from a more significant bit side to a less significant bit side,
 each obtained window sequence w(j) being obtained by selecting each window sequence w(i) from the window sequence storage device,
 the first process including executing doubling on the elliptical curve, the doubling being executed k times, where k indicates a number of bits of each window sequence w(i), and
 the second process including
  acquiring table data in the randomized table using the obtained window sequence w(j) as an index and adding the acquired table data to the output variable V when a most significant bit of the obtained window sequence w(j) is 0, and
  acquiring the table data in the randomized table using as an index a bit string of a complement of a base for the obtained window sequence w(j) in binary system and adding to the output variable V as value obtained by adding a minus sign to the acquired table data when a most significant bit of the obtained window sequence w(j) is 1;
outputting a value of the output variable V as a result of the encrypting operation.

* * * * *